United States Patent
Sugitani

(10) Patent No.: US 8,082,818 B2
(45) Date of Patent: Dec. 27, 2011

(54) PLANETARY DEVICE FOR CONVERSION BETWEEN ROTARY MOTION AND LINEAR MOTION

(75) Inventor: Nobuyoshi Sugitani, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1076 days.

(21) Appl. No.: 11/920,426

(22) PCT Filed: Aug. 16, 2006

(86) PCT No.: PCT/JP2006/316443
§ 371 (c)(1), (2), (4) Date: Nov. 15, 2007

(87) PCT Pub. No.: WO2007/023827
PCT Pub. Date: Mar. 1, 2007

(65) Prior Publication Data
US 2008/0196529 A1 Aug. 21, 2008

(30) Foreign Application Priority Data
Aug. 23, 2005 (JP) ................ 2005-241462

(51) Int. Cl.
*F16H 1/24* (2006.01)
*F16H 55/02* (2006.01)
(52) U.S. Cl. .................. 74/424.91; 74/424.92
(58) Field of Classification Search ........... 74/424.91, 74/424.92
See application file for complete search history.

(56) References Cited

U.S. PATENT DOCUMENTS

| | | | |
|---|---|---|---|
| 2,683,379 A | | 7/1950 | Strandgren |
| 3,726,151 A | * | 4/1973 | Lemor ............... 74/424.92 |
| 6,026,696 A | * | 2/2000 | Hehl ................. 74/424.92 |
| 6,131,479 A | | 10/2000 | Butsch et al. |
| 7,000,495 B2 | * | 2/2006 | Benoit .............. 74/424.92 |
| 2004/0116218 A1 | | 6/2004 | Butsch et al. |
| 2005/0160856 A1 | | 7/2005 | Sugitani |
| 2007/0238571 A1 | * | 10/2007 | Sugitani ............... 475/227 |

FOREIGN PATENT DOCUMENTS

| | | |
|---|---|---|
| CH | 290685 | 8/1953 |
| DE | 196 25 761 A1 | 1/1997 |
| EP | 0 776 432 | 6/1997 |
| EP | 1 617 103 A1 | 1/2006 |
| FR | 995 011 | 11/1951 |
| GB | 669410 | 11/1953 |
| JP | A 47-31740 | 8/1972 |

(Continued)

*Primary Examiner* — Justin Krause
(74) *Attorney, Agent, or Firm* — Oliff & Berridge, PLC

(57) ABSTRACT

A sun shaft, planetary shafts, and a ring shaft having respective axes of rotation in parallel with one another are provided. A helical sun gear, helical planetary gears, and a helical ring gear are provided on the sun shaft, the planetary shafts, and the ring shaft, respectively, and cooperatively constitute a first planetary gear mechanism. A screw sun gear, screw planetary gears, and a screw ring gear 44 are provided on the sun shaft, the planetary shafts, and the ring shaft, respectively, and cooperatively constitute a second planetary gear mechanism. Either of the gear ratio of the screw sun gear to the screw planetary gears and the gear ratio of the screw ring gear to the screw planetary gears differs from the gear ratio of the helical sun gear to the helical planetary gears and from the gear ratio of the helical ring gear to the helical planetary gears.

20 Claims, 26 Drawing Sheets

FOREIGN PATENT DOCUMENTS

| | | |
|---|---|---|
| JP | A-60-188655 | 9/1985 |
| JP | A 10-505659 | 6/1998 |
| JP | A 10-196757 | 7/1998 |
| WO | WO 2004-094870 A1 | 4/2004 |
| WO | WO 2005124188 A1 * | 12/2005 |

* cited by examiner

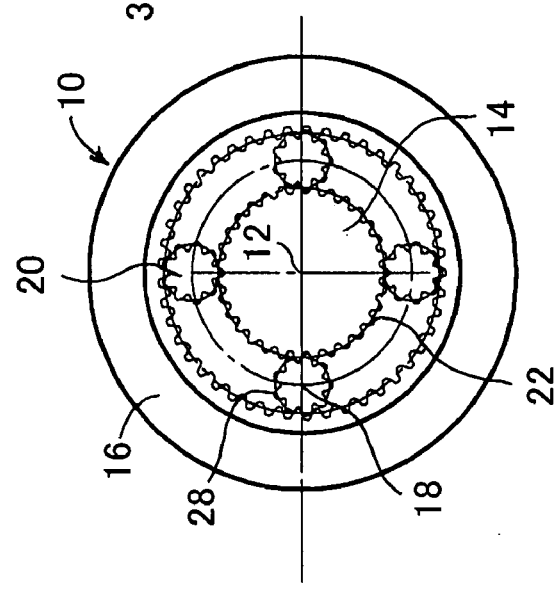

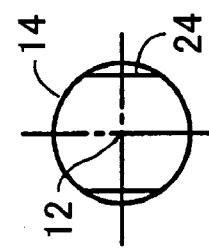
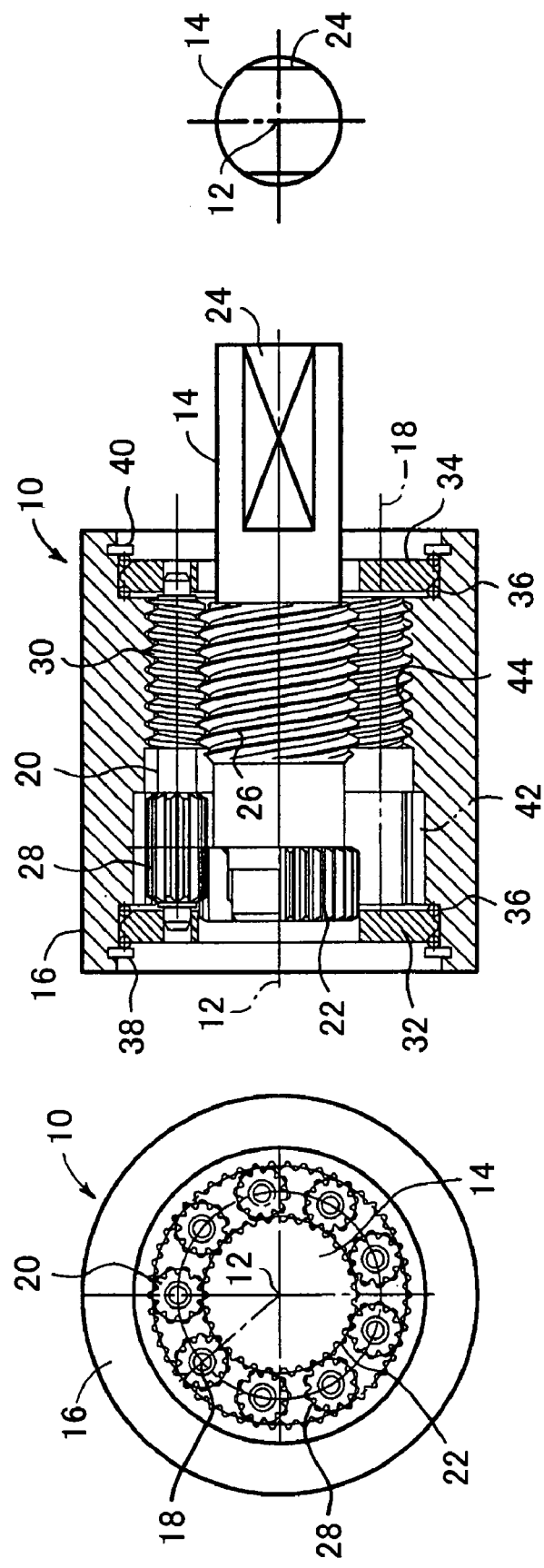

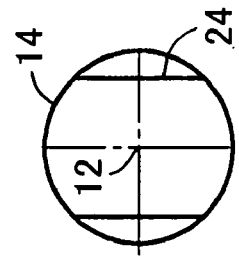
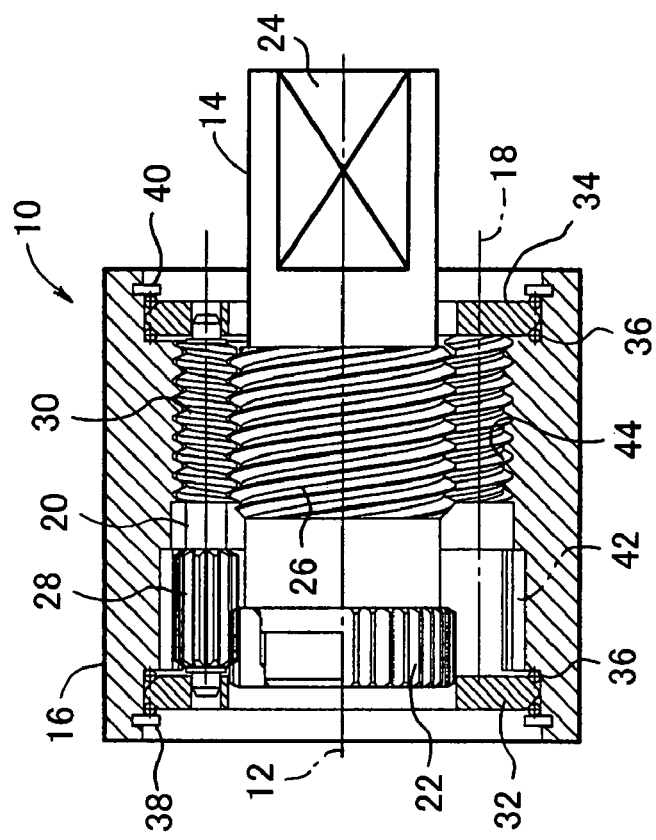
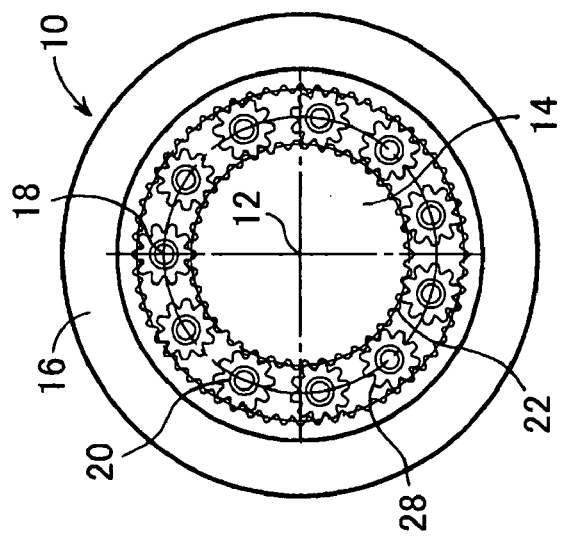

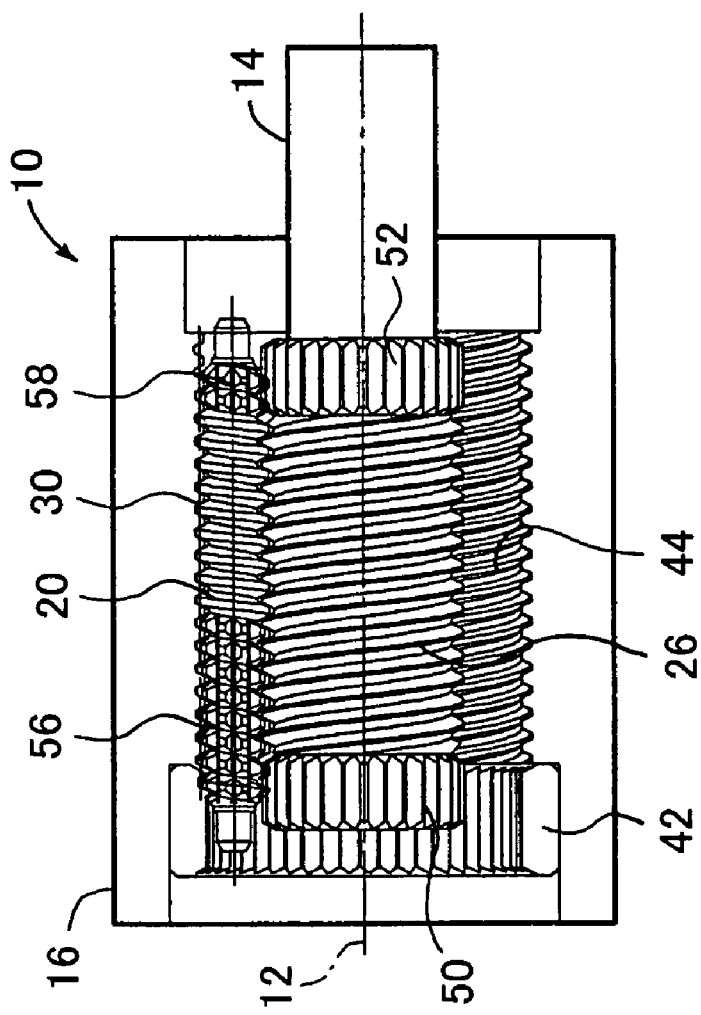
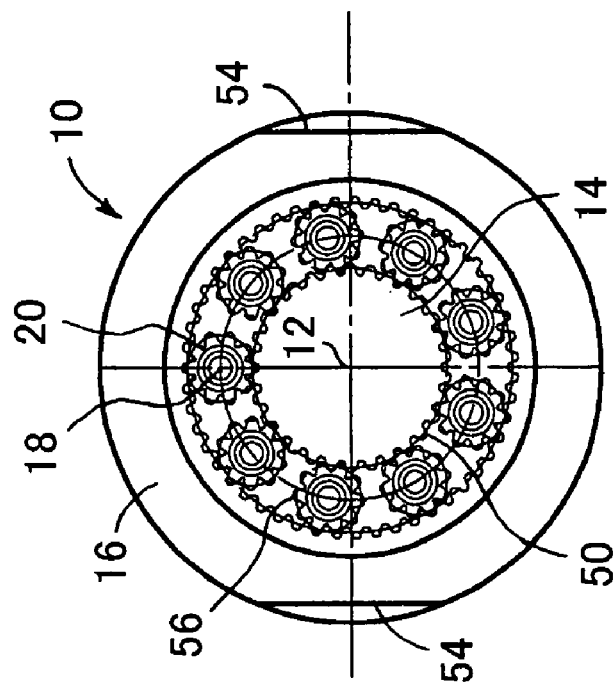
FIG.8A
FIG.8B

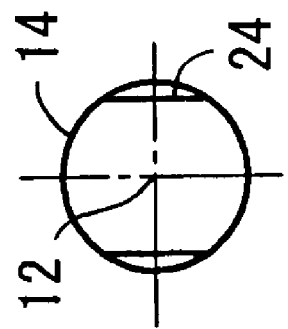
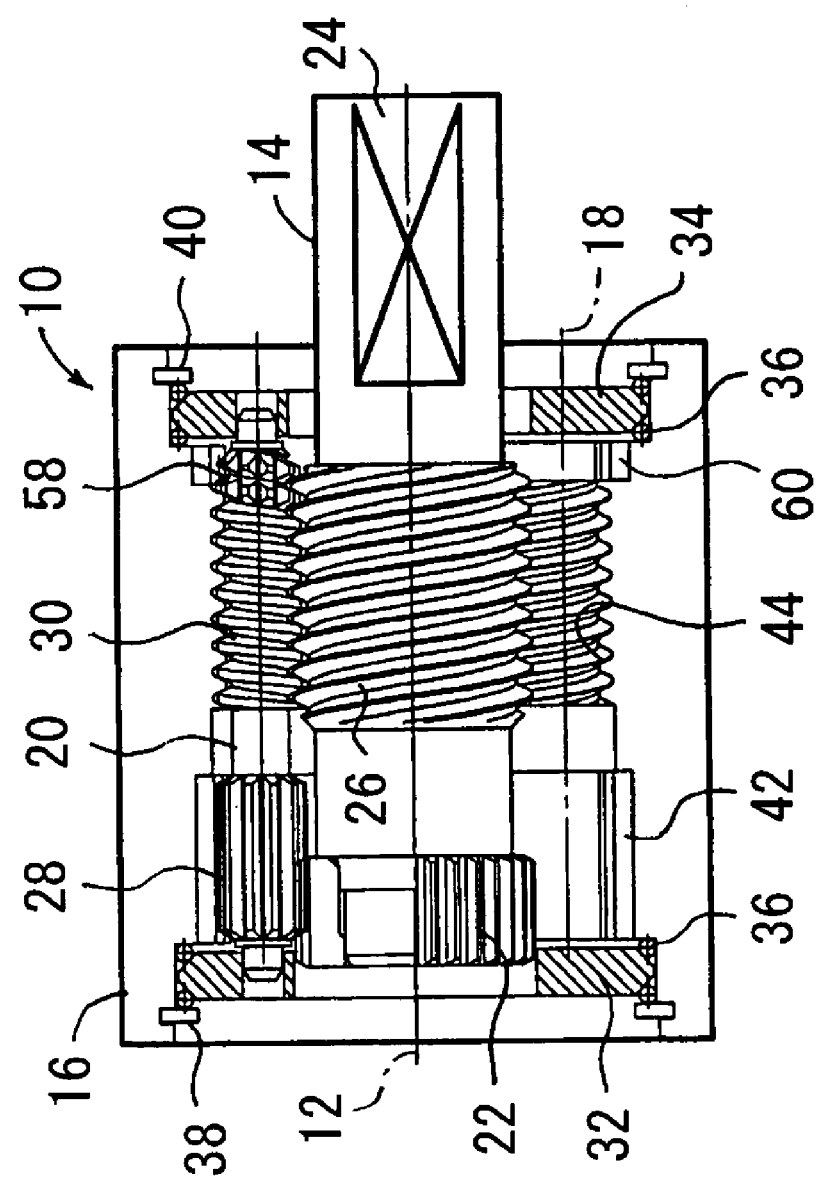
FIG.9B
FIG.9A

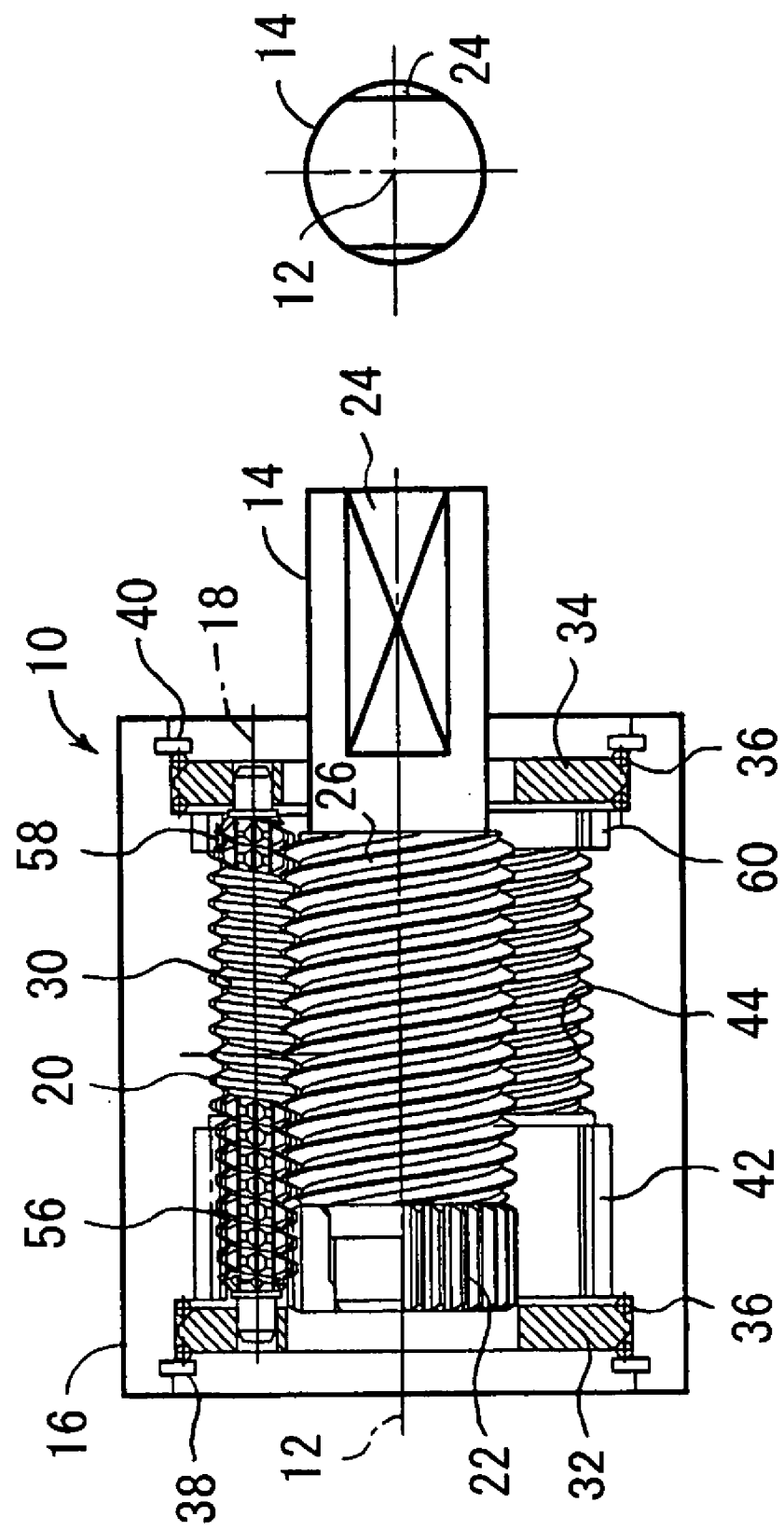

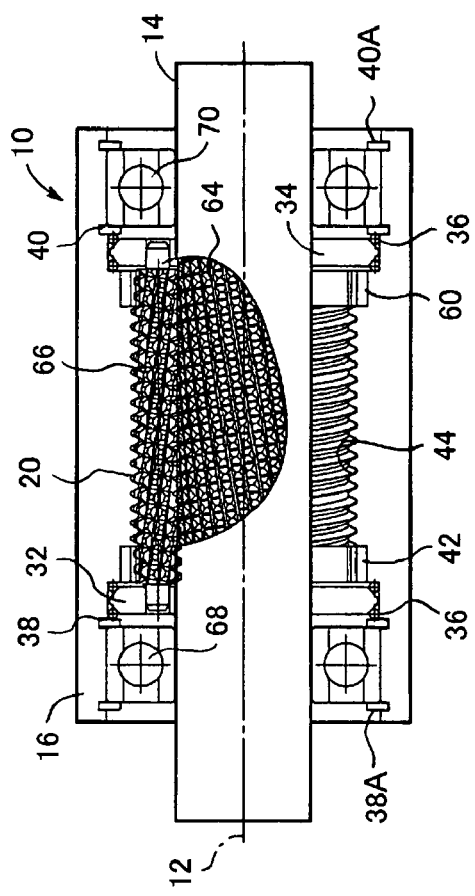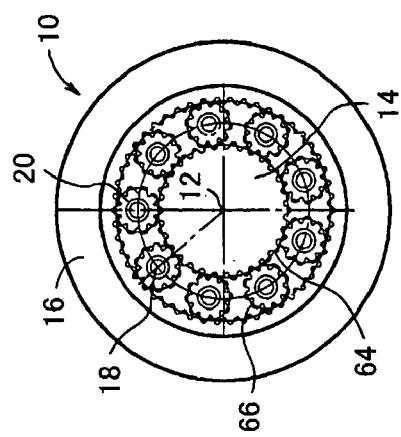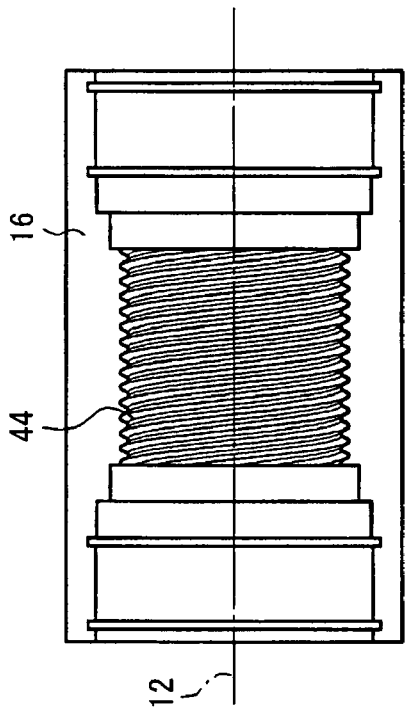

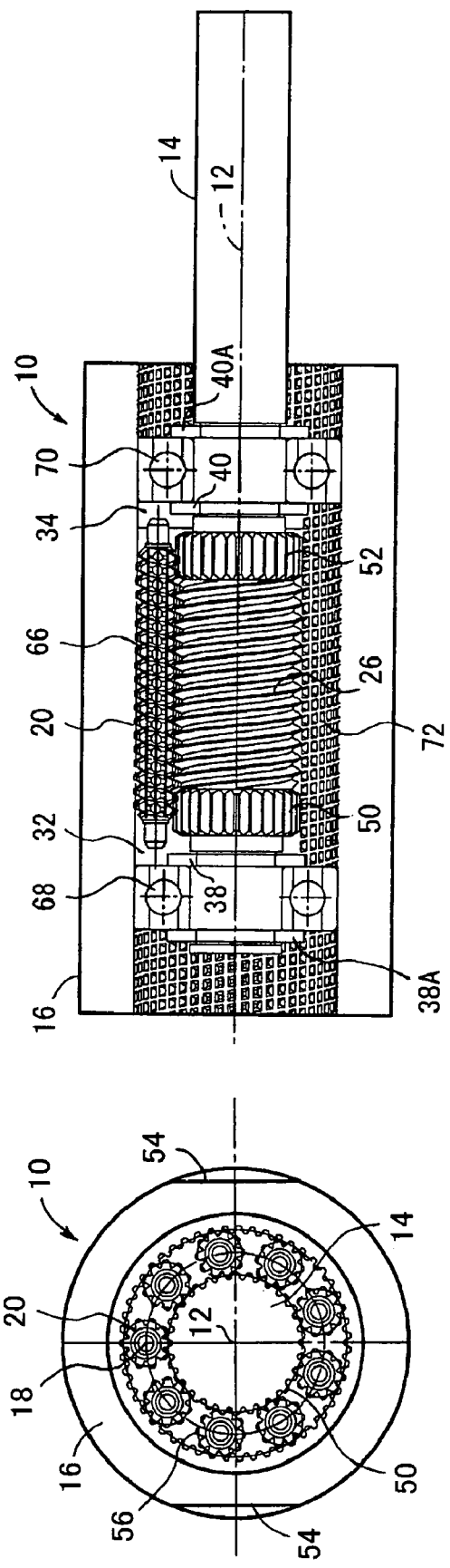

PLANETARY DEVICE FOR CONVERSION BETWEEN ROTARY MOTION AND LINEAR MOTION

TECHNICAL FIELD

The present invention relates to a device for conversion between rotary motion and linear motion, and more particularly to a planetary rotary/linear motion converter for performing motion conversion between rotary motion and linear motion.

BACKGROUND ART

A conventionally known planetary rotary/linear motion converter for converting a rotary motion into a linear motion is disclosed in, for example, Japanese Patent Application Laid-Open (kokai) No. 10-196757. The planetary rotary/linear motion converter has a multi-thread screw sun gear, screw planetary gears, and a screw ring gear, which cooperatively constitute a planetary gear mechanism. The external thread of the screw sun gear and the internal thread of the screw ring gear are of opposite helical directions. The screw sun gear, the screw planetary gears, and the screw ring gear are set in a certain relationship in terms of the number of threads and the pitch diameter of threads.

Also, a conventionally known planetary differential screw-type rotary/linear motion converter is disclosed in International Publication No. WO2004/094870, which was filed by the present applicant. The planetary differential screw-type rotary/linear motion converter has a multi-thread screw sun gear, screw planetary gears, and a screw ring gear, which cooperatively constitute a planetary gear mechanism. The screw sun gear and the screw planetary gears mesh with each other through threads of opposite helical directions. The screw sun gear and the screw ring gear mesh with each other through threads of the same helical direction. The screw sun gear, the screw planetary gears, and the screw ring gear are set in a certain relationship in terms of the number of threads and the pitch diameter of threads. Through utilization of the principles of the planetary gear mechanism and the principles of differential gears, the planetary differential screw-type rotary/linear motion converter accurately converts a rotary motion into a linear motion.

U.S. Pat. No. 2,683,379 discloses a planetary rotary/linear motion converter similar to the motion converter disclosed in International Publication No. WO2004/094870. The planetary rotary/linear motion converter has a screw sun gear, screw planetary gears, and a screw ring gear, as well as planetary spur gears and a ring spur gear. The screw sun gear and the screw planetary gears mesh with each other through threads of the same helical direction (coincidental helical direction).

The above-mentioned conventional rotary/linear motion converter disclosed in Japanese Patent Application Laid-Open (kokai) No. 10-196757 is prone to unstable operation which is caused by sliding between the screw sun gear and the screw planetary gears or a like cause, and is therefore not feasible for practical use. The above-mentioned rotary/linear motion converter disclosed in International Publication No. WO2004/094870 can accurately convert a rotary motion into a linear motion, but requires a complex structure for ensuring reliable operation. Furthermore, the converter cannot convert a linear motion into a rotary motion. In the above-mentioned rotary/linear motion converter disclosed in U.S. Pat. No. 2,683,379, an advancing amount of the sun shaft associated with the rotation of the ring shaft depends on the number of teeth of the screw sun gear, the number of teeth of each screw planetary gear, and the number of teeth of the screw ring gear. Therefore, the conversion ratio of the amount of a linear motion to the amount of a rotary motion cannot be set freely. Furthermore, the efficiency of conversion is low.

DISCLOSURE OF THE INVENTION

A primary object of the present invention is to provide a planetary rotary/linear motion converter which can perform motion conversion between a rotary motion and a linear motion accurately, stably, and efficiently with a relatively simple structure through combination of a planetary gear mechanism of helical gears for regulating transmission of rotation, and a planetary gear mechanism of screw gears for performing motion conversion in cooperation with the planetary gear mechanism of helical gears.

The present invention provides a planetary rotary/linear motion converter characterized by comprising a sun shaft, planetary shafts, and a ring shaft having respective axes of rotation in parallel with one another; a helical sun gear, helical planetary gears, and a helical ring gear respectively provided on the sun shaft, the planetary shafts, and the ring shaft and cooperatively constituting a first planetary gear mechanism; and a screw sun gear, screw planetary gears, and a screw ring gear respectively provided on the sun shaft, the planetary shafts, and the ring shaft and cooperatively constituting a second planetary gear mechanism. The planetary rotary/linear motion converter is characterized in that either of a gear ratio of the screw sun gear to the screw planetary gears and a gear ratio of the screw ring gear to the screw planetary gears differs from a gear ratio of the helical sun gear to the helical planetary gears and from a gear ratio of the helical ring gear to the helical planetary gears.

According to this configuration, either of the gear ratio of the screw sun gear to the screw planetary gears and the gear ratio of the screw ring gear to the screw planetary gears differs from the gear ratio of the helical sun gear to the helical planetary gears and from the gear ratio of the helical ring gear to the helical planetary gears. Thus, as will be described in detail later, when the sun shaft and the ring shaft are rotated relative to the other, the sun shaft provided with the screw sun gear whose gear ratio to the screw planetary gears differs from the gear ratio of the helical sun gear to the helical planetary gears and from the gear ratio of the helical ring gear to the helical planetary gears, or the ring shaft provided with the screw ring gear whose gear ratio to the screw planetary gears differs from the gear ratio of the helical sun gear to the helical planetary gears and from the gear ratio of the helical ring gear to the helical planetary gears performs linear motion relative to the ring shaft or the sun shaft along the axis of rotation. By contrast, when the sun shaft and the ring shaft are caused to perform a linear motion relative to each other along the axis of rotation, the sun shaft provided with the screw sun gear whose gear ratio to the screw planetary gears differs from the gear ratio of the helical sun gear to the helical planetary gears and from the gear ratio of the helical ring gear to the helical planetary gears, or the ring shaft provided with the screw ring gear whose gear ratio to the screw planetary gears differs from the gear ratio of the helical sun gear to the helical planetary gears and from the gear ratio of the helical ring gear to the helical planetary gears performs a rotary motion relative to the other. Accordingly, motion conversion between a rotary motion and a linear motion can be performed between the sun shaft and the ring shaft.

According to the above-mentioned configuration, as will be described in detail later, a linear motion (advancing amount) of the sun shaft or the ring shaft per one rotation of the ring shaft or the sun shaft depends only on the number of teeth of the screw gear, the number of teeth of the helical gear, and the pitch of the screw gear. Therefore, motion conversion between a rotary motion and a linear motion can be performed accurately, stably, and efficiently by an operation principle that completely differs from that of the conventional rotary/linear motion converters disclosed in the above-mentioned patent documents in which a linear motion is generated from a difference in the number of threads and a difference in helix angle.

The above-mentioned configuration may be such that the number of teeth of the helical sun gear Zs, the number of teeth of each helical planetary gear Zp, the number of teeth of the helical ring gear Zn, the number of teeth of the screw sun gear Zss, the number of teeth of each screw planetary gears Zps, and the number of teeth of the screw ring gear Zns are in a relation expressed by $$(Zss/Zps):(Zns/Zps) \neq (Zs/Zp):(Zn/Zp)$$

This configuration can reliably establish a condition in which either of the gear ratio of the screw sun gear to the screw planetary gears and the gear ratio of the screw ring gear to the screw planetary gears differs from the gear ratio of the helical sun gear to the helical planetary gears and from the gear ratio of the helical ring gear to the helical planetary gears.

The above-mentioned configuration may be such that: when the sun shaft and the ring shaft are rotated relative to each other, the sun shaft provided with the screw sun gear whose gear ratio to the screw planetary gears differs from the gear ratio of the helical sun gear to the helical planetary gears and from the gear ratio of the helical ring gear to the helical planetary gears, or the ring shaft provided with the screw ring gear whose gear ratio to the screw planetary gears differs from the gear ratio of the helical sun gear to the helical planetary gears and from the gear ratio of the helical ring gear to the helical planetary gears performs linear motion relative to the ring shaft or the sun shaft along the axis of rotation; and an advancing amount Lj of the linear motion per one relative rotation of the sun shaft and the ring shaft is expressed by $$Lj = P \cdot (Zs \cdot Zns - Zss \cdot Zn)/(Zs + Zn)$$

in which P is a pitch of the screw sun gear, the screw planetary gears, and the screw ring gear.

This configuration can cause the sun shaft or the ring shaft to perform a linear motion by an advancing amount that depends only on the number of teeth of the screw sun gear and that of the screw ring gear, the number of teeth of the helical sun gear and that of the helical ring gear, and the pitch of the screw gear, per one rotation of the ring shaft or the sun shaft, irrespective of the number of teeth of each screw planetary gear, the number of teeth of the helical screw gear, and the like.

The above-mentioned configurations may be such that either of the helical sun gear and the helical ring gear or either of the screw sun gear and the screw ring gear has a non-zero tooth number difference.

This configuration can reliably establish a condition in which either of the gear ratio of the screw sun gear to the screw planetary gears and the gear ratio of the screw ring gear to the screw planetary gears differs from the gear ratio of the helical sun gear to the helical planetary gears and from the gear ratio of the helical ring gear to the helical planetary gears.

The above-mentioned configurations may be such that: either of the helical sun gear and the helical ring gear has a non-zero tooth number difference, and the helical sun gear, the helical planetary gears, and the helical ring gear are addendum-modified.

This configuration can reliably establish a condition in which either of the gear ratio of the screw sun gear to the screw planetary gears and the gear ratio of the screw ring gear to the screw planetary gears differs from the gear ratio of the helical sun gear to the helical planetary gears and from the gear ratio of the helical ring gear to the helical planetary gears, and can ensure proper meshing of gears of the first and second planetary gear mechanisms.

The above-mentioned configuration may be such that the sum of an addendum modification coefficient of the helical planetary gears and an addendum modification coefficient of the helical sun gear as calculated when the sun shaft performs linear motion along the axis of rotation and the sum of an addendum modification coefficient of the helical planetary gears and an addendum modification coefficient of the helical ring gear as calculated when the ring shaft performs linear motion along the axis of rotation range from −2 to 2.

Generally, gears are addendum-modified for the purpose of (1) preventing undercut, (2) adjusting the center distance between gears, (3) ensuring meshing at a tooth depth portion, whose specific sliding is low, etc. In the planetary rotary/linear motion converter of the present invention, as mentioned above, the number of teeth of the helical gear must be set to a special value different from a value in the case of an ordinary planetary gear mechanism. In order to enable employment of the special number of teeth, addendum must be modified.

Specifically, the planetary shafts must be arranged around the sun shaft while being spaced at equal angular intervals. Also, preferably, the helical planetary gears differ from one another in the phase of meshing with the helical sun gear and in the phase of meshing with the helical ring gear. Accordingly, the number of teeth of the helical gear is limited, and the gears cannot have a general addendum modification coefficient.

Preferably, in the planetary rotary/linear motion converter of the present invention, in order to ensure the meshing of teeth in a region of low specific sliding, in the case where the sun shaft performs linear motion along the axis of rotation, the sum of an addendum modification coefficient of the helical planetary gears and an addendum modification coefficient of the helical sun gear ranges from −2 to 2; in the case where the ring shaft performs linear motion along the axis of rotation, the sum of an addendum modification coefficient of the helical planetary gears and an addendum modification coefficient of the helical ring gear ranges from −2 to 2; and the number of teeth of the helical gear is set such that the sum of the addendum modification coefficients ranges from −2 to 2.

According to the above-mentioned configuration, since the sum of an addendum modification coefficient of the helical planetary gears and an addendum modification coefficient of the helical sun gear as calculated when the sun shaft performs linear motion along the axis of rotation and the sum of an addendum modification coefficient of the helical planetary gears and an addendum modification coefficient of the helical ring gear as calculated when the ring shaft performs linear motion along the axis of rotation range from −2 to 2, the addendum modification coefficient of the helical planetary gears and the addendum modification of the helical ring gear can be such that addendum modification falls within the range of a tooth depth that is ordinarily used for meshing of gears. Thus, the meshing of gears in a region of low specific sliding can be ensured.

The above-mentioned configurations may be such that: either of the screw sun gear and the screw ring gear has a non-zero tooth number difference, and the screw sun gear, the screw planetary gears, and the screw ring gear have respective thread profiles such that the screw sun gear, the screw planetary gears, and the screw ring gear are of the same normal base pitch.

Generally, for proper meshing, a group of screws meshing with one another is designed to have the same pressure angle and the same normal module. However, in the planetary rotary/linear motion converter, either of the gear ratio of the screw sun gear to the screw planetary gears and the gear ratio of the screw ring gear to the screw planetary gears differs from the gear ratio of the helical sun gear to the helical planetary gears and from the gear ratio of the helical ring gear to the helical planetary gears; thus, the screw gears differ from one another in helix angle and accordingly differ from one another in pressure angle, normal module, and lead angle.

However, even though the screw gears differ from one another in pressure angle, normal module, and lead angle, the screw gears can be properly meshed with one another by having the same normal base pitch; i.e., the same base pitch as measured on a plane of action (a plane drawn by a line of contact) of the screw gears.

According to the above-mentioned configuration, either of the screw sun gear and the screw ring gear has a non-zero tooth number difference, and the screw sun gear, the screw planetary gears, and the screw ring gear have respective thread profiles such that the screw sun gear, the screw planetary gears, and the screw ring gear are of the same normal base pitch. Thus, either of the screw sun gear and the screw ring gear has a non-zero tooth number difference, and the screw gears differ from one another in helix angle. Therefore, even though the screw sun gear, the screw planetary gears, and the screw ring gear differ from one another in pressure angle, normal module, and lead angle, proper meshing can be secured for the screw sun gear, the screw planetary gears, and the screw ring gear.

The above-mentioned configurations may be such that: a helix angle of the screw sun gear and a helix angle of the screw planetary gears are of opposite directions, and the screw sun gear, the screw planetary gears, and the screw ring gear have respective involute thread profiles such that the screw sun gear, the screw planetary gears, and the screw ring gear are of the same normal base pitch and such that the screw sun gear and the screw planetary gears are of different axial pressure angles.

This configuration can ensure proper meshing between the screw sun gear and the screw planetary gears through line contact.

The above-mentioned configurations may be such that: a helix angle of the screw planetary gears and a helix angle of the screw ring gear are of the same direction and assume different values, and the screw sun gear, the screw planetary gears, and the screw ring gear have respective involute thread profiles such that the screw sun gear, the screw planetary gears, and the screw ring gear are of the same normal base pitch and such that the screw planetary gears and the screw ring gear are of different axial pressure angles.

This configuration can ensure proper meshing between the screw planetary gears and the screw ring gear through line contact.

The above-mentioned configurations may be such that: the screw sun gear and the screw planetary gears have respective helix angles of the same direction, and the screw sun gear, the screw planetary gears, and the screw ring gear have respective thread profiles such that the screw sun gear, the screw planetary gears, and the screw ring gear are of the same normal base pitch; such that the screw sun gear and the screw planetary gears are of different axial pressure angles; and such that the screw sun gear and the screw planetary gears are in a point contact with each other.

This configuration can ensure meshing between the screw sun gear and the screw planetary gears through point contact.

The above-mentioned configurations may be such that a gear ratio among the helical sun gear, the helical planetary gear, and the helical ring gear differs from a pitch-diameter ratio among the screw sun gear, the screw planetary gears, and the screw ring gear.

This configuration can reliably establish a condition in which either of the gear ratio of the screw sun gear to the screw planetary gears and the gear ratio of the screw ring gear to the screw planetary gears differs from the gear ratio of the helical sun gear to the helical planetary gears and from the gear ratio of the helical ring gear to the helical planetary gears.

The above-mentioned configurations may be such that a reference pitch circle diameter of the screw sun gear and a reference pitch circle diameter of the screw ring gear are substantially equal to a working pitch circle diameter of the helical sun gear meshing with the helical planetary gears and a working pitch circle diameter of the helical ring gear meshing with the helical planetary gears, respectively.

This configuration ensures smooth transmission of rotation through the first and second planetary gear mechanisms and can ensure smooth motion conversion. In this case, the expression "substantially equal" means that the ratio between the reference pitch circle diameter and the working pitch circle diameter ranges from 0.9 to 1.1, preferably from 0.95 to 1.05.

The above-mentioned configurations may be such that the number of the planetary shafts is not a divisor of the number of teeth of each helical planetary gear.

This configuration can lower sliding of the helical planetary gears relative to the helical sun gear and the helical ring gear.

The above-mentioned configurations may be such that: the number of the planetary shafts is a divisor of the sum of the number of teeth of the screw sun gear and the number of teeth of the screw ring gear and is a divisor of the sum of the number of teeth of the helical sun gear and the number of teeth of the helical ring gear, and the number of teeth of each helical planetary gear and the number of the planetary shafts have no common divisor other than 1.

According to this configuration, as will be described later, the helical planetary gears differ from one another in the phase of meshing with the helical sun gear and in the phase of meshing with the helical ring gear; thus, by virtue of overlapping of meshing of the helical gears, smooth transmission of rotation at high contact ratio can be ensured.

The above-mentioned configurations may be such that: the helical planetary gears and the screw planetary gears are provided on the planetary shafts in the same predetermined region extending along the axis of rotation, and the helical sun gear and the screw sun gear are provided on the sun shaft in the same region that faces at least the predetermined region.

This configuration can shorten the length of the rotary/linear motion converter along the axis of rotation as compared with the case where the helical planetary gears and the screw planetary gears are provided on the planetary shafts in respective different regions extending along the axis of rotation, and thus the helical sun gear and the screw sun gear are provided on the sun shaft in respective different regions.

The above-mentioned configuration may be such that two helical ring gears meshing with the helical planetary gears are provided on the ring shaft in two respective regions that face opposite end portions of the predetermined region.

This configuration can establish reliable meshing between the helical planetary gears and the helical ring gears and can ensure smooth operation of the rotary/linear motion converter as compared with the case where a single helical ring gear meshing with the helical planetary gears is provided on the ring shaft in a single region that faces one of the opposite end portions of the predetermined region.

The above-mentioned configurations may be configured such that: the helical planetary gears and the screw planetary gears are provided on the planetary shafts in the same predetermined region extending along the axis of rotation, and the helical ring gear and the screw ring gear are provided on the ring shaft in the same region that faces at least the predetermined region.

This configuration can shorten the length of the rotary/linear motion converter along the axis of rotation as compared with the case where the helical planetary gears and the screw planetary gears are provided on the planetary shafts in respective different regions extending along the axis of rotation of the planetary shaft, and thus the helical ring gear and the screw ring gear are provided on the ring shaft in respective different regions.

The above configuration may be such that two helical sun gears meshing with the helical planetary gears are provided on the sun shaft in two respective regions that face opposite end portions of the predetermined region.

This configuration can establish reliable meshing between the helical planetary gears and the helical sun gears and can ensure smooth operation of the rotary/linear motion converter as compared with the case where a single helical sun gear meshing with the helical planetary gears is provided on the sun shaft in a single region that faces one of the opposite end portions of the predetermined region.

The above-mentioned configurations may be such that: the helical planetary gears and the screw planetary gears are provided on the planetary shafts in the same predetermined region extending along the axis of rotation; the helical sun gear and the screw sun gear are provided on the sun shaft in the same region that faces at least the predetermined region; and the helical ring gear and the screw ring gear are provided on the ring shaft in the same region that faces at least the predetermined region.

This configuration can shorten the length of the rotary/linear motion converter along the axis of rotation as compared with the case where at least the helical planetary gears and the screw planetary gears, or the helical sun gear and the screw sun gear, or the helical ring gear and the screw ring gear are provided in respective different regions extending along the axis of rotation.

The above-mentioned configurations may be such that the first planetary gear mechanism and the second planetary gear mechanism are provided in respective different regions extending along the axis of rotation.

This configuration allows easy low-cost formation of the gears of the first and second planetary gear mechanisms, as compared with the case where the first and second planetary gear mechanisms are provided in the same region along the axis of rotation.

The above-mentioned configuration may be such that: the gear ratio of the screw sun gear to the screw planetary gears differs from the gear ratio of the helical ring gear to the helical planetary gears, and motion conversion is performed between a rotary motion of the ring shaft and a linear motion of the sun shaft.

The above-mentioned configuration may be such that: the gear ratio of the screw ring gear to the screw planetary gears differs from the gear ratio of the helical sun gear to the helical planetary gears, and motion conversion is performed between a rotary motion of the sun shaft and a linear motion of the ring shaft.

The above-mentioned configuration may be such that, if the sum of an addendum modification coefficient Xnp of the helical planetary gears and an addendum modification coefficient Xns of the helical sun gear as calculated when the sun shaft performs linear motion along the axis of rotation is Xnps, the addendum modification coefficient Xnp of the helical planetary gears and the addendum modification coefficient Xns of the helical sun gear are set to respective values that are obtained by internally dividing the addendum-modification-coefficient sum Xnps by the number of teeth Zp of each helical planetary gear and the number of teeth Zs of the helical sun gear in accordance with the following Formula 1 and Formula 2, respectively.

$$Xnp = XnpsZp/(Zp+Zs) \quad (1)$$

$$Xns = XnpsZs/(Zp+Zs) \quad (2)$$

The above-mentioned configuration may be such that, if the sum of an addendum modification coefficient Xnp of the helical planetary gears and an addendum modification coefficient Xnn of the helical ring gear as calculated when the ring shaft performs linear motion along the axis of rotation is Xnpn, the addendum modification coefficient Xnp of the helical planetary gears and the addendum modification coefficient Xnn of the helical ring gear are set to respective values that are obtained by internally dividing the addendum-modification-coefficient sum Xnpn by the number of teeth Zp of each helical planetary gear and the number of teeth Zn of the helical ring gear in accordance with the following Formula 3 and Formula 4, respectively.

$$Xnp = XnpnZp/(Zp+Zn) \quad (3)$$

$$Xnn = XnpnZn/(Zp+Zn) \quad (4)$$

The above-mentioned configuration may be such that the planetary shafts are supported at their opposite end portions by a pair of respective carrier members extending annularly around the sun shaft in such a manner as to be rotatable about their axes and revolvable around the sun shaft and along the ring shaft.

The above-mentioned configuration may be such that the paired carrier members are united together by means of a plurality of connection members disposed around the axis of rotation and extending along the axis of rotation.

The above-mentioned configuration may be such that: opposite end portions of the planetary shafts each have a conical surface, and the paired carrier members have conical surfaces that receive the respective conical surfaces of opposite end portions of the planetary shafts.

The above-mentioned configuration may be such that: the conical surfaces of the paired carrier members each have a region whose fanning-out angle is greater than that of the conical surfaces of opposite end portions of the planetary shafts, and a region whose fanning-out angle is smaller than that of the conical surfaces of opposite end portions of the planetary shafts, and the conical surfaces of the paired carrier members support, at ridge portions between the two regions, the conical surfaces of opposite portions of the planetary shafts.

The above-mentioned configuration may be such that a bearing is provided on each of axially opposite sides with respect to the planetary shafts for smooth relative rotation between the sun shaft and the ring shaft while allowing a relative linear motion between the sun shaft and the ring shaft.

The above-mentioned configuration may be such that the planetary shafts each have, in the aforementioned predetermined region, a dual-teeth portion that functions both as a helical planetary gear and as a screw planetary gear.

The above-mentioned configuration may be such that a pair of helical ring gears are fixed on the inner surface of the ring shaft through press fitting.

The above-mentioned configuration may be such that: the planetary shafts each have, in the aforementioned predetermined region, a dual-teeth portion that functions both as a helical planetary gear and as a screw planetary gear, and the ring shaft has a dual-teeth portion that functions both as a helical ring gear and as a screw ring gear, in a region that faces at least the predetermined region.

The above-mentioned configuration may be such that a pair of helical sun gears are fixed on the outer surface of the sun shaft through press fitting.

The above-mentioned configuration may be such that: the planetary shafts each have, in the aforementioned predetermined region, a dual-teeth portion that functions both as a helical planetary gear and as a screw planetary gear; the sun shaft has a dual-teeth portion that functions both as a helical sun gear and as a screw sun gear, in a region that faces at least the predetermined region; and the ring shaft has a dual-teeth portion that functions both as a helical ring gear and as a screw ring gear, in a region that faces at least the predetermined region.

In the above-mentioned configuration, the ring shaft may be formed by the steps of forming a flat plate having a dual-teeth portion on one side thereof; forming the flat plate into a cylindrical shape such that the dual-teeth portion comes to the inside; and joining butt end portions together.

In the above-mentioned configuration, the planetary shafts may be formed by rolling.

[Operation Principle]

The rotary/linear motion converter of the present invention can be applied to both of a conventional motion conversion that employs meshing of screw gears through threads of the same helical direction and a conventional motion conversion that employs meshing of screw gears through threads of opposite helical directions. Accordingly, an operation principle common for the motion conversion that employs meshing of screw gears through threads of the same helical direction and the motion conversion that employs meshing of screw gears through threads of opposite helical directions will be described.

(1) Relationship between Gear Ratio and Pitch Circle Diameter

Screw gears are also arranged for meshing such that their axes are in parallel with each other, and mesh with each other on a plane perpendicular to the axes. The number of teeth of a screw gear is identical with the number of threads of a so-called screw and a worm gear.

For screw gears and helical gears on the sun shaft, the planetary shafts, and the ring shaft, the number of teeth and the reference pitch circle diameter are defined below in Table 1.

TABLE 1

|  | Screw gears | | Helical gears | |
| --- | --- | --- | --- | --- |
|  | Number of teeth | Reference pitch dia. | Number of teeth | Reference pitch dia. |
| Sun shaft | Zss | dss | Zs | ds |
| Planetary shaft | Zps | dps | Zp | dp |
| Ring shaft | Zns | dns | Zn | dn |

In the structure of the present invention, the sun shaft or the ring shaft is displaced relative to the planetary shafts along a thrust direction; i.e., along the axis of rotation. In the case where the sun shaft is displaced relative to the planetary shafts, the gear ratio of the screw sun gear to the screw planetary gears differs from the gear ratio of the helical sun gear to the helical planetary gears. Therefore, the following Formulae 5 and 6 hold.

$$Zns/Zps = Zn/Zp \quad (5)$$

$$Zss/Zps \neq Zs/Zp \quad (6)$$

Each of the screw planetary gears and each of the helical planetary gears rotate concentrically about the common axis of rotation, and revolve externally of the sun gear and internally of the ring gear. Thus, the screw planetary gears and the helical planetary gears have the same radius of revolution; i.e., the same center distance a that is expressed by the following Formula 7.

$$a = dns - dps = dn - dp \quad (7)$$

In the case where the ring shaft is displaced relative to the planetary shafts, the gear ratio of the screw ring gear to the screw planetary gears differs from the gear ratio of the helical ring gear to the helical planetary gears. Therefore, the following Formulae 8 and 9 hold.

$$Zns/Zps \neq Zn/Zp \quad (8)$$

$$Zss/Zps = Zs/Zp \quad (9)$$

Also, in this case, the screw planetary gears and the helical planetary gears revolve externally of the sun gear and internally of the ring gear; thus, the center distance a is expressed by the following Formula 10.

$$a = dss + dps = ds + dp \quad (10)$$

In the rotary/linear motion converter of the present invention, as expressed by the above Formulae 5 and 6 or the above Formulae 8 and 9, the gear ratio of the sun gear to the planetary gear or the gear ratio of the ring gear to the planetary gear differs between the first planetary gear mechanism and the second planetary gear mechanism. Accordingly, a difference in angle of rotation attempts to arise between the gears of the first planetary gear mechanism and the corresponding gears of the second planetary gear mechanism. This difference in angle of rotation corresponds to the difference between the gear ratios. However, since the gears of the first planetary gear mechanism and the corresponding gears of the second planetary gear mechanism are integral with one another, the difference in angle of rotation cannot arise. Therefore, the sun shaft or the ring shaft is displaced in the axial direction relative to the other in such a manner as to absorb the difference in angle of rotation. In this case, the shaft that is displaced in the axial direction is associated with the sun gear or the ring gear whose gear ratio to the planetary gear differs between the first planetary gear mechanism and the second planetary gear mechanism. Specifically, in the case where the gear ratio of the screw sun gear to the screw planetary gears differs from the gear ratio of the helical sun gear to the helical planetary gear, the sun shaft is displaced relative to the ring shaft. In the case where the gear ratio of the screw ring gear to the screw planetary gears differs from the gear ratio of the helical ring gear to the helical planetary gears, the ring shaft is displaced relative to the sun shaft.

In other words, the rotary/linear motion converter of the present invention utilizes the difference in angle of rotation that arises when the gear ratio of the sun gear or the ring gear to the planetary gear differs between two kinds of planetary gear mechanisms, for performing motion conversion. That is, in the rotary/linear motion converter of the present invention, helix angle present on the screw gears effects an axial displacement corresponding to a difference in angle of rotation. The axial displacement; i.e., an advancing amount, increases with the magnitude of a difference in gear ratio and with the magnitude of a pitch of the screw gear.

(2) Advancing Amount

In the rotary/linear motion converter of the present invention, if the number of teeth of the screw gear and the number of teeth of the helical gear are as shown above in Table 1, and the axial pitch of the screw gear is P, the advancing amount Lj of a shaft that is displaced in the axial direction is expressed by the following Formula 11.

$$Lj=P\cdot(Zs\cdot Zns-Zss\cdot Zn)/(Zs+Zn) \qquad (11)$$

The advancing amount Lj is the same regardless of whether a shaft that is displaced in the axial direction is the sun shaft or the ring shaft. Thus, derivation of above Formula 11 will be described for the case where the sun shaft is displaced relative to the ring shaft.

In the case of an ordinary planetary gear mechanism of helical gears, rotation of the sun gear and rotation of the planetary gears which are effected through transmission of rotation are of opposite directions; thus, a helix angle of the sun gear and a helix angle of the planetary gear are of opposite directions. In this connection, when the planetary gears in the form of screw gears and the sun gear in the form of a screw gear are of opposite helical directions, the number of teeth of the sun gear is taken as a positive value; and, when the planetary gears in the form of screw gears and the sun gear in the form of a screw gear are of the same helical direction, the number of teeth of the sun gear is taken as a negative value. That is, meshing of screw gears through threads of opposite helical directions is associated with a positive sign, and meshing of screw gears through threads of the same helical direction is associated with a negative sign.

When one relative rotation is given between the sun shaft and the ring shaft, the angle of revolution of the helical planetary gears is uniquely determined by meshing of the helical gears; specifically, Zs/(Zs+Zn) relative to the helical sun gear. The angle of revolution of the screw planetary gears is Zss/(Zss+Zns). However, the screw planetary gears can be displaced in the axial direction, and the angle of revolution of the screw planetary gears is restrained by the angle of revolution associated with meshing of the helical gears. Accordingly, the sun shaft is displaced in the axial direction by a difference between the angles of revolution; i.e., a difference in angle of revolution.

The difference in angle of revolution is expressed by Zs/(Zs+Zn)−Zss/(Zss+Zns) and is equivalent, for the screw gears, to a relative rotation between the sun shaft and the ring shaft expressed by the following Formula 12.

$$\{Zs/(Zs+Zn)-Zss/(Zss+Zns)\}/\{Zss/(Zss+Zns)\} \qquad (12)$$

Above Formula 12 indicative of a relative rotation between the sun shaft and the ring shaft is reduced to the following Formula 13. Thus, it can be contemplated that only the sun shaft rotates more by an extra angle of rotation expressed by the following Formula 13 and thus undergoes relative displacement in the axial direction.

$$(Zs\cdot Zns-Zss\cdot Zn)/\{Zss\cdot(Zs+Zn)\} \qquad (13)$$

Accordingly, the relative displacement is expressed by the following Formula 14. By reducing Formula 14, the advancing amount Lj is obtained as expressed by Formula 11. In the case where the ring shaft is displaced relative to the sun shaft, Zns replaces Zss in the above Formulas. However, the advancing amount Lj of the ring shaft is as expressed by Formula 11 above.

$$Zss\cdot P\cdot(Zs\cdot Zns-Zss\cdot Zn)/\{Zss\cdot(Zs+Zn)\} \qquad (14)$$

As will be understood from above Formula 11, the advancing amount Lj depends only on the number of teeth of the screw gear and the number of teeth and pitch of the helical gear. In other words, the advancing amount in the rotary/linear motion converter of the present invention is not related to a difference in the number of threads and a difference in a helix angle as in the case of the conventional rotary/linear motion converters which have been described in the BACKGROUND ART section. The rotary/linear motion converter of the present invention differs completely in operation principle from the conventional motion converters.

(3) Feasible Number of Planetary Shafts

As is well known, a feasible number of planetary gears in a general planetary gear mechanism is a divisor of the sum of the number of teeth of the sun gear and the number of teeth of the ring gear. Thus, the number of the planetary shafts in the rotary/linear motion converter of the present invention is a divisor common between "divisors of the sum of the number of teeth (number of threads) of the screw sun gear and the number of teeth (number of threads) of the screw ring gear" and "divisors of the sum of the number of teeth of the helical sun gear and the number of teeth of the helical ring gear." Generally, the number of teeth (number of threads) of a screw gear is smaller than the number of teeth of a helical gear. Therefore, divisors of the sum of the number of teeth of the screw sun gear and the number of teeth of the screw ring gear determine the feasible number of the planetary shafts.

(4) Reference Number of Teeth, Base Gear Ratio, and Tooth number Difference

In description of the structure and operations of the rotary/linear motion converter of the present invention, it is useful to define "reference number of teeth," "base gear ratio," and "tooth number difference" and to use these concepts. These terms will next be described.

(4-1) Reference Number of Teeth

In a general planetary gear mechanism, a reference pitch circle diameter ds of the sun gear, a reference pitch circle diameter dp of the planetary gears, and a reference pitch circle diameter dn of the ring gear have a relationship expressed by the following Formula 15. Also, the number of teeth Zs of the sun gear, the number of teeth Zp of the planetary gear, and the number of teeth Zn of the ring gear have a relationship expressed by the following Formula 16.

$$dn=ds+2\cdot dp \qquad (15)$$

$$Zn=Zs+2\cdot Zp \qquad (16)$$

Since the gears must have the same module, the reference pitch circle diameters ds, dp, and dn and the numbers of teeth Zs, Zp, and Zn have a relationship expressed by the following Formula 17.

$$dn/Zn=ds/Zs=dp/Zp \qquad (17)$$

The rotary/linear motion converter of the present invention is characterized in that the above-mentioned relationships with respect to either of the sun gear and the ring gear are modified with respect to one or both of two kinds of gears; i.e., with respect to the screw gear and/or the helical gear.

The number of teeth of the sun gear, the number of teeth of the planetary gear, and the number of teeth of the ring gear that satisfy the above-mentioned three relationships (above Formulae 15 to 17) are defined as the "reference number of teeth."

(4-2) Base Gear Ratio

If the reference number of teeth of the helical sun gear, the reference number of teeth of each helical planetary gear, and the reference number of teeth of the helical ring gear, which satisfy the above-described three relations, are Zsk, Zpk, and Znk, respectively, and if the reference number of teeth of the screw sun gear, the reference number of teeth of each screw planetary gear, and the reference number of teeth of the screw ring gear are Zssk, Zpsk, and Znsk, respectively, a gear ratio K between the reference number of teeth of the sun gear and the reference number of teeth of the planetary gear as expressed below by Formula 18 is defined as the "base gear ratio."

$$K=Zsk/Zpk=Zssk/Zpsk \quad (18)$$

(4-3) Tooth Number Difference

The difference between the number of teeth of each gear and the corresponding above-mentioned reference number of teeth of the gear is defined as the "tooth number difference" of the gear. In the rotary/linear motion converter of the present invention, one or both of two kinds of gears with respect to either of the sun gear and the ring gear; i.e., the screw sun gear and/or the helical sun gear, or the screw ring gear and/or the helical ring gear, has a non-zero tooth number difference.

(5) Motion Conversion Efficiency

The rotary/linear motion converter converts a rotary motion to and from a linear motion. Efficiency in conversion of a rotary motion to a linear motion is called forward efficiency, whereas efficiency in conversion of a linear motion to a rotary motion is called backward efficiency.

(5-1) Backward Efficiency

The rotary/linear motion converter of the present invention has meshing of screw gears. Therefore, when a force along the axis of rotation acts between the sun shaft and the ring shaft, the screw planetary gears receive a force associated with contact of tooth flanks from the screw sun gear and from the screw ring gear. A force along the axis of rotation which the screw planetary gears receive from the screw sun gear is taken as F, and the force F will next be discussed.

The lead angle of the screw sun gear is represented by θs is assumed to be positive when the helix angle of the screw planetary gears and the helix angle of the screw sun gear are of opposite directions.

The force F may be considered to be resolved, on the tooth flank of the screw sun gear, into a force perpendicular to the tooth flank and a force along the tooth flank. The force perpendicular to the tooth flank generates a friction force. The friction force weakens the force along the tooth flank. If the friction coefficient along the tooth flank is μ, a force Fsh that is generated along the tooth flank of the screw sun gear is expressed by the following Formula 19.

$$Fsh=F\cdot\{\sin(\theta s)-\mu\cdot\cos(\theta s)\} \quad (19)$$

The force Fsh is converted into a force Fsph along the tooth flank of the screw planetary gear. When the lead angle of the screw planetary gears is represented by θp, the force Fsph is expressed by the following Formula 20.

$$Fsph=F\cdot\{\sin(\theta s)-\mu\cdot\cos(\theta s)\}\cdot\cos(\theta s-\theta p) \quad (20)$$

When the force Fsph is converted into a force along the direction of rotation of the screw planetary gear; i.e., into a force along a section (which faces the front direction) perpendicular to the axis, the force Fs converted from the force Fsph is expressed by the following Formula 21.

$$Fs=F\cdot\{\sin(\theta s)-\mu\cdot\cos(\theta s)\}\cdot\cos(\theta s-\theta p)\cdot\cos(\theta p) \quad (21)$$

Similarly, a force Fn along the direction of rotation which the screw planetary gears receive from the screw ring gear is expressed by the following Formula 22.

$$Fn=F\cdot\{\sin(\theta n)-\mu\cdot\cos(\theta n)\}\cdot\cos(\theta n-\theta p)\cdot\cos(\theta p) \quad (22)$$

Therefore, a force that is applied to the screw planetary gears in association with the axial force F is the force Fs from the screw sun gear and the force Fn from the screw ring gear. In the case where the screw planetary gears and the screw sun gear have respective helix angles of different directions, the forces Fs and Fn are generated along the same circumferential direction around the screw sun gear.

The force Fs from the screw sun gear and the force Fn from the screw ring gear act on the screw planetary gears in the form of two forces. One of the two forces is a rotating force to rotate the screw planetary gears about their axes, and the other force is a revolving force to revolve the screw planetary gears. If the rotating force is Fpj, and the revolving force is Fpk, these forces Fpj and Fpk are expressed by the following Formulae 23 and 24.

$$Fpj=Fs-Fn \quad (23)$$

$$Fpk=Fs+Fn \quad (24)$$

If Fpj>0, the screw planetary gears overcome a friction force and rotate, and the backward efficiency assumes a positive value. Accordingly, when a force along the axis of rotation acts between the sun shaft and the ring shaft, the sun shaft or the ring shaft rotates relative to the other. By contrast, if Fpj≦0, the screw planetary gears do not rotate, and the backward efficiency assumes 0. Accordingly, even when a force along the axis of rotation acts between the sun shaft and the ring shaft, the sun shaft and the ring shaft do not rotate relative to each other. Backward efficiency ηn is expressed by the following Formula 25.

$$\eta n=2\cdot\pi\cdot Fpj\cdot dns/(F\cdot Lj) \quad (25)$$

Next, a force that rotates the planetary shafts will be described for a sun-shaft displacement type in which the sun shaft performs linear motion when a relative rotational force acts between the sun shaft and the ring shaft and a ring-shaft displacement type in which the ring shaft performs linear motion when a relative rotational force acts between the sun shaft and the ring shaft. In this case, the direction in which the planetary shafts rotate when a force along the axis of rotation acts between the sun shaft and the ring shaft will be called "positive rotational direction."

(5-1-1) Sun-Shaft Displacement Type

A force that rotates the planetary shafts will be described with respect to a case in which the screw sun gear and the screw planetary gears mesh with each other through threads of the same helical direction, a case in which the screw sun gear and the screw planetary gears mesh with each other through threads of opposite helical directions with the tooth number difference assuming a positive value, and a case in which the screw sun gear and the screw planetary gears mesh with each other through threads of opposite helical directions with the tooth number difference assuming a negative value.

(5-1-1-1) Meshing through Threads of the Same Helical Direction

In a case where the screw sun gear and the screw planetary gears mesh with each other through threads of the same helical direction, the rotating force Fpj assumes a positive value, and the planetary shafts rotate. That is, in a case where a force along the axis of rotation acts between the sun shaft and the ring shaft, a force that is applied from the screw sun gear to the screw planetary gears and a force that is applied from the screw ring gear to the screw planetary gears are of the same direction along the direction of rotation, and the planetary shafts rotate in the positive rotational direction.

Accordingly, the backward efficiency Tin falls within a range represented by 1>ηn≧0 as in the case of forward efficiency, except for a case where a friction force hinders rotation of the planetary shafts such as a case where the lead angle of the screw gears is excessively small.

(5-1-1-2) Meshing through Threads of Opposite Helical Directions (Tooth Number Difference >0)

This is a case where the helix angle of the screw sun gear and the helix angle of the screw planetary gears are of opposite directions, the helix angle of the screw sun gear is greater than the helix angle of the screw planetary gears, and thus the tooth number difference assumes a positive value.

In this case, a force that is applied from the screw sun gear to the screw planetary gears and a force that is applied from the screw ring gear to the screw planetary gears are of opposite directions along the direction of rotation, and the force that is applied from the screw sun gear to the screw planetary gears is greater than the force that is applied from the screw ring gear to the screw planetary gears. Thus, the rotating force Fpj assumes a positive value, but is smaller than that in above 5-1-1-1 Meshing through Threads of the Same Helical Direction.

Accordingly, there arises a case where the planetary shafts do not rotate for the reason of the lead angle of the screw gears and the reason of friction force; i.e., the backward efficiency ηn is 0, or a case where the planetary shafts rotate; i.e., the backward efficiency Tin assumes a small positive value.

(5-1-1-2) Meshing through Threads of Opposite Helical Directions (Tooth number difference <0)

This is a case where the helix angle of the screw sun gear and the helix angle of the screw planetary gears are of opposite directions, the helix angle of the screw sun gear is smaller than the helix angle of the screw planetary gears, and thus the tooth number difference assumes a negative value.

In this case, a force that is applied from the screw sun gear to the screw planetary gears and a force that is applied from the screw ring gear to the screw planetary gears are of opposite directions along the direction of rotation, and the force that is applied from the screw sun gear to the screw planetary gears is smaller than the force that is applied from the screw ring gear to the screw planetary gears. Thus, the rotating force Fpj assumes a negative value, and the planetary shafts do not rotate. Accordingly, the backward efficiency ηn becomes 0 irrespective of the lead angle and a friction force of the screw gears. In other words, in the case where the rotary/linear motion converter of the present invention is used to convert a rotary motion to a linear motion, conversion of a linear motion to a rotary motion, which would otherwise be caused by an external force, can be prevented.

(5-1-2) Ring-Shaft Displacement Type

A force that rotates the planetary shafts will be described with respect to a case in which the screw sun gear and the screw planetary gears mesh with each other through threads of the same helical direction with the tooth number difference assuming a positive value, a case in which the screw sun gear and the screw planetary gears mesh with each other through threads of the same helical direction with the tooth number difference assuming a negative value, and a case in which the screw sun gear and the screw planetary gears mesh with each other through threads of opposite helical directions.

(5-1-2-1) Meshing through Threads of the Same Helical Direction (Tooth Number Difference >0)

In a case where the screw sun gear and the screw planetary gears mesh with each other through threads of the same helical direction with the tooth number difference assuming a positive value, a force that is applied from the screw sun gear to the screw planetary gears and a force that is applied from the screw ring gear to the screw planetary gears are of opposite directions along the direction of rotation, and the force that is applied from the screw sun gear to the screw planetary gears is greater than the force that is applied from the screw ring gear to the screw planetary gears. Thus, the rotating force Fpj assumes a positive value, but is smaller than that in above 5-1-1-1 Meshing through Threads of the Same Helical Direction. Accordingly, the backward efficiency rin is greater than 0 and assumes a value smaller than about 0.4.

(5-1-2-2) Meshing through Threads of the Same Helical Direction (Tooth Number Difference <0)

In a case where the screw sun gear and the screw planetary gears mesh with each other through threads of the same helical direction with the tooth number difference assuming a negative value, a force that is applied from the screw sun gear to the screw planetary gears and a force that is applied from the screw ring gear to the screw planetary gears are of opposite directions along the direction of rotation, and the force that is applied from the screw sun gear to the screw planetary gears is smaller than the force that is applied from the screw ring gear to the screw planetary gears. Thus, as in the case of above 5-1-1-2 Meshing through Threads of Opposite Helical Directions (Tooth number difference <0), the rotating force Fpj assumes a negative value, and the planetary shafts do not rotate. Accordingly, the backward efficiency ηn becomes 0 irrespective of the lead angle and a friction force of the screw gears.

(5-1-2-3) Meshing through Threads of Opposite Helical Directions

In a case where the screw sun gear and the screw planetary gears mesh with each other through threads of opposite helical directions, and a force along the axis of rotation acts between the sun shaft and the ring shaft, a force that is applied from the screw sun gear to the screw planetary gears and a force that is applied from the screw ring gear to the screw planetary gears are of the same direction along the direction of rotation, and the planetary shafts rotate in the positive rotational direction.

Accordingly, as in the case of above 5-1-1-1 Meshing through Threads of the Same Helical Direction, the backward efficiency ηn falls within a range represented by 1>ηn≧0 as in the case of forward efficiency, except for a case where a friction force hinders rotation of the planetary shafts such as a case where the lead angle of the screw gears is excessively small.

(5-2) Forward Efficiency

In the rotary/linear motion converter of the present invention, rotation is transmitted through meshing of the helical gears and meshing of the screw gears. Accordingly, a displacement along the direction of rotation is a rotation that involves specific sliding. The rotary/linear motion converter of the present invention is a planetary gear mechanism having shafts whose axes of rotation are parallel with one another. Since the sun shaft or the ring shaft is displaced in the axial direction relative to the other shaft, an axial displacement is a displacement that involves sliding friction.

Accordingly, if the specific sliding is σ, the rolling coefficient of friction is μk, and the sliding coefficient of friction is μ, the forward efficiency ηa is expressed by the following Formula 26.

$$\eta a = 1 - (\mu k + \mu \cdot \sigma + \mu) \tag{26}$$

In the case of ordinary meshing of teeth, the specific sliding σ is about 0.1; the rolling coefficient of friction μk is about 0.01 for oil lubrication; and the sliding coefficient of friction μ is about 0.1 for oil lubrication. Thus, the general forward efficiency ηa of the rotary/linear motion converter of the present invention is as expressed by the following Formula 27. If the converter is ideally designed, a high forward efficiency of about 88% can be achieved.

$$\eta a = 1-(0.01+0.1\cdot 0.1+0.1)=0.88 \tag{27}$$

FIGS. 26A and 26B summarizes the above-mentioned efficiency of the rotary/linear motion converter with respect to the sun-shaft displacement type and the ring-shaft displacement type. In FIGS. 26A and 26B, symbol o indicates a general efficiency, and an arrow with arrow-heads on opposite ends indicates a feasible range of efficiency.

(6) Preferred Relationship Between the Number of Planetary Shafts and the Number of Teeth of Helical Planetary Gear The rotary/linear motion converter of the present invention is preferably such that the centers of rotation of the sun shaft, the planetary shafts, and the ring shaft are free from runout and such that a plurality of the helical planetary gears ceaselessly mesh with the helical sun gear and with the helical ring gear, which is particularly important when the helical gears assume the form of spur gears. To that end, the preferable relationship between the number of the planetary shafts and the number of teeth of each helical planetary gear "the number of the planetary shafts is not a divisor of the number of teeth of each helical planetary gear (the number of the planetary shafts and the number of teeth of each helical planetary gear have no common divisor other than 1)" must be established. When this requirement is satisfied, the helical planetary gears differ from one another in the phase of meshing with the helical sun gear and in the phase of meshing with the helical ring gear; thus, by virtue of overlapping of meshing of the helical gears, smooth transmission of rotation at high contact ratio can be ensured.

In the present application, the "helical sun gear," the "helical planetary gear," and the "helical ring gear" are called generally the "helical gears," and the "screw sun gear," the "screw planetary gears," and the "screw ring gear" are called generally the "screw gears." The "helical gears" have a helix angle of tooth of 25° or less so that the helical sun gear, the helical planetary gears, and the helical ring gear can constitute a planetary gear mechanism through mutual meshing. The "helical gears" include gears which have a helix angle of tooth of 0°; i.e., spur gears. The "screw gears" are gears which assume the form of worm gears and have teeth extending helically around their axes and in which the helix angle is greater than the lead angle.

BRIEF DESCRIPTION OF THE DRAWINGS

FIG. 1A is a sectional view taken along the axis of rotation, showing a first embodiment of a planetary rotary/linear motion converter according to the present invention, the converter being configured so as to convert a rotary motion of a ring shaft into a linear motion of a sun shaft; FIG. 1B is a sectional view taken perpendicularly to the axis of rotation; and FIG. 1C is a right-hand side view showing an essential portion of the sun shaft.

FIG. 2A is a sectional view taken along the axis of rotation, showing a second embodiment of a planetary rotary/linear motion converter according to the present invention, the converter being configured so as to convert a rotary motion of the ring shaft into a linear motion of the sun shaft; FIG. 2B is a sectional view taken perpendicularly to the axis of rotation; and FIG. 2C is a right-hand side view showing an essential portion of the sun shaft.

FIG. 5A is a sectional view taken along the axis of rotation, showing a fifth embodiment of a planetary rotary/linear motion converter according to the present invention, the converter being configured so as to convert a rotary motion of the ring shaft into a linear motion of the sun shaft; FIG. 5B is a sectional view taken perpendicularly to the axis of rotation; and FIG. 5C is a right-hand side view showing an essential portion of the sun shaft.

FIGS. 8A and 8B are a sectional view taken along the axis of rotation and a sectional view taken perpendicularly to the axis of rotation, respectively, showing an eighth embodiment of a planetary rotary/linear motion converter according to the present invention, the converter being configured so as to convert a rotary motion of the sun shaft into a linear motion of the ring shaft.

FIGS. 9A and 9B are respectively a sectional view taken along the axis of rotation, showing a ninth embodiment of a planetary rotary/linear motion converter according to the present invention, the converter being a modification of the second embodiment, and a right-hand side view showing an essential portion of the sun shaft.

FIGS. 10A and 10B are respectively a sectional view taken along the axis of rotation, showing a tenth embodiment of a planetary rotary/linear motion converter according to the present invention, the converter being a modification of the ninth embodiment, and a right-hand side view showing an essential portion of the sun shaft.

FIG. 13A is a sectional view taken along the axis of rotation, showing a thirteenth embodiment of a planetary rotary/linear motion converter according to the present invention, the converter being configured so as to convert a rotary motion of the ring shaft into a linear motion of the sun shaft; FIG. 13B is a sectional view taken perpendicularly to the axis of rotation; and FIG. 13C is a sectional view taken along the axis of rotation, showing the ring shaft.

FIGS. 15A and 15B are a sectional view taken along the axis of rotation and a sectional view taken perpendicularly to the axis of rotation, respectively, showing a fifteenth embodiment of a planetary rotary/linear motion converter according to the present invention, the converter being configured so as to convert a rotary motion of the sun shaft into a linear motion of the ring shaft.

BEST MODE FOR CARRYING OUT THE INVENTION

Figure 3C:
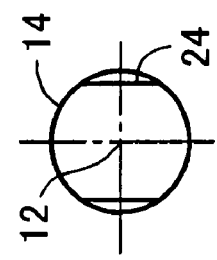
FIG. 3C is a right-hand side view showing an essential portion of the sun shaft.

Preferred embodiments of the present invention will next be described in detail with reference to the drawings.

First Embodiment

FIGS. 1A to 1C show a first embodiment of a planetary rotary/linear motion converter according to the present invention, the converter being configured so as to convert a rotary motion of a ring shaft into a linear motion of a sun shaft. Particularly, FIG. 1A is a sectional view showing the first embodiment as viewed on a section taken along the axis of rotation; FIG. 1B is a hatching-omitted sectional view showing a first planetary gear mechanism of the first embodiment composed of spur gears as viewed on a section taken perpendicularly to the axis of rotation; and FIG. 1C is a right-hand side view showing an essential portion of the sun shaft of the first embodiment.

In FIGS. 1A to 1C, reference numeral 10 denotes a planetary rotary/linear motion converter. The rotary/linear motion converter 10 has a sun shaft 14 and a ring shaft 16, which extend along a common axis of rotation 12 and mate with each other, and four planetary shafts 20, which are disposed between the sun shaft 14 and the ring shaft 16 and extend along respective axes of rotation 18 in parallel with the axis of rotation 12. The planetary shafts 20 are equally spaced at angular intervals of 90° around the axis of rotation 12.

An annular sun gear member 22 is fixed, through press fitting or the like, to an inner end portion (left end portion in FIG. 1A) of the sun shaft 14. The sun gear member 22 has external spur-gear teeth. An outer end portion (right end portion in FIG. 1A) of the sun shaft 14 has two parallel plane portions 24 in parallel with the axis of rotation 12. The sun shaft 14 is connected to another member not shown in FIG. 1 via the two plane portions 24 in such a manner as to be nonrotatable relative to the other and to be able to reciprocate. The sun shaft 14 has triple-flight external thread 26 at a central portion thereof. The sun gear member 22 and the external thread 26 are spaced apart from each other along the axis of rotation 12.

Each planetary shaft 20 has an external spur gear 28 meshing with the sun gear member 22, and a single-flight external thread 30 mating with the external thread 26. The external gear 28 and the external thread 30 are spaced apart from each other along the axis of rotation 18. The external gear 28 is longer in axial length than the sun gear member 22, so that, even when the sun shaft 14 is displaced relative to the planetary shafts 20 and the ring shaft 16 along the axis of rotation 12, the external gears 28 maintain meshing with the sun gear member 22.

The planetary shafts 20 are supported at opposite ends by carrier members 32 and 34 each resembling an annular plate, in such a manner as to be rotatable about the respective axes of rotation 18. Antifriction rings 36 are disposed between the outer circumferential surface of each of the carrier members 32 and 34 and the inner surface of the ring shaft 16, whereby the carrier members 32 and 34 can freely rotate relative to the ring shaft 16 about the axis of rotation 12. C-rings 38 and 40 are fixed to the inner surface of the ring shaft 16. The carrier members 32 and 34 are held in the axial direction between stepped portions formed on the inner surface of the ring shaft 16 and the C-rings 38 and 40, respectively. The carrier members 32 and 34 have an inside diameter greater than the outside diameter of the sun gear member 22 and the diameter of the sun shaft 14, whereby the sun gear member 22 and the sun shaft 14 can be displaced relative to the carrier members 32 and 34 along the axis of rotation 12.

A ring gear member 42 meshing with the external gears 28 of the planetary shafts 20 is fixed, through press fitting or the like, to a portion of the inner surface of the ring shaft 16 which is located between the two stepped portions; i.e., to the inner surface of a small-diameter portion of the ring shaft 16. The ring gear member 42 has internal spur-gear teeth. Also, the inner surface of the small-diameter portion of the ring shaft 16 has a quintuple-start internal thread 44 mating with the external threads 30 of the planetary shafts 20. The ring gear member 42 and the internal thread 44 are spaced apart from each other along the axis of rotation 18.

As will be understood from the above description, the sun gear member 22, the external gears 28, and the ring gear member 42 cooperatively constitute a first planetary gear mechanism and function as a helical sun gear, helical planetary gears, and a helical ring gear, respectively. The external thread 26, the external threads 30, and the internal thread 44 cooperatively constitute a second planetary gear mechanism and function as a screw sun gear, screw planetary gears, and a screw ring gear, respectively.

The external thread 26, the external threads 30, and the internal thread 44, which function as respective screw gears, mate with each other; the helix angle of the external thread 26 and the helix angle of the external thread 30 are of opposite directions; and the helix angle of the external thread 30 and the helix angle of the internal thread 44 are of the same direction. The external thread 26, the external threads 30, and the internal thread 44 have the same pitch, the same pressure angle, and the same module. In the rotary/linear motion converter 10 of the first embodiment, the number of threads of the external thread 26, the number of threads of the external thread 30, and the number of threads of the internal thread 44; in other words, as viewed on a section perpendicular to the axes of rotation 12 and 18, the number of teeth of the external thread 26, the number of teeth of the external thread 30, and the number of teeth of the internal thread 44, are 3, 1, and 5, respectively. Accordingly, the tooth number difference is 0.

Next, the sun gear member 22, the external gears 28, and the ring gear member 42, which function as respective helical gears, will be described. Generally, a gear ratio between spur gears cannot greatly differ from a reference-pitch-diameter ratio between screw gears. That is, the relationship between the reference-pitch-diameter ratio between screw gears and the gear ratio between spur gears can be modified to a certain degree through addendum modification of the gears. However, a large addendum modification cannot be implemented unless the spur gears have a considerably large tooth depth. In practice, the deviation of the gear ratio between spur gears from the reference-pitch-diameter ratio between screw gears is considered to be limited to within 30%.

In the first embodiment, the external gear 28 of the planetary shaft 20 has nine teeth. The internal thread 44 of the ring shaft 16 has 45 teeth in accordance with the gear ratio 1:5 between the external thread 30 and the internal thread 44 of the screw gears. Since the gear ratio between the external thread 26 and the external thread 30 of the screw gears is 3:1, if the number of teeth of the sun gear member 22 of the sun shaft 14 is set to 27, the gear ratio between the sun gear member 22 and the external gear 28 of the planetary shaft 20 becomes equal to the gear ratio between the external thread 26 and the external thread 30 of the screw gears. Accordingly, in this case, the spur gears and the screw gears have the same gear ratio. Thus, the planetary gear mechanism of the spur gears and the planetary gear mechanism of the screw gears have the same reduction ratio in transmission of rotation. Both planetary gear mechanisms perform only transmission of rotation and cannot convert a rotary motion to a linear motion.

By contrast, in the first embodiment, the number of teeth of the sun gear member 22 of the sun shaft 14 is 31, which differs from 27 that complies with the gear ratio 3:1 between the external thread 26 and the external thread 30 of the screw gears. Therefore, the tooth number difference of the sun gear member 22 is 4, and the gear ratio between the sun gear member 22 and the external gear 28 is 31:9. By virtue of these gear ratios, when the ring shaft 16 is rotated, the sun shaft 14 is displaced relative to the planetary shafts 20 and the ring shaft 16 along the axis of rotation 12 so as to avoid occurrence of a difference in angle of rotation between the sun shaft 14 of the planetary gear mechanism of the spur gears and the sun shaft 14 of the planetary gear mechanism of the screw gears. Thus, a rotary motion of the ring shaft 16 is converted into a linear motion of the sun shaft 14.

Generally, in order that both of the planetary gear mechanism of spur gears and the planetary gear mechanism of screw gears can smoothly perform transmission of rotation, preferably, the planetary gear mechanism of spur gears and the planetary gear mechanism of screw gears have the same reference-pitch-diameter ratio to the greatest possible extent. However, the gear ratio among the sun gear member 22, the external gear 28, and the ring gear member 42 is 31:9:45 and thus differs from the gear ratio 3:1:5 among the external thread 26, the external thread 30, and the internal thread 44.

Thus, in order that the two planetary gear mechanisms have the same reference-pitch-diameter ratio to the greatest possible extent while the tooth number difference in the planetary gear mechanism of spur gears is maintained, the reference pitch circle diameter of the external thread 26, which rotates unitarily with the sun gear member 22 whose tooth number difference is set, is changed from a value that complies with the gear ratio of the planetary gear mechanism of screw gears, so as to bring the reference-pitch-diameter ratio of the planetary gear mechanism of screw gears close to the gear ratio of the planetary gear mechanism of spur gears to the greatest possible extent.

Specifically, if reference pitch circle diameters of the external thread 26, the external thread 30, and the internal thread 44 which correspond to the gear ratio of the planetary gear mechanism of screw gears are 10.5, 3.5, and 17.5, respectively, the reference pitch circle diameter of the external thread 30 is incrementally changed to 10.6.

According to conventional technique, a reference-pitch-diameter ratio among screw gears must be equal to a number-of-threads ratio among the screw gears, so that the reference pitch circle diameter of the sun gear cannot be changed singly. However, the rotary/linear motion converter 10 of the present invention is designed to covert a rotary motion into a linear motion by means of a difference between a gear ratio among screw gears and a gear ratio among helical gears (spur gears). Thus, even when the reference pitch circle diameter of the screw sun gear is changed, the amount of a linear motion converted from a rotary motion remains unchanged so long as the screw gears have the same pitch and the same lead angle.

However, when the reference pitch circle diameter of the screw sun gear is changed, meshing of the screw planetary gears and the screw sun gear assumes the form of meshing of screw gears of different lead angles. Therefore, the screw gears of the first embodiment have respective involute profiles, which allow meshing of gears of different lead angles (this is also applied to a second embodiment).

The specifications of the spur gears and the screw gears of the first embodiment are summarized below.
1. Sun-shaft displacement type; the screw sun gear and the screw planetary gears are of threads of opposite helical directions.
2. Base gear ratio K=3
3. Tooth number difference of screw gear=0
4. Tooth number difference of spur gear=4
5. Gear ratio among screw gears (sun:planet:ring)=3:1:5
6. Gear ratio among spur gears (sun:planet:ring)=31:9:45
7. Number of planetary shafts=4
8. Pitch=1
9. Advancing amount=0.263
10. Reference pitch circle diameters (working pitch circle diameters) of screw gears
    sun gear=10.5, planetary gear=3.5, ring gear=17.5

As will be understood from the above description, the first embodiment can convert a rotary motion of the ring shaft 16 into a linear motion of the sun shaft 14 at high forward efficiency and high conversion resolution (ratio of the amount of a rotary motion of the ring shaft 16 to the amount of a linear motion of the sun shaft 14).

The number of teeth of each gear of the first embodiment satisfies the requirement mentioned above in "(3) Feasible Number of Planetary shafts." The number (4) of the planetary shafts 20 and the number of teeth (9) of the external gear 28, which functions as a helical planetary gear, satisfy the requirement mentioned above in "(6) Preferred Relationship between the Number of Planetary shafts and the Number of Teeth of Helical Planetary gear."

As compared with other embodiments, the first embodiment employs a fewer number of the planetary shafts 20. Thus, space between the planetary shafts 20 is sufficiently large for allowing use of a highly rigid cage carrier member configured such that two plate-like carrier members are unitarily connected together by a plurality of connection members disposed between the planetary shafts 20, which will be described later, in place of plate-like carrier members 32 and 34. Also, the configuration of the first embodiment can facilitate assembly of a rotary/linear motion converter which uses an assembling cage jig, which will be described later. This is also applied to fourth and seventh embodiments to be described later.

Second Embodiment

FIGS. 2A to 2C show a second embodiment of a planetary rotary/linear motion converter according to the present invention, the converter being configured so as to convert a rotary motion of a ring shaft into a linear motion of a sun shaft. Particularly, FIG. 2A is a sectional view showing the second embodiment as viewed on a section taken along the axis of rotation; FIG. 2B is a hatching-omitted sectional view showing a first planetary gear mechanism of the second embodiment composed of spur gears as viewed on a section taken perpendicularly to the axis of rotation; and FIG. 2C is a right-hand side view showing an essential portion of the sun shaft of the second embodiment. In FIGS. 2A to 2C, members similar to those appearing in FIGS. 1A to 1C are denoted by the same reference numerals as those appearing in FIGS. 1A to 1C. This is also applied to the drawings of other embodiments to be described later.

The second embodiment is configured in a manner similar to that of the above-described first embodiment except that the tooth number difference of the external thread 26, which functions as a screw sun gear, is set to 1; the tooth number difference of the sun gear member 22, which functions as a helical sun gear, is set to 1; nine planetary shafts 20 are provided; the numbers of teeth of the external thread 26, the external thread 30, and the internal thread 44, which function as a screw sun gear, a screw planetary gear, and a screw ring gear, respectively, are 4, 1, and 5, respectively; the numbers of teeth of the sun gear member 22, the external gear 28, and the ring gear member 42, which function as a helical sun gear, a helical planetary gear, and a helical ring gear, respectively, are 31, 10, and 50, respectively; and the advancing amount of the sun shaft 14 per one rotation of the ring shaft 16 is −0.556. Thus, the second embodiment operates similarly to the first embodiment.

The specifications of the spur gears and the screw gears of the second embodiment are summarized below.
1. Sun-shaft displacement type; the screw sun gear and the screw planetary gears are of threads of opposite helical directions.
2. Base gear ratio K=3
3. Tooth number difference of screw gear=1
4. Tooth number difference of spur gear=1
5. Gear ratio among screw gears (sun:planet:ring)=4:1:5
6. Gear ratio among spur gears (sun:planet:ring)=31:10:50
7. Number of planetary shafts=9
8. Pitch=1
9. Advancing amount=−0.556
10. Reference pitch circle diameters (working pitch circle diameters) of screw gears
    sun gear=10.5, planetary gear=3.5, ring gear=17.5

The number of teeth of each gear of the second embodiment satisfies the requirement mentioned above in "(3) Feasible Number of Planetary shafts." The number (9) of the planetary shafts 20 and the number of teeth (10) of the external gear 28, which functions as a helical planetary gear, satisfy the requirement mentioned above in "(6) Preferred Relationship between the Number of Planetary shafts and the Number of Teeth of Helical Planetary gear."

According to the second embodiment, the direction of a linear motion of the sun shaft 14 in relation to the direction of rotation of the ring shaft 16 can be made reverse to that of the above-described first embodiment. Also, since the second embodiment employs a large number of planetary shafts of 9, the second embodiment exhibits improved withstand load and enables transmission and conversion of higher torque, as compared with the first embodiment.

Third Embodiment

Figure 3A:
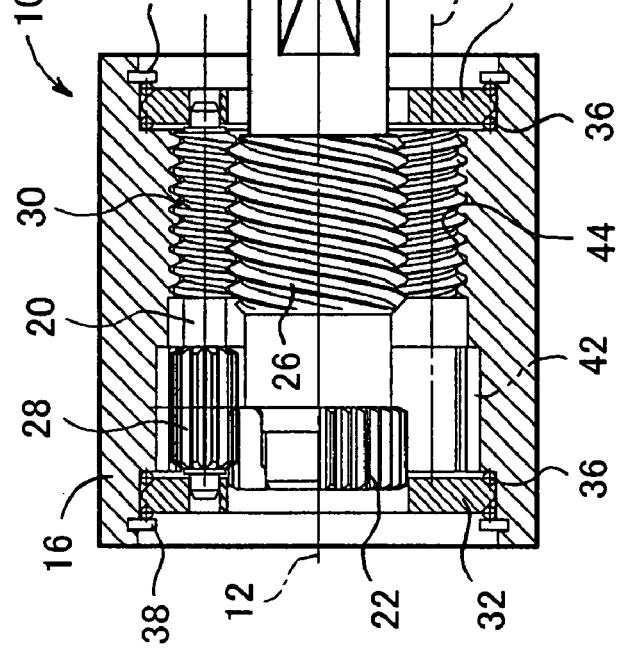
FIG. 3A is a sectional view taken along the axis of rotation, showing a third embodiment of a planetary rotary/linear motion converter according to the present invention, the converter being configured so as to convert a rotary motion of the ring shaft into a linear motion of the sun shaft.
Figure 3B:
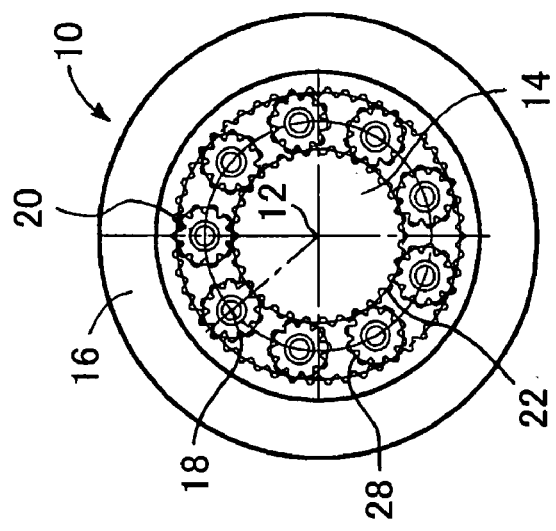
FIG. 3B is a sectional view taken perpendicularly to the axis of rotation.

FIGS. 3A to 3C show a third embodiment of a planetary rotary/linear motion converter according to the present invention, the converter being configured so as to convert a rotary motion of a ring shaft into a linear motion of a sun shaft. Particularly, FIG. 3A is a sectional view showing the third embodiment as viewed on a section taken along the axis of rotation; FIG. 3B is a hatching-omitted sectional view showing a first planetary gear mechanism of the third embodiment composed of spur gears as viewed on a section taken perpendicularly to the axis of rotation; and FIG. 3C is a right-hand side view showing an essential portion of the sun shaft of the third embodiment.

The third embodiment is configured in a manner similar to that of the above-described first embodiment except that the helix angle of the external thread 26, which functions as a screw sun gear, and the helix angle of the external thread 30, which functions as a screw planetary gear, are of the same direction; the tooth number difference of the external thread 26, which functions as a screw sun gear, is set to −8; the tooth number difference of the sun gear member 22, which functions as a helical sun gear, is set to 1; nine planetary shafts 20 are provided; the numbers of teeth of the external thread 26, the external thread 30, and the internal thread 44, which function as a screw sun gear, a screw planetary gear, and a screw ring gear, respectively, are −5, 1, and 5, respectively; the numbers of teeth of the sun gear member 22, the external gear 28, and the ring gear member 42, which function as a helical sun gear, a helical planetary gear, and a helical ring gear, respectively, are 31, 10, and 50, respectively; and the advancing amount of the sun shaft 14 per one rotation of the ring shaft 16 is −5. Thus, the third embodiment operates similarly to the first embodiment.

The specifications of the spur gears and the screw gears of the third embodiment are summarized below.

1. Sun-shaft displacement type; the screw sun gear and the screw planetary gears are of threads of the same helical direction.
2. Base gear ratio K=3
3. Tooth number difference of screw gear=−8
4. Tooth number difference of spur gear=1
5. Gear ratio among screw gears (sun:planet:ring)=−5:1:5
6. Gear ratio among spur gears (sun: planet: ring)=31:10:50
7. Number of planetary shafts=9
8. Pitch=1
9. Advancing amount=−5
10. Reference pitch circle diameters (working pitch circle diameters) of screw gears
    sun gear=10.5, planetary gear=3.5, ring gear=17.5

The number of teeth of each gear of the third embodiment satisfies the requirement mentioned above in "(3) Feasible Number of Planetary shafts." The number (9) of the planetary shafts 20 and the number of teeth (10) of the external gear 28, which functions as a helical planetary gear, satisfy the requirement mentioned above in "(6) Preferred Relationship between the Number of Planetary shafts and the Number of Teeth of Helical Planetary gear."

The third embodiment can exhibit a higher ratio of the amount of a linear motion of the sun shaft 14 to the amount of a rotary motion of the ring shaft 16 as compared with other embodiments; can exhibit high forward efficiency and high backward efficiency; and can convert a linear motion of the sun shaft 14 into a rotary motion of the ring shaft 16 at high efficiency. As in the case of the second embodiment, since the third embodiment employs a large number of planetary shafts of 9, the third embodiment exhibits improved withstand load and enables transmission and conversion of higher torque, as compared with the first embodiment.

Fourth Embodiment

Figures 4A, 4B, 4C:
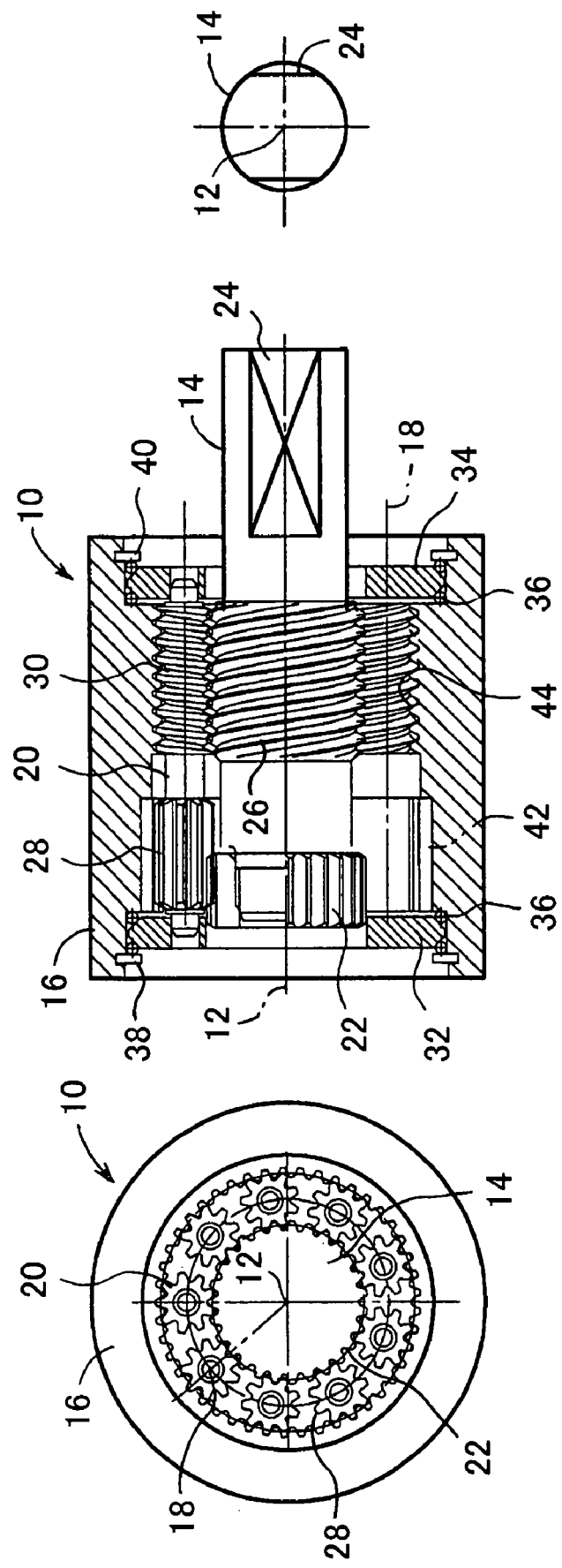
FIG. 4A is a sectional view taken along the axis of rotation, showing a fourth embodiment of a planetary rotary/linear motion converter according to the present invention, the converter being configured so as to convert a rotary motion of the ring shaft into a linear motion of the sun shaft.
FIG. 4B is a sectional view taken perpendicularly to the axis of rotation.
FIG. 4C is a right-hand side view showing an essential portion of the sun shaft.

FIGS. 4A to 4C show a fourth embodiment of a planetary rotary/linear motion converter according to the present invention, the converter being configured so as to convert a rotary motion of a ring shaft into a linear motion of a sun shaft. Particularly, FIG. 4A is a sectional view showing the fourth embodiment as viewed on a section taken along the axis of rotation; FIG. 4B is a hatching-omitted sectional view showing a first planetary gear mechanism of the fourth embodiment composed of spur gears as viewed on a section taken perpendicularly to the axis of rotation; and FIG. 4C is a right-hand side view showing an essential portion of the sun shaft of the fourth embodiment.

The fourth embodiment is configured in a manner similar to that of the above-described first embodiment except that the tooth number difference of the external thread 26, which functions as a screw sun gear, is set to 1; the tooth number difference of the sun gear member 22, which functions as a helical sun gear, is set to 0; nine planetary shafts 20 are provided; the numbers of teeth of the external thread 26, the external thread 30, and the internal thread 44, which function as a screw sun gear, a screw planetary gear, and a screw ring gear, respectively, are 4, 1, and 5, respectively; the numbers of teeth of the sun gear member 22, the external gear 28, and the ring gear member 42, which function as a helical sun gear, a helical planetary gear, and a helical ring gear, respectively, are 27, 9, and 45, respectively; and the advancing amount of the sun shaft 14 per one rotation of the ring shaft 16 is −0.625. Thus, the fourth embodiment operates similarly to the first embodiment.

The specifications of the spur gears and the screw gears of the fourth embodiment are summarized below.

1. Sun-shaft displacement type; the screw sun gear and the screw planetary gears are of threads of opposite helical directions.
2. Base gear ratio K=3
3. Tooth number difference of screw gear=1
4. Tooth number difference of spur gear=0
5. Gear ratio among screw gears (sun:planet:ring)=4:1:5
6. Gear ratio among spur gears (sun:planet:ring)=27:9:45
7. Number of planetary shafts=9
8. Pitch=1
9. Advancing amount=−0.625
10. Reference pitch circle diameters (working pitch circle diameters) of screw gears
    sun gear=10.5, planetary gear=3.5, ring gear=17.5

The number of teeth of each gear of the fourth embodiment satisfies the requirement mentioned above in "(3) Feasible Number of Planetary shafts." However, the number (9) of the planetary shafts 20 and the number of teeth (9) of the external gear 28, which functions as a helical planetary gear, do not satisfy the requirement mentioned above in "(6) Preferred Relationship between the Number of Planetary shafts and the Number of Teeth of Helical Planetary gear."

Accordingly, the external gears 28, which function as helical planetary gears, mesh with the sun gear member 22, which functions as a helical sun gear, with the same phase relative to one another, and mesh with the ring gear member 42, which functions as a helical ring gear, with the same phase relative to one another. Thus, tooth contacts of the external gears 28 are of the same phase. Even though a bottom clearance is provided, tooth contact at the bottom and at the top arise at all times. As a result, fluctuations in transmitted torque (torque ripples) are large, and wear caused by irregular contact or a like problem is apt to arise. In order to maintain a clearance between the bottom of a tooth profile and the top of a tooth profile, the center distance between the planetary shafts must be held constant with high accuracy. Therefore, it is preferable for the fourth embodiment to favorably maintain a positional relationship between the sun shaft 14 and the carrier members 32 and 34 and that between the ring shaft 16 and the carrier members 32 and 34 by means of bearings or the like.

According to the fourth embodiment, the direction of a linear motion of the sun shaft 14 in relation to the direction of rotation of the ring shaft 16 can be made reverse to that of the above-described first embodiment. Also, since the fourth embodiment employs a large number of planetary shafts of 9, the fourth embodiment exhibits improved withstand load and enables transmission and conversion of higher torque, as compared with the first embodiment.

Fifth Embodiment

FIGS. 5A to 5C show a fifth embodiment of a planetary rotary/linear motion converter according to the present invention, the converter being configured so as to convert a rotary motion of a ring shaft into a linear motion of a sun shaft. Particularly, FIG. 5A is a sectional view showing the fifth embodiment as viewed on a section taken along the axis of rotation; FIG. 5B is a hatching-omitted sectional view showing a first planetary gear mechanism of the fifth embodiment composed of spur gears as viewed on a section taken perpendicularly to the axis of rotation; and FIG. 5C is a right-hand side view showing an essential portion of the sun shaft of the fifth embodiment.

The fifth embodiment is configured in a manner similar to that of the above-described first embodiment except that the base gear ratio is set to 4; the tooth number difference of the external thread 26, which functions as a screw sun gear, is set to 1; the tooth number difference of the sun gear member 22, which functions as a helical sun gear, is set to −1; 11 planetary shafts 20 are provided; the numbers of teeth of the external thread 26, the external thread 30, and the internal thread 44, which function as a screw sun gear, a screw planetary gear, and a screw ring gear, respectively, are 5, 1, and 6, respectively; the numbers of teeth of the sun gear member 22, the external gear 28, and the ring gear member 42, which function as a helical sun gear, a helical planetary gear, and a helical ring gear, respectively, are 39, 10, and 60, respectively; and the advancing amount of the sun shaft 14 per one rotation of the ring shaft 16 is −0.667. Thus, the fifth embodiment operates similarly to the first embodiment.

The specifications of the spur gears and the screw gears of the fifth embodiment are summarized below.
1. Sun-shaft displacement type; the screw sun gear and the screw planetary gears are of threads of opposite helical directions.
2. Base gear ratio K=4
3. Tooth number difference of screw gear=1
4. Tooth number difference of spur gear=−1
5. Gear ratio among screw gears (sun:planet:ring)=5:1:6
6. Gear ratio among spur gears (sun:planet:ring)=39:10:60
7. Number of planetary shafts=11
8. Pitch=1
9. Advancing amount=−0.667
10. Reference pitch circle diameters (working pitch circle diameters) of screw gears
   sun gear=10.5, planetary gear=3.5, ring gear=17.5

The number of teeth of each gear of the fifth embodiment satisfies the requirement mentioned above in "(3) Feasible Number of Planetary shafts." The number (11) of the planetary shafts 20 and the number of teeth (10) of the external gear 28, which functions as a helical planetary gear, satisfy the requirement mentioned above in "(6) Preferred Relationship between the Number of Planetary shafts and the Number of Teeth of Helical Planetary gear."

Particularly, the fifth embodiment shows that, even when the diameter of the sun shaft 14 is increased by setting the base gear ratio K to 4, the planetary rotary/linear motion converter of the present invention can be configured. Through increase in the diameter of the sun shaft 14, the number of the planetary shafts 20 can be increased, and the diameter of the planetary shaft can be relatively reduced, whereby the ratio of the diameter of the sun shaft 14 to the outside diameter of the ring shaft 16 can be increased. Accordingly, as compared with other embodiments on condition that the same outside diameter of the ring shaft 16 is employed, the fifth embodiment can enhance the rigidity of the sun shaft 14 through increase in the diameter of the sun shaft 14 and thus can increase transmittable torque. As compared with other embodiments on condition that the same diameter of the sun shaft 14 is employed, the fifth embodiment can reduce the outside diameter of the ring shaft 16 and thus can provide a small-sized planetary rotary/linear converter having high strength.

Sixth Embodiment

Figure 6C:
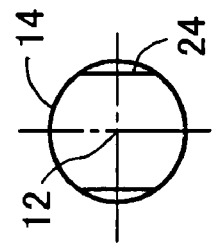
FIG. 6C is a right-hand side view showing an essential portion of the sun shaft.
Figure 6A:
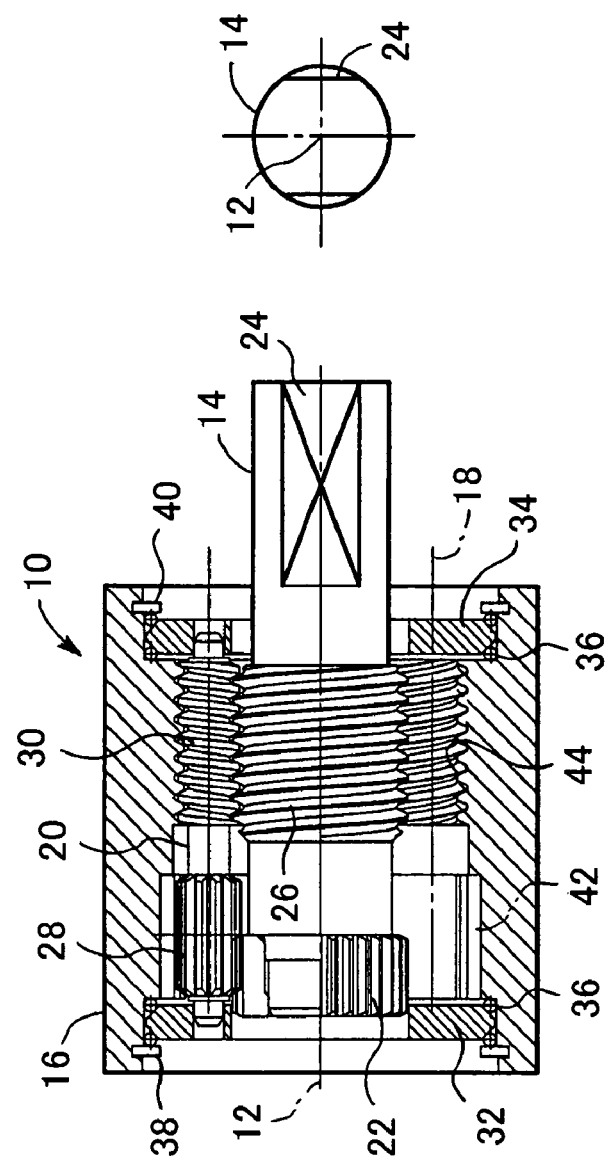
FIG. 6A is a sectional view taken along the axis of rotation, showing a sixth embodiment of a planetary rotary/linear motion converter according to the present invention, the converter being configured so as to convert a rotary motion of the ring shaft into a linear motion of the sun shaft.
Figure 6B:
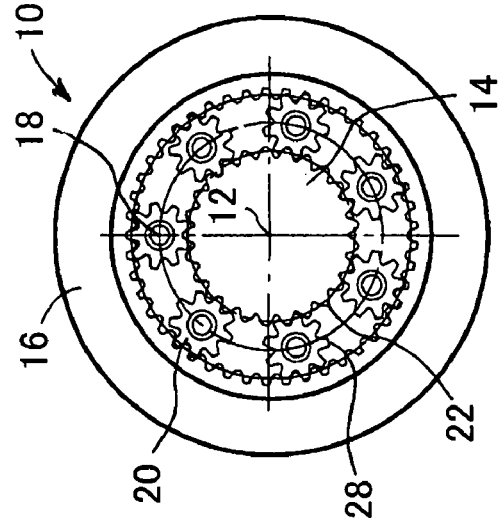
FIG. 6B is a sectional view taken perpendicularly to the axis of rotation.

FIGS. 6A to 6C show a sixth embodiment of a planetary rotary/linear motion converter according to the present invention, the converter being configured so as to convert a rotary motion of a ring shaft into a linear motion of a sun shaft. Particularly, FIG. 6A is a sectional view showing the sixth embodiment as viewed on a section taken along the axis of rotation; FIG. 6B is a hatching-omitted sectional view showing a first planetary gear mechanism of the sixth embodiment composed of spur gears as viewed on a section taken perpendicularly to the axis of rotation; and FIG. 6C is a right-hand side view showing an essential portion of the sun shaft of the sixth embodiment.

The sixth embodiment is configured in a manner similar to that of the above-described first embodiment except that the tooth number difference of the external thread 26, which functions as a screw sun gear, is set to −1; the tooth number difference of the sun gear member 22, which functions as a helical sun gear, is set to −2; seven planetary shafts 20 are provided; the numbers of teeth of the external thread 26, the external thread 30, and the internal thread 44, which function as a screw sun gear, a screw planetary gear, and a screw ring gear, respectively, are 2, 1, and 5, respectively; the numbers of teeth of the sun gear member 22, the external gear 28, and the ring gear member 42, which function as a helical sun gear, a helical planetary gear, and a helical ring gear, respectively, are 25, 9, and 45, respectively; and the advancing amount of the sun shaft 14 per one rotation of the ring shaft 16 is 0.5. Thus, the sixth embodiment operates similarly to the first embodiment.

The specifications of the spur gears and the screw gears of the sixth embodiment are summarized below.
1. Sun-shaft displacement type; the screw sun gear and the screw planetary gears are of threads of opposite helical directions.
2. Base gear ratio K=3
3. Tooth number difference of screw gear=−1
4. Tooth number difference of spur gear=−2
5. Gear ratio among screw gears (sun:planet:ring)=2:1:5
6. Gear ratio among spur gears (sun:planet:ring)=25:9:45
7. Number of planetary shafts=7
8. Pitch=1
9. Advancing amount=0.5
10. Reference pitch circle diameters (working pitch circle diameters) of screw gears
   sun gear=10.5, planetary gear=3.5, ring gear=17.5

The number of teeth of each gear of the sixth embodiment satisfies the requirement mentioned above in "(3) Feasible Number of Planetary shafts." The number (7) of the planetary shafts 20 and the number of teeth (9) of the external gear 28, which functions as a helical planetary gear, satisfy the requirement mentioned above in "(6) Preferred Relationship between the Number of Planetary shafts and the Number of Teeth of Helical Planetary gear."

The structure of the sixth embodiment approximates to the structure disclosed in aforementioned Japanese Patent Application Laid-Open (kokai) No. 10-196757. However, the structure and operation of the sixth embodiment differ from those disclosed in Japanese Patent Application Laid-Open (kokai) No. 10-196757. As in the case of other embodiments, the advancing amount of the sun shaft 14 depends only on the number of teeth of the screw gear, a gear ratio among the helical gears, and the pitch of the helical gear. Even though the structure of the sixth embodiment employs the same number of threads of the screw gear as in the case of the structure disclosed in Japanese Patent Application Laid-Open (kokai) No. 10-196757, the advancing amount of the sun shaft 14 differs from that of the structure disclosed in that Laid-Open document.

Seventh Embodiment

Figure 7C:
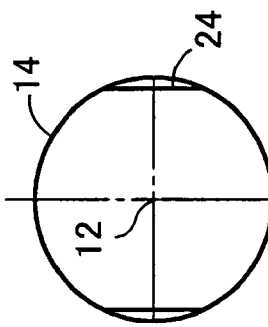
FIG. 7C is a right-hand side view showing an essential portion of the sun shaft.
Figure 7A:
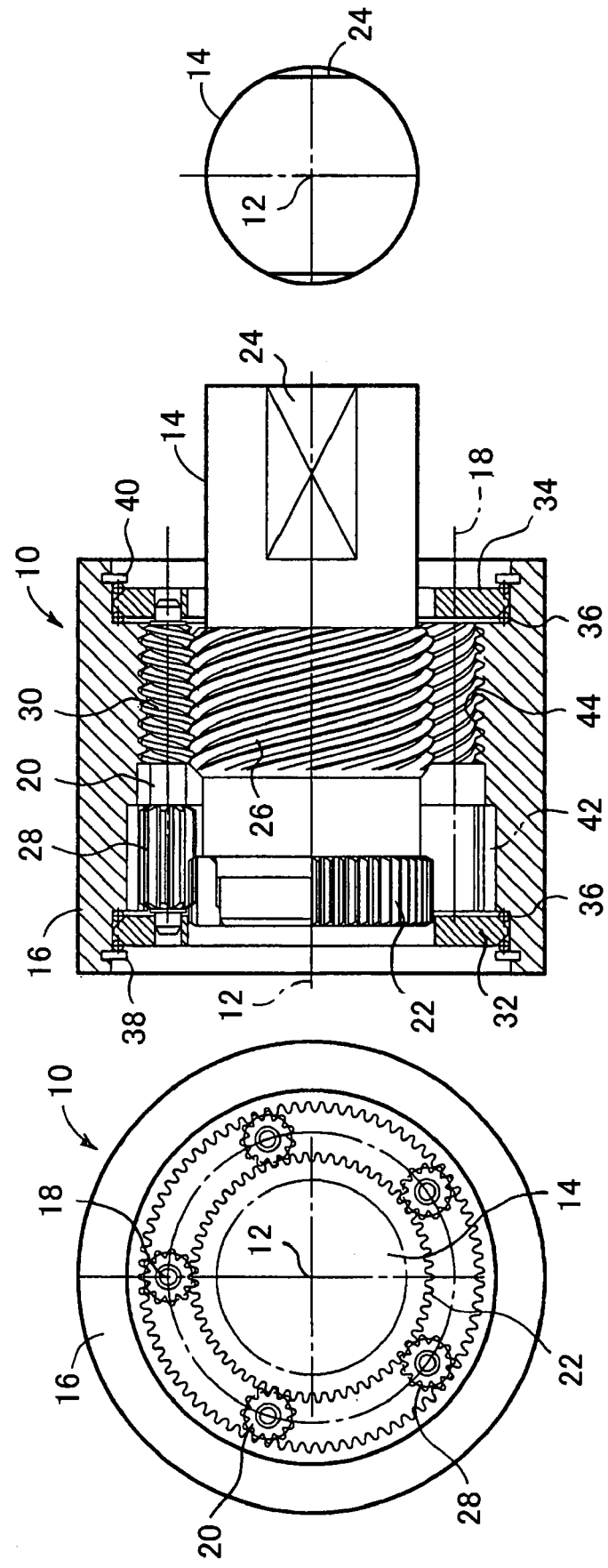
FIG. 7A is a sectional view taken along the axis of rotation, showing a seventh embodiment of a planetary rotary/linear motion converter according to the present invention, the converter being configured so as to convert a rotary motion of the ring shaft into a linear motion of the sun shaft.
Figure 7B:
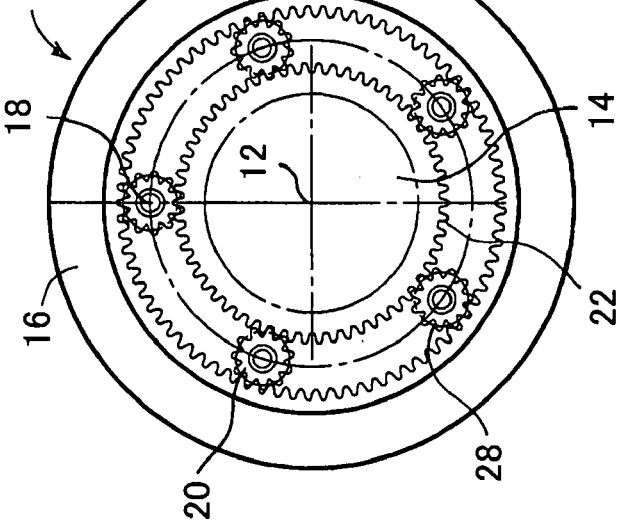
FIG. 7B is a sectional view taken perpendicularly to the axis of rotation.

FIGS. 7A to 7C show a seventh embodiment of a planetary rotary/linear motion converter according to the present invention, the converter being configured so as to convert a rotary motion of a ring shaft into a linear motion of a sun shaft. Particularly, FIG. 7A is a sectional view showing the seventh embodiment as viewed on a section taken along the axis of rotation; FIG. 7B is a hatching-omitted sectional view showing a first planetary gear mechanism of the seventh embodiment composed of spur gears as viewed on a section taken perpendicularly to the axis of rotation; and FIG. 7C is a right-hand side view showing an essential portion of the sun shaft of the seventh embodiment.

The seventh embodiment is configured in a manner similar to that of the above-described first embodiment except that the base gear ratio is set to 5; the tooth number difference of the external thread 26, which functions as a screw sun gear, is set to 1; the tooth number difference of the sun gear member 22, which functions as a helical sun gear, is set to 3; five planetary shafts 20 are provided; the numbers of teeth of the external thread 26, the external thread 30, and the internal thread 44, which function as a screw sun gear, a screw planetary gear, and a screw ring gear, respectively, are 11, 2, and 14, respectively; the numbers of teeth of the sun gear member 22, the external gear 28, and the ring gear member 42, which function as a helical sun gear, a helical planetary gear, and a helical ring gear, respectively, are 58, 11, and 77, respectively; and the advancing amount of the sun shaft 14 per one rotation of the ring shaft 16 is −0.259. Thus, the seventh embodiment operates similarly to the first embodiment.

The specifications of the spur gears and the screw gears of the seventh embodiment are summarized below.
1. Sun-shaft displacement type; the screw sun gear and the screw planetary gears are of threads of opposite helical directions.
2. Base gear ratio K=5
3. Tooth number difference of screw gear=1
4. Tooth number difference of spur gear=3
5. Gear ratio among screw gears (sun:planet:ring)=11:2:14
6. Gear ratio among spur gears (sun:planet:ring)=58:11:77
7. Number of planetary shafts=5
8. Pitch=1
9. Advancing amount=−0.259
10. Reference pitch circle diameters (working pitch circle diameters) of screw gears
   sun gear=10.5, planetary gear=3.5, ring gear=17.5

The number of teeth of each gear of the seventh embodiment satisfies the requirement mentioned above in "(3) Feasible Number of Planetary shafts." The number (5) of the planetary shafts 20 and the number of teeth (11) of the external gear 28, which functions as a helical planetary gear, satisfy the requirement mentioned above in "(6) Preferred Relationship between the Number of Planetary shafts and the Number of Teeth of Helical Planetary gear."

According to the seventh embodiment, the external screw 30, which functions as a screw planetary gear, has a number of teeth of 2 (two threads), and the tooth number difference of the screw gear is 1. Accordingly, as compared with other embodiments, the seventh embodiment can increase the helix angle of the screw gear. This enhances transmission of rotation through the screw gears.

According to the seventh embodiment, the tooth number difference of the screw gear is set to 1, and the tooth number difference of the helical gear is set to 3, thereby bringing a gear ratio among the screw gears and a gear ratio among the helical gears close to each other. This reduces the advancing amount of the sun shaft 14 as compared with other embodiments, so that a rotary motion of the ring shaft 16 can be converted into a linear motion of the sun shaft 14 at very high conversion resolution.

Eighth Embodiment

FIGS. 8A and 8B show an eighth embodiment of a planetary rotary/linear motion converter according to the present invention, the converter being configured so as to convert a rotary motion of a sun shaft into a linear motion of a ring shaft. Particularly, FIG. 8A is a sectional view showing the eighth embodiment as viewed on a section taken along the axis of rotation, and FIG. 8B is a hatching-omitted sectional view showing a first planetary gear mechanism of the eighth embodiment composed of spur gears as viewed on a section taken perpendicularly to the axis of rotation.

In the eighth embodiment, the sun shaft 14 has the external thread 26, which functions as a screw sun gear, and has two external gears 50 and 52, which collectively function as a helical sun gear and are each in the form of a spur gear, on axially opposite sides of the external thread 26. The external gears 50 and 52 may be formed directly on the sun shaft 14, or corresponding gear members similar to the sun gear member 22 may be fixed to the sun shaft 14 through press fitting or the like.

In the eighth embodiment, when the sun shaft 14 is rotated, the ring shaft 16 performs linear motion. Accordingly, in contrast to the above-described first to seventh embodiments in which the plane portions 24 are provided at one end of the sun shaft 14, two parallel plane portions 54 are provided on the outer circumferential surface of the ring shaft 16 in parallel with the axis of rotation 12. The ring shaft 16 is connected to another member not shown in FIGS. 8A and 8B via the two plane portions 54 in such a manner as to be nonrotatable relative to the other and to be able to reciprocate.

Each planetary shaft 20 has the single-flight external thread 30 and has dual-teeth portions 56 and 58 on axially opposite sides of the external thread 30. The dual-teeth portions 56 and 58 have the same helix angle and the same pitch as the external thread 30 and function as respective external threads mating with the external thread 26 and as respective external spur gears meshing with the external gears 50 and 52.

Although unillustrated in FIGS. 8A and 8B, the planetary shafts 20 are supported at opposite ends by carrier members similar to the carrier members 32 and 34 in such a manner as to be rotatable about the respective axes of rotation 18. However, the carrier members in the eighth embodiment are attached to the sun shaft 14 by use of respective C-rings or the like so as to prevent the planetary shafts 20 from being displaced relative to the sun shaft 14 in the axial direction. In the eighth embodiment, as will be described later, the planetary shafts 20 are maintained in an appropriate positional relationship with the sun shaft 14 and with the ring shaft 16. Therefore, the carrier members may be omitted.

The ring gear member 42 meshing with the dual-teeth portions 56 of the planetary shafts 20 is fixed, through press fitting or the like, to the inner surface of a large-diameter portion of the ring shaft 16 located at the left of FIG. 8A. The ring gear member 42 has internal spur-gear teeth. Also, the inner surface of a small-diameter portion of the ring shaft 16 has the quintuple-start internal thread 44 mating with the external threads 30 and with the dual-teeth portions 56 and 58 of the planetary shafts 20. In the eighth embodiment, as a result of the sun shaft 14 being rotated, the ring shaft 16 performs linear motion relative to the sun shaft 14 and the planetary shafts 20. Therefore, the range of a linear motion of the ring shaft 16 is limited to a range in which meshing between the dual-teeth portions 56 of the planetary shafts 20 and the ring gear member 42 is maintained.

In the eighth embodiment, the number of teeth of the spur gear and the number of teeth of the screw gear are set such that only transmission of rotation is performed between the sun shaft 14 and the planetary shafts 20, and relative displacement in the axial direction does not arise therebetween and such that transmission of rotation is performed between the planetary shafts 20 and the ring shaft 16, and relative displacement in the axial direction arises therebetween. Specifically, the numbers of teeth of the external thread 26, the external thread 30, and the internal thread 44, which function as a screw sun gear, a screw planetary gear, and a screw ring gear, respectively, are 3, 1, and 6; and the numbers of teeth of the external gears 50 and 52, the dual-teeth portions 56 and 58, and the ring gear member 42, which function as a helical sun gear, a helical planetary gear, and a helical ring gear, respectively, are 30, 10, and 51.

Even in the eighth embodiment, a load in the axial direction generates friction loss on the screw gears, whereby the load is converted into a displacing force in the axial direction on an interface of meshing between the screw gears. In this case, a force acts on the screw gears in such a manner as to cause the screw gears to skew in a direction perpendicular to the lead angle of the screw gears. Accordingly, in the case where a spur gear and a screw gear are provided in such a manner as to be spaced apart from each other in the axial direction, in addition to a rotation-transmitting drive force, torsional stress corresponding to the axial load is always generated in the spur gears and the screw gears of the sun shaft 14, the planetary shafts 20, and the ring shaft 16.

In order to restrain undesirable displacement of the planetary shafts 20, which would otherwise result from the above-mentioned torsional stress, for smoothly transmitting, rotation, the eighth embodiment employs portions of meshing through spur-gear teeth on axially opposite sides of the screw gears of the sun shaft and the planetary shafts. The torsional stress causes two kinds of displacements of the planetary shaft. One displacement is a torsional displacement of the planetary shaft. The other displacement is a skew of the planetary shaft relative to the sun shaft. The structure of the eighth embodiment in which the portions of meshing through spur-gear teeth are provided on axially opposite sides of the screw gears can effectively restrain these two kinds of undesirable displacements.

In the illustrated eighth embodiment, the ring shaft 16 does not have a ring gear member that meshes with the dual-teeth portion 58 for the reason of space. However, the eighth embodiment may be modified such that a ring gear member similar to the ring gear member 42 and to mesh with the dual-teeth portion 58 may be provided. This will more effectively restrain the undesirable displacements of the planetary shafts 20.

In the eighth embodiment, opposite end portions of each planetary shaft 20 have the respective dual-teeth portions 56 and 58 in place of an external spur gear corresponding to the external gear 28 employed in the above-described first to seventh embodiments. Therefore, the planetary shafts 20 can be manufactured by rolling more readily at lower cost and higher accuracy as compared with the case of manufacture by cutting. Also, rolling can lower surface roughness of tooth flanks and can increase surface hardness of tooth flanks as compared with cutting. All of the planetary shafts 20 must have the same relationship between the phase of the external thread 30 and the phase of the spur gear. In this connection, since rolling can simultaneously form the dual-teeth portions 56 and 58, which each function as the external thread 30 and as a spur gear, the same relationship between the phases of the two kinds of gears can be imparted more reliably and readily to all of the planetary shafts as compared with the case of cutting.

The specifications of the spur gears and the screw gears of the eighth embodiment are summarized below.
1. Ring-shaft displacement type; the screw sun gear and the screw planetary gears are of threads of opposite helical directions.
2. Base gear ratio K=3
3. Tooth number difference of screw gear=1
4. Tooth number difference of spur gear=1
5. Gear ratio among screw gears (sun:planet:ring)=3:1:6
6. Gear ratio among spur gears (sun:planet:ring)=30:10:51
7. Number of planetary shafts=9
8. Pitch=1
9. Advancing amount=0.3333
10. Reference pitch circle diameters (working pitch circle diameters) of screw gears
  sun gear=10.5, planetary gear=3.5, ring gear=17.5

The number of teeth of each gear of the eighth embodiment satisfies the requirement mentioned above in "(3) Feasible Number of Planetary shafts." The number (9) of the planetary shafts 20 and the number of teeth (10) of each of the dual-teeth portions 56 and 58 functioning as a helical planetary gear satisfy the requirement mentioned above in "(6) Preferred Relationship between the Number of Planetary shafts and the Number of Teeth of Helical Planetary gear."

Ninth Embodiment

FIGS. 9A and 9B show a ninth embodiment of a planetary rotary/linear motion converter according to the present invention, the converter being a modification of the second embodiment. Particularly, FIG. 9A is a hatching-partially-omitted sectional view showing the ninth embodiment as viewed on a section taken along the axis of rotation, and FIG. 9B is a right-hand side view showing an essential portion of a sun shaft of the ninth embodiment.

In the ninth embodiment, each planetary shaft 20 has the dual-teeth portion 58 similar to that of the eighth embodiment at its end portion opposite the external gear 28. The ring shaft 16 has a ring gear member 60 at its end portion opposite the ring gear member 42. The ring gear member 60 has an internal spur-gear teeth and has an axial length shorter than that of the ring gear member 42. The dual-teeth portion 58 meshes with the external thread 26 of the sun shaft 14 and with the ring gear member 60. Other structural features of the ninth embodiment are similar to those of the second embodiment. Accordingly, the specifications of the spur gears and the screw gears of the ninth embodiment are the same as those of the second embodiment.

According to the ninth embodiment, each planetary shaft 20 has, at opposite end portions, portions of meshing through spur-gear teeth for meshing engagement with the ring shaft 16. Thus, as in the case of the eighth embodiment, there can be effectively restrained undesirable displacements of the planetary shafts 20 which would otherwise result from torsional stress that is generated during transmission of rotation between the sun shaft 14, the planetary shafts 20, and the ring shaft 16.

According to the ninth embodiment, each planetary shaft 20 has, at opposite end portions, portions of meshing through spur-gear teeth for meshing engagement with the ring shaft 16. However, since one of the two portions of meshing through spur-gear teeth is defined by the dual-teeth portion 58, each planetary shaft 20 can be installed at a predetermined position between the sun shaft 14 and the ring shaft 16 by screwing the planetary shaft 20 into a space between the sun shaft 14 and the ring shaft 16 from its end portion associated with the dual-teeth portion 58. This facilitates assembly of the rotary/linear motion converter as compared with the case where the two portions of meshing through spur-gear teeth are defined by respective external spur gears.

Generally, in the case where one of two gears meshing with each other through spur-gear teeth is of a dual-teeth portion, tooth contact area is smaller, and thus hertzian stress becomes higher as compared with the case where the two meshing gears are both pure spur gears. According to the ninth embodiment, each planetary shaft 20 has, at opposite end portions, two portions of meshing through spur-gear teeth for meshing engagement with the ring shaft 16, and the other one of the two portions of meshing through spur-gear teeth is defined by the external gear 28, which is a pure spur gear. Therefore, as compared with the case where the two portions of meshing through spur-gear teeth are defined by respective dual-teeth portions as in case of, for example, the eighth embodiment, or a tenth embodiment to be described later, hertzian stress at the portions of meshing through spur-gear teeth can be lowered.

Tenth Embodiment

FIGS. 10A and 10B show a tenth embodiment of a planetary rotary/linear motion converter according to the present invention, the converter being a modification of the ninth embodiment. Particularly, FIG. 10A is a hatching-partially-omitted sectional view showing the tenth embodiment as viewed on a section taken along the axis of rotation, and FIG. 10B is a right-hand side view showing an essential portion of a sun shaft of the tenth embodiment.

In the tenth embodiment, each planetary shaft 20 has the dual-teeth portions 56 and 58 at its opposite end portions as in the case of the above-described eighth embodiment; i.e., the tenth embodiment is a modification of the ninth embodiment in which the external gear 28 of the ninth embodiment is replaced with the dual-teeth portion 56.

Thus, according to the tenth embodiment, as in the case of the above-described eighth and ninth embodiments, there can be effectively restrained undesirable displacements of the planetary shafts 20 which would otherwise result from torsional stress that is generated during transmission of rotation between the sun shaft 14, the planetary shafts 20, and the ring shaft 16. Also, as in the case of the eighth embodiment, the planetary shafts 20 can be manufactured readily by rolling at low cost and high accuracy.

Other structural features of the tenth embodiment are similar to those of the above-described second and ninth embodiments. Accordingly, the specifications of the spur gears and the screw gears of the tenth embodiment are the same as those of the second embodiment.

Eleventh Embodiment

Figures 11A, 11B:
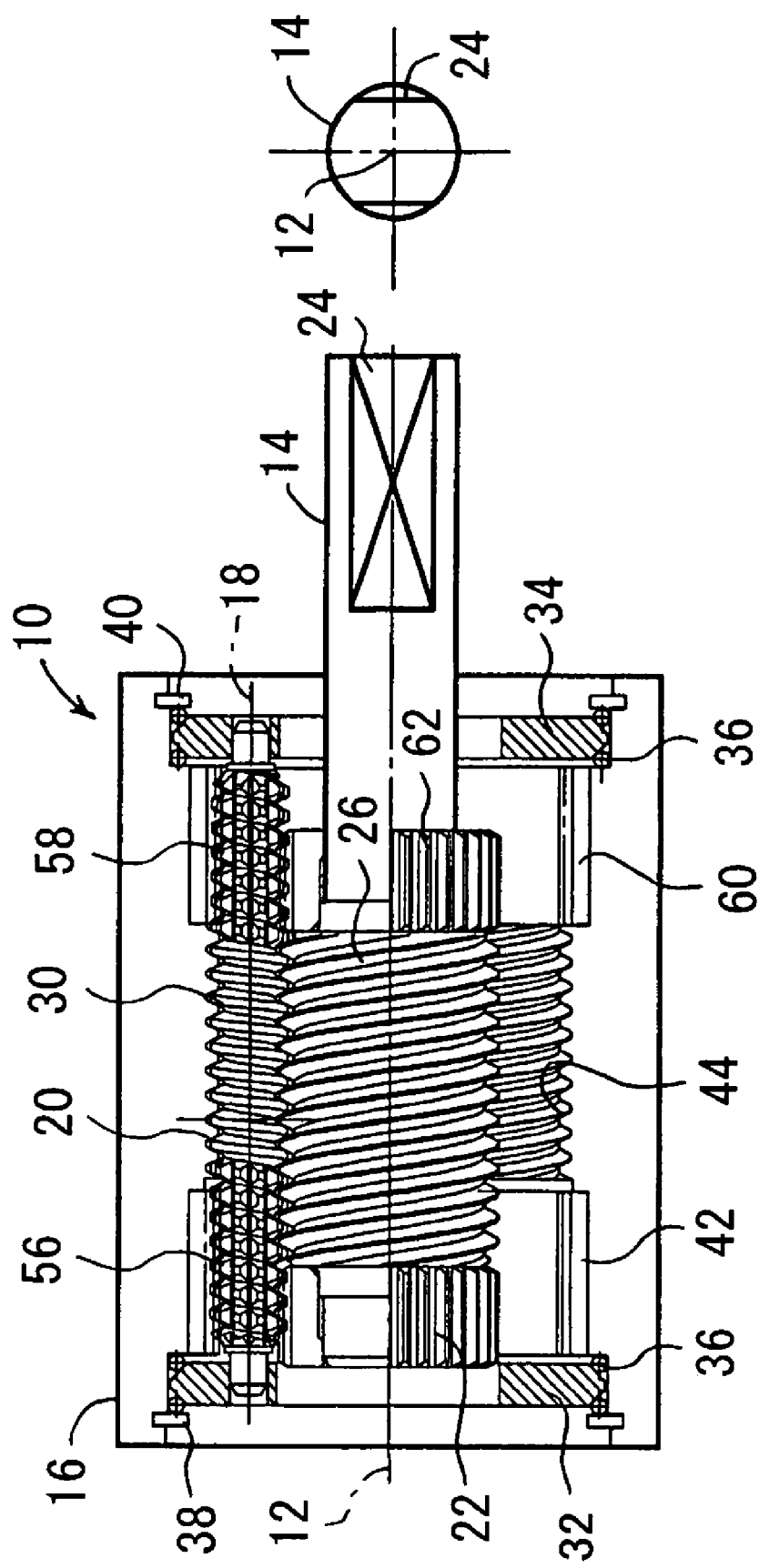
FIGS. 11A and 11B are respectively a sectional view taken along the axis of rotation, showing an eleventh embodiment of a planetary rotary/linear motion converter according to the present invention, the converter being a modification of the tenth embodiment, and a right-hand side view showing an essential portion of the sun shaft.

FIGS. 11A and 11B show an eleventh embodiment of a planetary rotary/linear motion converter according to the present invention, the converter being a modification of the tenth embodiment. Particularly, FIG. 11A is a hatching-partially-omitted sectional view showing the eleventh embodiment as viewed on a section taken along the axis of rotation, and FIG. 11B is a right-hand side view showing an essential portion of a sun shaft of the eleventh embodiment.

In the eleventh embodiment, the sun shaft 14 has a sun gear member 62 which has spur-gear teeth, is similar to the sun gear member 22, and is located opposite the sun gear member 22 with respect to the external thread 26. The sun gear member 62 is fixed to the sun shaft 14 through press fitting. The ring shaft 16 and the planetary shafts 20 are configured in a manner similar to that of the above-described tenth embodiment except that the axial length of the dual-teeth portion 58 and the axial length of the ring gear member 60 meshing with the dual-teeth portion 58 are set longer than those of the tenth embodiment. The sun gear member 62 meshes with the dual-teeth portions 58 of the planetary shafts 20.

In other words, the eleventh embodiment is a modification of the tenth embodiment in which the sun gear member 62 is added. Two first planetary gear mechanisms (planetary gear mechanisms of spur gears) are provided at axially opposite sides of a second planetary gear mechanism (a planetary gear mechanism of screw gears) composed of the external thread 26, the external threads 30, and the internal thread 44; one of the two first planetary gear mechanisms is composed of the sun gear member 22, the dual-teeth portion 56, and the ring gear member 42; and the other first planetary gear mechanism is composed of the sun gear member 62, the dual-teeth portion 58, and the ring gear member 60.

According to the eleventh embodiment, as compared with the above-described first to tenth embodiments, rotation can be transmitted more reliably and more smoothly between the sun shaft 14, the planetary shafts 20, and the ring shaft 16, whereby motion conversion between a rotary motion and a linear motion can be performed reliably and smoothly; and there can be more effectively restrained undesirable displacements of the planetary shafts 20 which would otherwise result from torsional stress that is generated during transmission of rotation between the sun shaft 14, the planetary shafts 20, and the ring shaft 16. Also, as in the case of the eighth and tenth embodiments, the planetary shafts 20 can be manufactured readily by rolling at low cost and high accuracy.

Other structural features of the eleventh embodiment are similar to those of the above-described second and ninth embodiments. Accordingly, the specifications of the spur gears and the screw gears of the eleventh embodiment are the same as those of the second embodiment.

In the eleventh embodiment, the axial length of the dual-teeth portion 58 and the axial length of the ring gear member 60 are set longer than in the case of the tenth embodiment for the following reason. In order to ensure the effect of provision of the two first planetary gear mechanisms (planetary gear mechanisms of spur gears), even when, as a result of motion conversion, the sun shaft 14 is displaced along the axis of rotation 12 relative to the planetary shafts 20 and the ring shaft 16, meshing between the dual-teeth portions 58 and the external thread 26 of the sun shaft 14 must be maintained.

Twelfth Embodiment

Figure 12C:
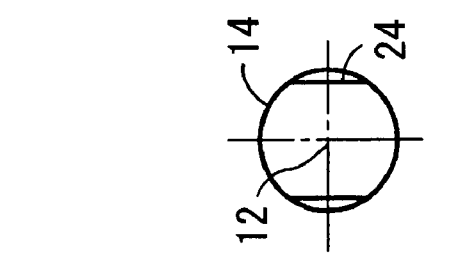
FIG. 12C is a right-hand side view showing an essential portion of the sun shaft.
Figure 12A:
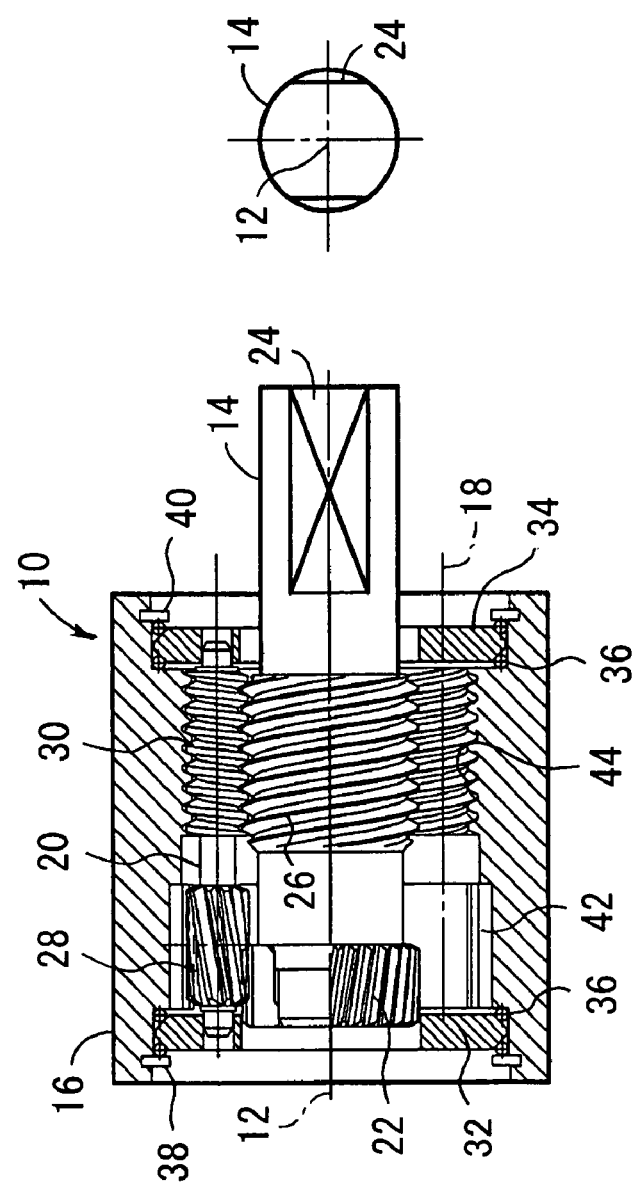
FIG. 12A is a sectional view taken along the axis of rotation, showing a twelfth embodiment of a planetary rotary/ linear motion converter according to the present invention, the converter being a modification of the second embodiment.
Figure 12B:
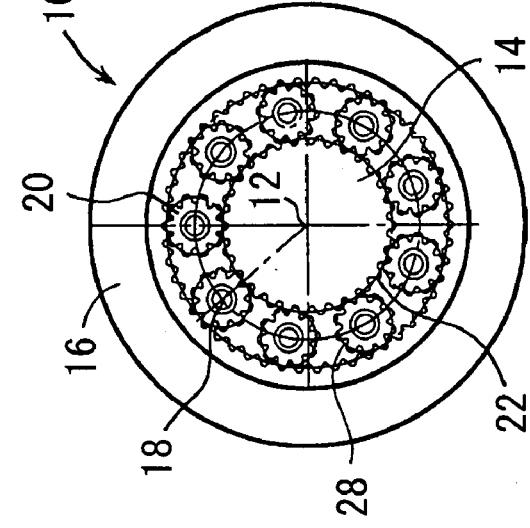
FIG. 12B is a sectional view taken perpendicularly to the axis of rotation.

FIGS. 12A to 12C show a twelfth embodiment of a planetary rotary/linear motion converter according to the present invention, the converter being a modification of the second embodiment. Particularly, FIG. 12A is a sectional view showing the twelfth embodiment as viewed on a section taken along the axis of rotation; FIG. 12B is a hatching-omitted sectional view showing a first planetary gear mechanism of the twelfth embodiment composed of spur gears as viewed on a section taken perpendicularly to the axis of rotation; and FIG. 12C is a right-hand side view showing an essential portion of a sun shaft of the twelfth embodiment.

The twelfth embodiment is a modification of the above-described second embodiment in which the sun gear member 22, the external gears 28, and the ring gear member 42 employ a tooth profile of a "helical-gear tooth" having a helix angle of 10° in place of a spur-gear tooth. Accordingly, as compared with the above-described second embodiment, rotation can be transmitted more smoothly between the sun gear member 22, the external gears 28, and the ring gear member 42.

Generally, assembling helical planetary gears with the sun gear and with the ring gear is more difficult than in the case of planetary spur gears, since the teeth of the sun gear, the planetary gears, and the ring gear have a helix angle. Unless the helix angle is 25° or less, the helical planetary gears cannot be assembled with the sun gear and the ring gear. Accordingly, in the twelfth embodiment, the helix angle of teeth of the sun gear member 22, the external gears 28, and the ring gear member 42 is set to 25° or less, preferably 15° or less, more preferably 10° or less.

Other structural features of the twelfth embodiment are similar to those of the above-described second embodiment. Accordingly, the specifications of the spur gears and the screw gears of the twelfth embodiment are the same as those of the second embodiment. Also, as mentioned previously, when a rotary motion of the ring shaft 16 is converted into a linear motion of the sun shaft 14, the advancing amount of the sun shaft 14 depends only on the number of teeth of the screw gear and the number of teeth and pitch of the helical gear and does not depend on the helix angle of teeth of the helical gears. Therefore, the advancing amount is the same as in the case of the second embodiment.

In the illustrated twelfth embodiment, a single first planetary gear mechanism and a single second planetary gear mechanism are provided, and the first planetary gear mechanism is of helical gears. However, as in the case of the above-described eleventh embodiment, the twelfth embodiment may be configured such that two first planetary gear mechanisms are provided with the second planetary gear mechanism located therebetween and such that the two first planetary gear mechanisms are of helical gears. However, in this case, assembly must be carried out such that the helical gears of the sun shaft 14 and the ring shaft 16 are meshed with the helical gears of the planetary shafts 20 at the same speed. Therefore, assembly of a rotary/linear motion converter becomes more difficult than in the case of the present twelfth embodiment.

Thirteenth Embodiment

FIGS. 13A to 13C show a thirteenth embodiment of a planetary rotary/linear motion converter according to the present invention, the converter being configured so as to convert a rotary motion of a ring shaft into a linear motion of a sun shaft. Particularly, FIG. 13A is a hatching-omitted sectional view showing the thirteenth embodiment as viewed on a section taken along the axis of rotation; FIG. 13B is a hatching-omitted sectional view showing a first planetary gear mechanism of the thirteenth embodiment composed of spur gears as viewed on a section taken perpendicularly to the axis of rotation; and FIG. 13C is a hatching-omitted sectional view showing the ring shaft of the thirteenth embodiment as viewed on a section taken along the axis of rotation.

In the thirteenth embodiment, the sun shaft 14 has a dual-teeth portion 64 which functions both as a helical gear of the sun gear member 22 in the twelfth embodiment and as the external thread 26, which is a screw gear, in the twelfth embodiment. The specifications of gear teeth of the dual-teeth portion 64 functioning both as a helical gear and as a screw gear are the same as those of the twelfth embodiment.

In the thirteenth embodiment, each planetary shaft 20 has, along its overall length, a dual-teeth portion 66 which functions both as a helical gear of the external gear 28 in the twelfth embodiment and as the external thread 30, which functions as a screw gear, in the twelfth embodiment. The specifications of gear teeth of the dual-teeth portion 66 functioning both as a helical gear and as a screw gear are the same as those of the twelfth embodiment.

Accordingly, each planetary shaft 20 has a large number of protrusions that yield a function of the helical gear and a function of the external thread 30. The sun shaft 14 has a large number of recesses which yield a function of the helical gear and a function of the external thread 26 by means of receiving the protrusions of the planetary shafts 20 in a region where the dual-teeth portion 64 is provided. As viewed on a section perpendicular to the axis of rotation 12, the sun shaft 14 and the planetary shafts 20 have teeth whose profile is of an involute gear.

As in the case of the ninth to eleventh embodiments, the ring gear members 42 and 60 are fixed, through press fitting, to the inner surface of the ring shaft 16 while being spaced apart from each other along the axis of rotation 12. The ring gear members 42 and 60 have helical-gear teeth and mesh with opposite end portions of the planetary shafts 20.

Ball bearings 68 and 70 are provided in opposition to the planetary shafts 20 with respect to the carrier members 32 and 34, respectively. Outer races of the ball bearings 68 and 70 are fixed to the inner surface of the ring shaft 16 by means of C-rings 38A and 40A, respectively, so as not to be displaced. The inner surfaces of inner races of the ball bearings 68 and 70 are slightly spaced apart from the surface of the sun shaft 14 for allowing a reciprocating motion of the sun shaft 14.

Thus, according to the thirteenth embodiment, among the helical sun gear, the helical planetary gears, and the helical ring gear, which constitute a first planetary gear mechanism, and the screw sun gear, the screw planetary gears, and the screw ring gear, which constitute a second planetary gear mechanism, the helical sun gear, the screw sun gear, the helical planetary gears, and the screw planetary gears of the first and second planetary gear mechanisms are provided in the same axial region. The dual-teeth portions 66 of the planetary shafts 20 can mesh, along their overall length, with the dual-teeth portion 64 of the sun shaft 14. Accordingly, a force that is generated on the interface of meshing between the screw gears of the sun shaft 14 and the planetary shaft 20 and induces torsion and skew can be borne by meshing between adjacent spur-gear teeth as viewed on the same section perpendicular to the axis of rotation 12. As in the case of the above-described ninth to eleventh embodiments, this can effectively restrain a torsional displacement of the planetary shafts 20.

In the case where a helical gear assumes the form of a spur gear, torsional stress generated on the spur gear is transmitted as reaction force to a screw gear. However, the thirteenth embodiment employs genuine helical gears and thus can reliably and effectively lower generation of unnecessary force induced by torsional stress. As is well known, sliding friction and rolling friction are always mixedly present on an interface of meshing between gears, and friction loss is proportional to tooth pressure. The thirteenth embodiment can lower tooth pressure associated with meshing of two kinds of teeth. Thus, as compared with the above-described other embodiments, the thirteenth embodiment can lower friction loss, so that transmission efficiency between the sun shaft 14 and the planetary shafts 20 can be improved.

However, since each planetary shaft 20 meshes, at its opposite end portions, with the helical ring gear members 42 and 60, in assembly of the rotary/linear motion converter, the ring gear members 42 and 60 must be press-fitted into the ring shaft 16 at the same speed.

According to the thirteenth embodiment, the dual-teeth portions 66 of the planetary shafts 20 mesh, along their overall length, with the dual-teeth portion 64 of the sun shaft 14. Thus, by increasing the range of the dual-teeth portion 64 along the axis of rotation 12, the distance of a linear motion of the sun shaft 14 relative to the planetary shafts 20 and the ring shaft 16 can be increased. As compared with the above-described embodiments in which the distance of a linear motion of the sun shaft 14 is limited by the axial length of the external spur or helical gear 28 of the planetary shaft 20, the thirteenth embodiment can have a longer distance of a linear motion of the sun shaft 14 when compared under the condition of the same axial length of the ring shaft 16 and can reduce the axial length of the ring shaft 16 when compared under the condition of the same distance of a linear motion of the sun shaft 14.

According to the thirteenth embodiment, each planetary shaft 20 has the dual-teeth portion 66 along its entire length. Thus, as compared with the above-described other embodiments, which have the helical gears or the dual-teeth portions, and the screw gears, the thirteenth embodiment allows easy low-cost manufacture of the planetary shafts 20 by rolling. Also, no problem arises from a difference in the accuracy of tooth phase between the screw gear and the helical gear or the dual-teeth portion.

Similarly, the sun shaft 14 may have only the dual-teeth portion 64; i.e., a manufacturing process does not need to involve a step of fixedly press-fitting a separate helical gear to the sun shaft 14. Since the dual-teeth portion 64 can be readily manufactured by rolling, the sun shaft 14 can be manufactured more readily and at lower cost as compared with the above-described other embodiments whose manufacturing processes involve a step of fixedly press-fitting a separate helical gear to the sun shaft 14.

The dual-teeth portion 64 of the sun shaft 14 can be formed by forming a recess-like tooth profile on the surface of a sun shaft material by rolling. However, portions between recesses rise, and the surface of the dual-teeth portion 64 after rolling has high surface roughness; i.e., a highly accurately smooth cylindrical surface is not formed. However, by subjecting the surface of the sun shaft after rolling to centerless polishing, the surface of the sun shaft can be readily and efficiently finished to a highly accurately smooth cylindrical surface.

Furthermore, according to the thirteenth embodiment, the ball bearings 68 and 70 are provided on axially opposite sides of the planetary shafts 20. Thus, even when stress that attempts to skew the sun shaft 14 and the ring shaft 16 to each other acts therebetween, the ball bearings 68 and 70 can bear the stress. This prevents an increase in tooth pressure which would otherwise result from an excessive load induced by the skewing stress acting on a portion of meshing between gears. Also, the dual-teeth portion 64 of the sun shaft 14 and the dual-teeth portions 66 of the planetary shafts 20 mesh with each other while a predetermined clearance is reliably maintained between the bottom of a tooth profile and the top of a tooth profile, whereby the sun shaft 14, the planetary shafts 20, and the ring shaft 16 can smoothly rotate.

Fourteenth Embodiment

Figure 14C:
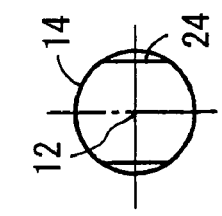
FIG. 14C is a right-hand side view showing an essential portion of the sun shaft.
Figure 14A:
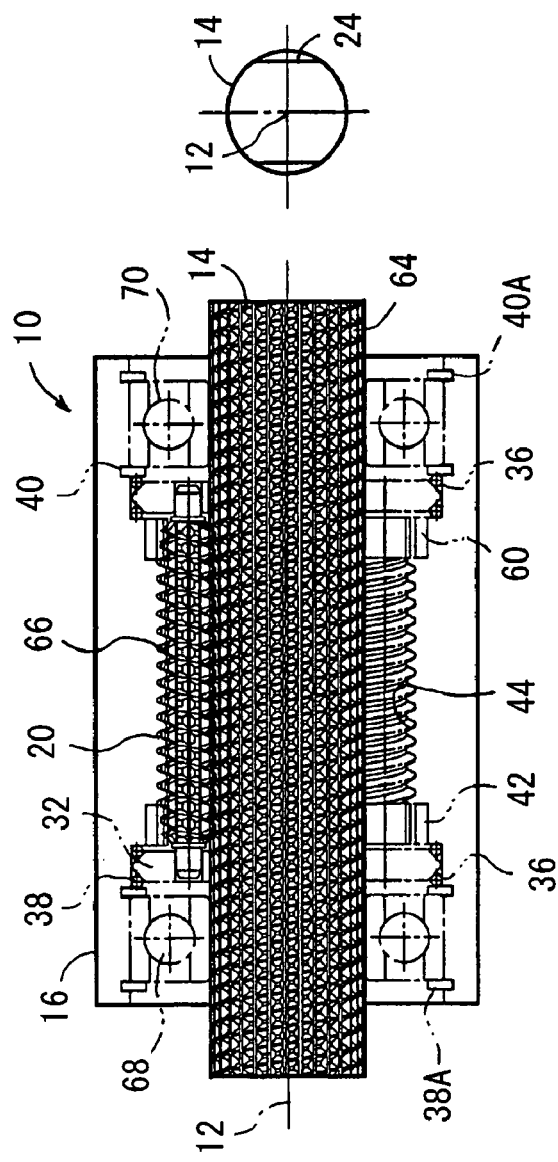
FIG. 14A is a sectional view taken along the axis of rotation, showing a fourteenth embodiment of a planetary rotary/linear motion converter according to the present invention, the converter being a modification of the thirteenth embodiment.
Figure 14B:
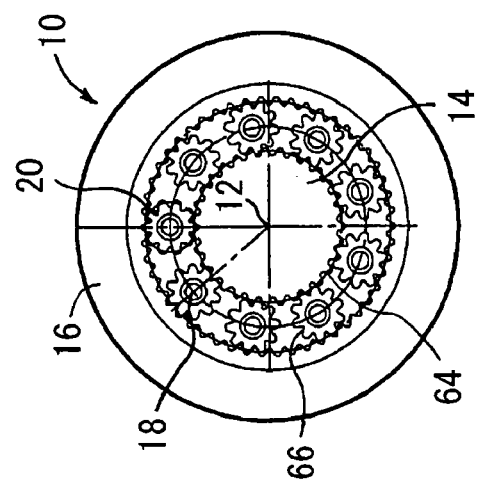
FIG. 14B is a sectional view taken perpendicularly to the axis of rotation.

FIGS. 14A to 14C show a fourteenth embodiment of a planetary rotary/linear motion converter according to the present invention, the converter being a modification of the thirteenth embodiment. Particularly, FIG. 14A is a hatching-omitted sectional view showing the fourteenth embodiment as viewed on a section taken along the axis of rotation; FIG. 14B is a hatching-omitted sectional view showing an axially central portion of the fourteenth embodiment as viewed on a section taken perpendicularly to the axis of rotation; and FIG. 14C is a right-hand side view showing an essential portion of a sun shaft of the fourteenth embodiment.

The fourteenth embodiment is a modification of the above-described thirteenth embodiment such that the tooth profile of the dual-teeth portion 64 of the sun shaft 14 is changed from a helical-gear tooth profile to a spur-gear tooth profile and such that the tooth profile of the dual-teeth portions 66 of the planetary, shafts 20 is changed from a helical-gear tooth profile to a spur-gear tooth profile. Other structural features of the fourteenth embodiment are similar to those of the thirteenth embodiment. Accordingly, the specifications of the spur gears and the screw gears of the dual-teeth portions 64 and 66 of the fourteenth embodiment are the same as those of the above-described second and twelfth embodiments.

Generally, assembling the helical planetary gears with mating gears is difficult. However, since the dual-teeth portions 64 and 66 of the fourteenth embodiment have a spur-gear tooth profile, the rotary/linear motion converter can be assembled more readily and more efficiently as compared with the above-described thirteenth embodiment.

According to the fourteenth embodiment, as in the case of the above-described embodiments, the number (9) of the planetary shafts 20 and the number of teeth (10) of the dual-teeth portion 66 functioning as a helical planetary gear satisfy the requirement mentioned above in "(6) Preferred Relationship between the Number of Planetary shafts and the Number of Teeth of Helical Planetary gear." Accordingly, the dual-teeth portions 66 of the planetary shafts 20 mesh with the dual-teeth portion 64 of the sun shaft 14 and with the ring gear members 42 and 60 of the ring shaft 16 in such a manner that the dual-teeth portions 66 differ from one another in the phase of meshing. Thus, although a spur-gear tooth profile is employed, rotation can be smoothly transmitted between the gears.

Fifteenth Embodiment

FIGS. 15A and 15B show a fifteenth embodiment of a planetary rotary/linear motion converter according to the present invention, the converter being configured so as to convert a rotary motion of a sun shaft into a linear motion of a ring shaft. Particularly, FIG. 15A is a sectional view showing the fifteenth embodiment as viewed on a section taken along the axis of rotation, and FIG. 15B is a hatching-omitted sectional view showing an axially central portion of the fifteenth embodiment as viewed on a section taken perpendicularly to the axis of rotation.

In the fifteenth embodiment, the sun shaft 14 is configured in a manner similar to that of the above-described eighth embodiment; i.e., the sun shaft 14 has the external thread 26 and the external gears 50 and 52, which are each in the form of a spur gear and are formed on axially opposite sides of the external thread 26. However, since the sun shaft 14 rotates, the sun shaft 14 does not have, at its right end portion in FIG. 15A, plane portions corresponding to the plane portions 24 in the second embodiment and the like. The specifications of gear teeth of the external thread 26 functioning as a screw gear and the specifications of gear teeth of the external gear members 50 and 52 functioning as helical gears are the same as those of the eighth embodiment.

According to the fifteenth embodiment, as in the case of the above-described thirteenth and fourteenth embodiments, each planetary shaft 20 has, along its overall length, the dual-teeth portion 66 which functions both as a helical gear of the external gear 28 in the twelfth embodiment and as the external thread 30, which functions as a screw gear, in the twelfth embodiment. The specifications of gear teeth of the dual-teeth portion 66 functioning both as a helical gear and as a screw gear are the same as those of the twelfth to fourteenth embodiments.

In the fifteenth embodiment, as in the case of the above-described eighth embodiment, the ring shaft 16 performs linear motion relative to the sun shaft 14 and the planetary shafts 20. Thus, the carrier members 32 and 34 are supported by the C-rings 38 and 40, respectively, in such a manner as to be rotatable relative to the sun shaft 14. The outer circumferences of the carrier members 32 and 34 are slightly spaced apart from the inner surface of the ring shaft 16.

As in the case of the above-described thirteenth and fourteenth embodiments, the ball bearings 68 and 70 are provided on axially opposite sides of the planetary shafts 20. However, in the present embodiment, since the sun shaft 14 rotates, the inner races of the ball bearings 68 and 70 are fixed to the surface of the sun shaft 14 by means of the C-rings 38A and 40A, respectively, so as not to be displaced. The outer surfaces of outer races of the ball bearings 68 and 70 are slightly spaced apart from the inner surface of the ring shaft 16 for allowing a reciprocating motion of the ring shaft 16.

Furthermore, in the fifteenth embodiment, as in the case of the above-described eighth embodiment, the two parallel plane portions 54 are provided on the outer circumferential surface of the ring shaft 16 in parallel with the axis of rotation 12. The ring shaft 16 is connected to another member not shown in FIG. 15 via the two plane portions 54 in such a manner as to be nonrotatable relative to the other and to be able to reciprocate. A dual-teeth portion 72 is formed on the entire inner surface of the ring shaft 16 and functions both as a spur gear of the ring gear member 42 in the eighth embodiment and as the internal thread 44 in the eighth embodiment. The dual-teeth portion 72 has a large number of recesses for receiving respective projections of the dual-teeth portions 66 of the planetary shafts 20. The corresponding projections and recesses mate with one another, whereby the dual-teeth portions 66 of the planetary shafts 20 mesh with the dual-teeth portion 72 along their overall length.

The specifications of gear teeth of the dual-teeth portion 72 functioning both as a helical gear and as a screw gear are the same as those of the above-described fourteenth embodiment. Accordingly, the dual-teeth portions 66 of the planetary shafts 20 mesh with the external thread 26 of the sun shaft 14 and with the dual-teeth portion 72 of the ring shaft 16 in such a manner that the dual-teeth portions 66 differ from one another in the phase of meshing. Thus, as in the case of the fourteenth embodiment, although the dual-teeth portions employ a spur-gear tooth profile, rotation can be smoothly transmitted between the gears.

As mentioned previously, a dual-teeth portion in the form of external teeth can be readily formed by rolling. However, it is difficult to form a dual-teeth portion composed of a large number of recesses on the inner surface of a cylindrical member by rolling. Accordingly, the ring shaft 16 in the fifteenth embodiment may be manufactured by the steps of forming, by rolling, a large number of recesses on the surface of one side of a ring shaft material in the form of a flat plate; forming the ring shaft material into a cylindrical shape such that the side having the recesses comes to the inside; joining butting end portions of the resultant cylindrical workpiece together by welding or the like; subjecting the inner surface of the cylindrical workpiece to cylindrical grinding, and forming the two plane portions 54. This manufacturing method can manufacture the ring shaft 16 of the present embodiment more readily and at lower cost as compared with other methods.

Sixteenth Embodiment

Figure 16A:
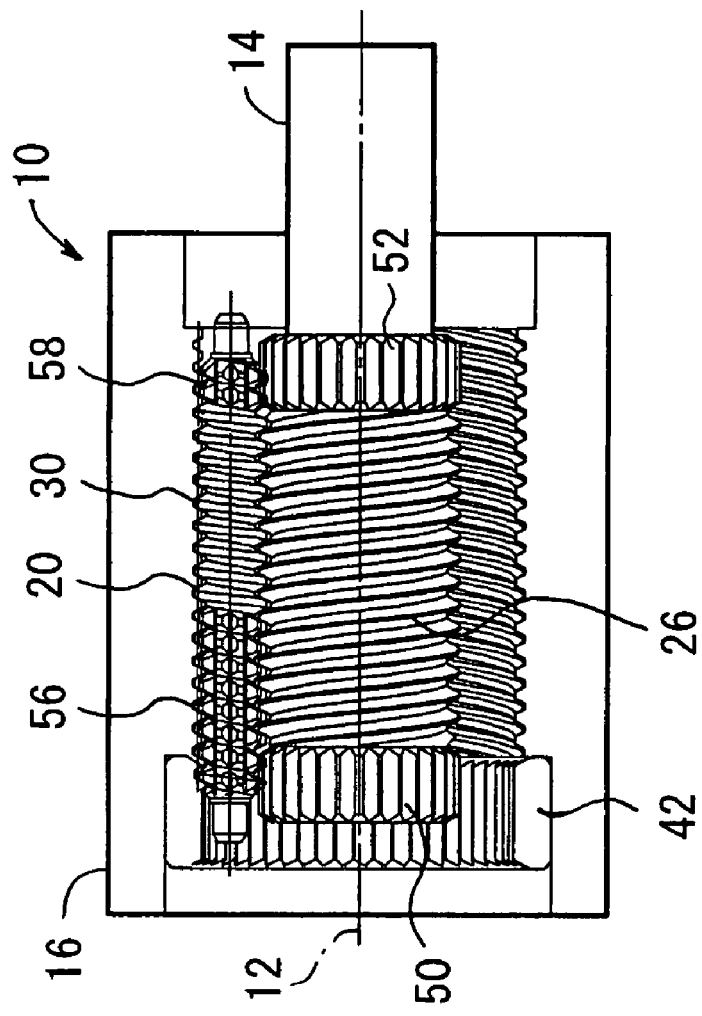
FIGS. 16A and 16B are a sectional view taken along the axis of rotation and a sectional view taken perpendicularly to the axis of rotation, respectively, showing a sixteenth embodiment of a planetary rotary/linear motion converter according to the present invention, the converter being a modification of the eighth embodiment.
Figure 16B:
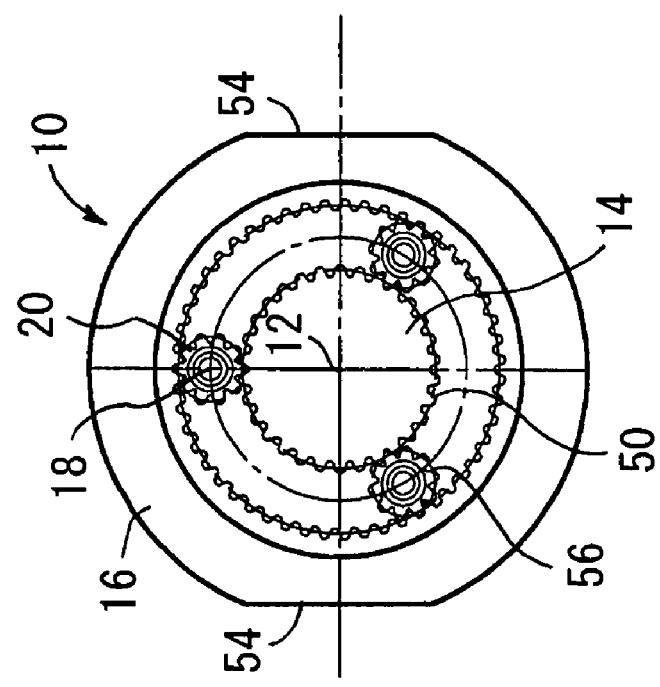
Figure 17A:
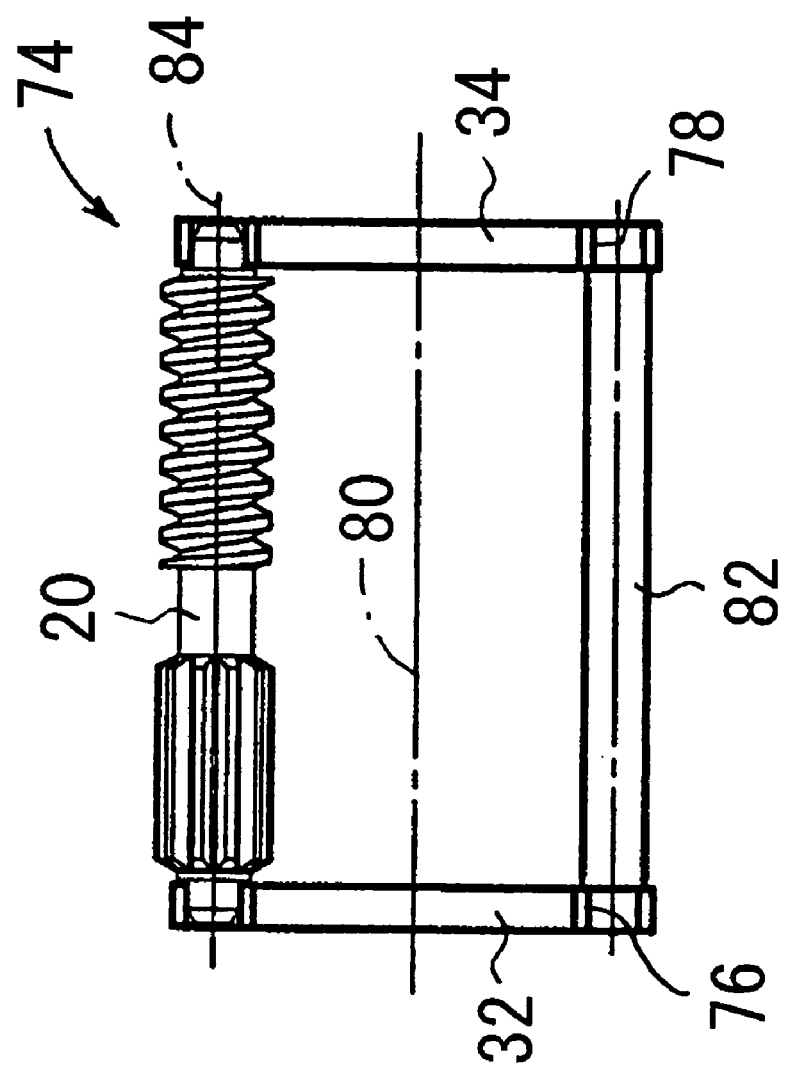
FIGS. 17A and 17B are a sectional view taken in parallel with the axis and a left-hand side view, respectively, showing Example 1 of a cage retainer.
Figure 17B:
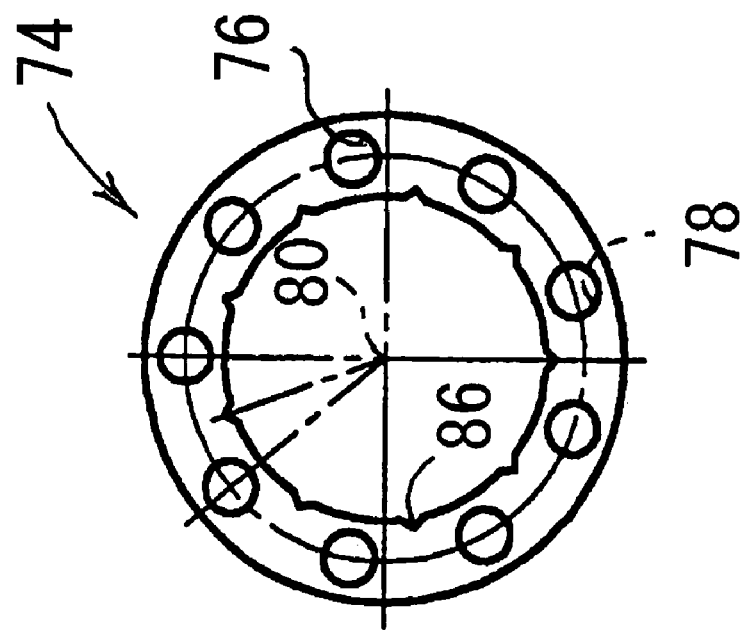
Figure 18A:
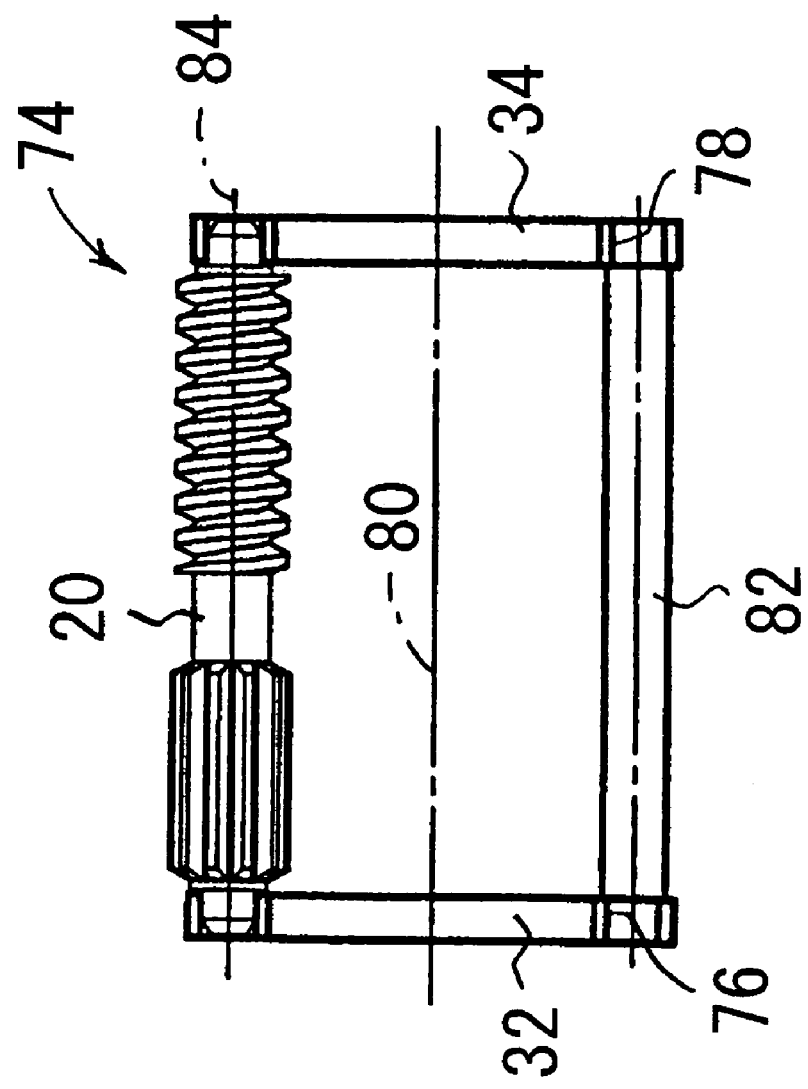
FIGS. 18A and 18B are a sectional view taken in parallel with the axis and a left-hand side view, respectively, showing Example 2 of a cage retainer.
Figure 18B:
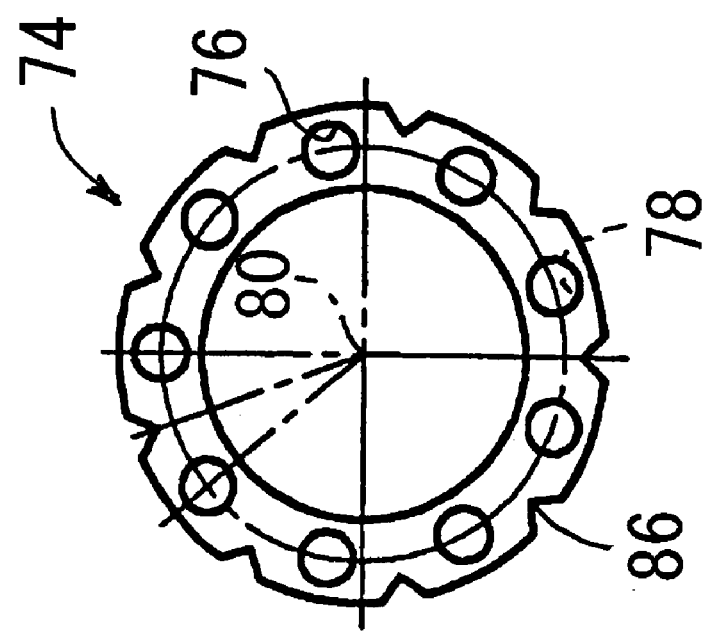
Figure 19A:
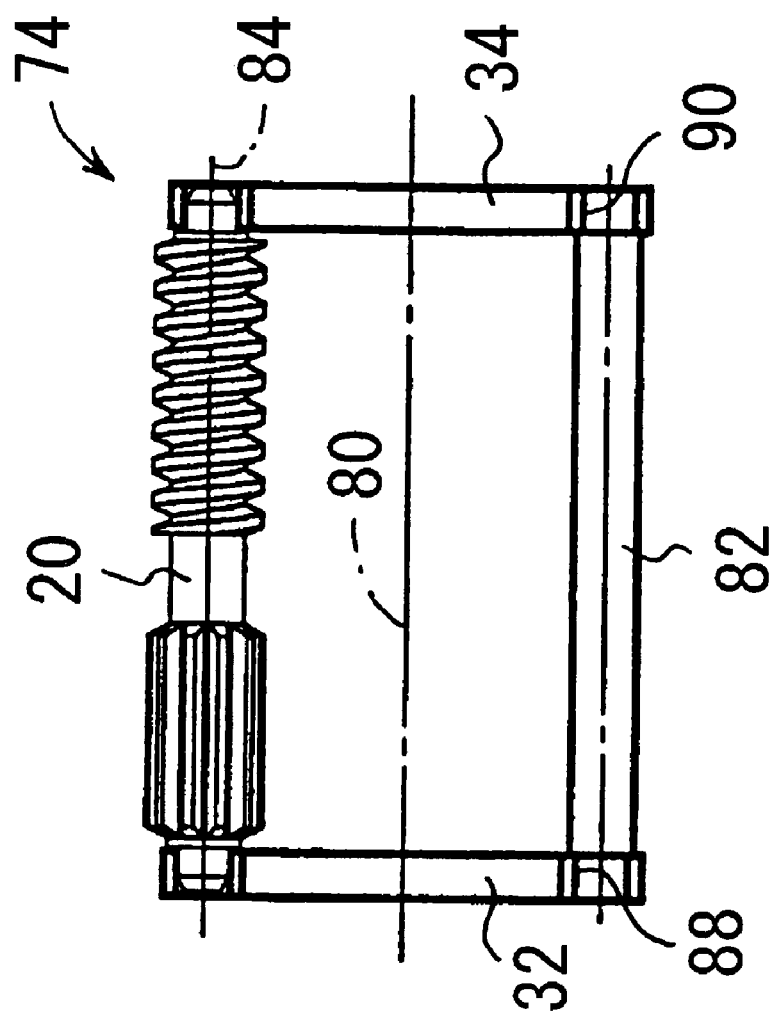
FIGS. 19A and 19B are a sectional view taken in parallel with the axis and a left-hand side view, respectively, showing Example 3 of a cage retainer.
Figure 19B:
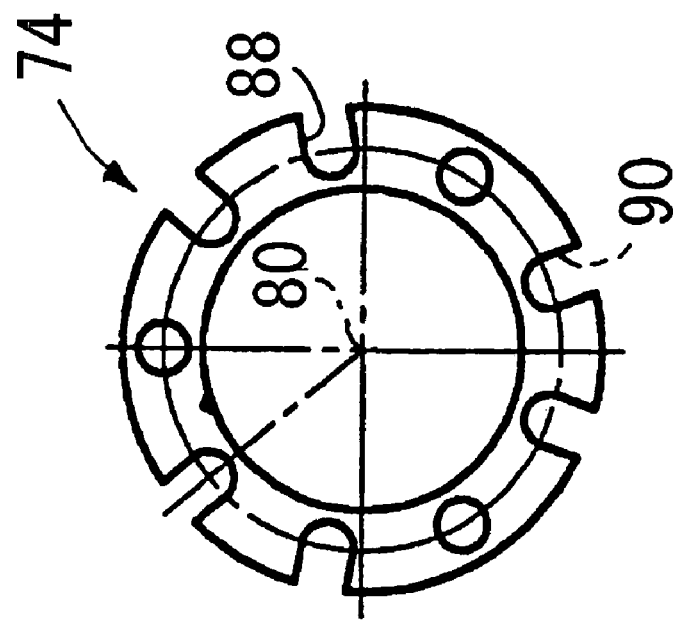
Figure 20A:
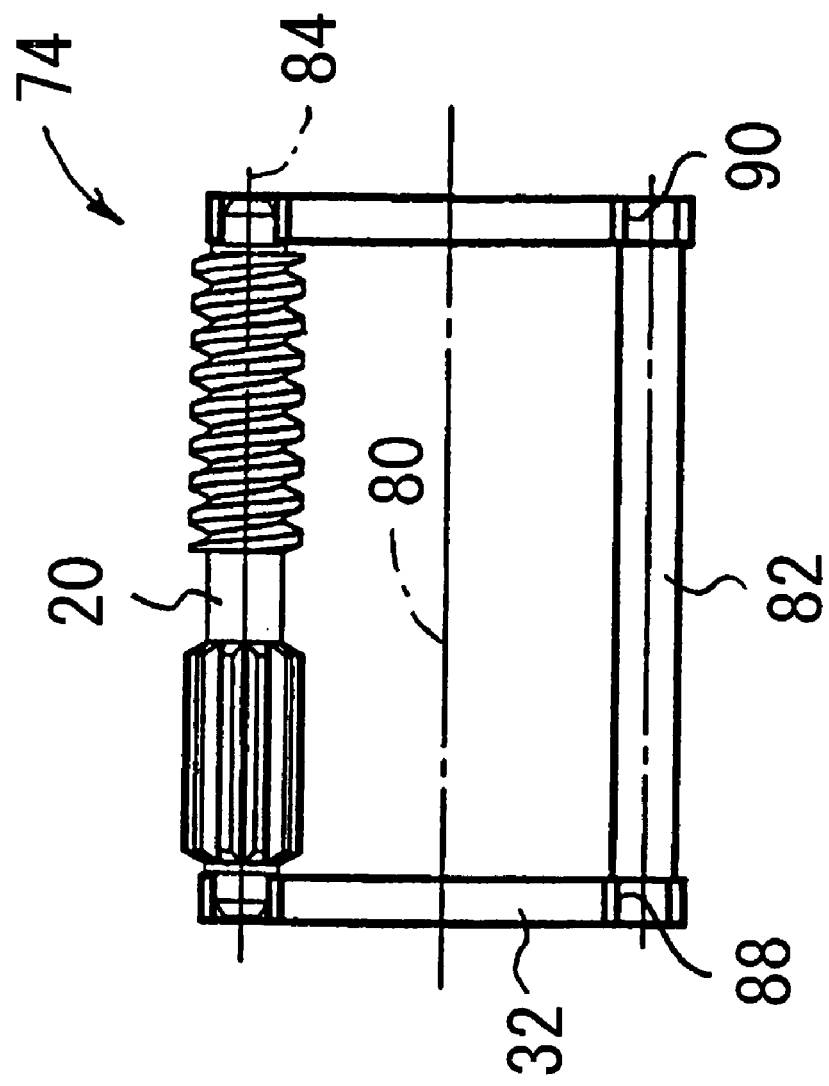
FIGS. 20A and 20B are a sectional view taken in parallel with the axis and a left-hand side view, respectively, showing Example 4 of a cage retainer.
Figure 20B:
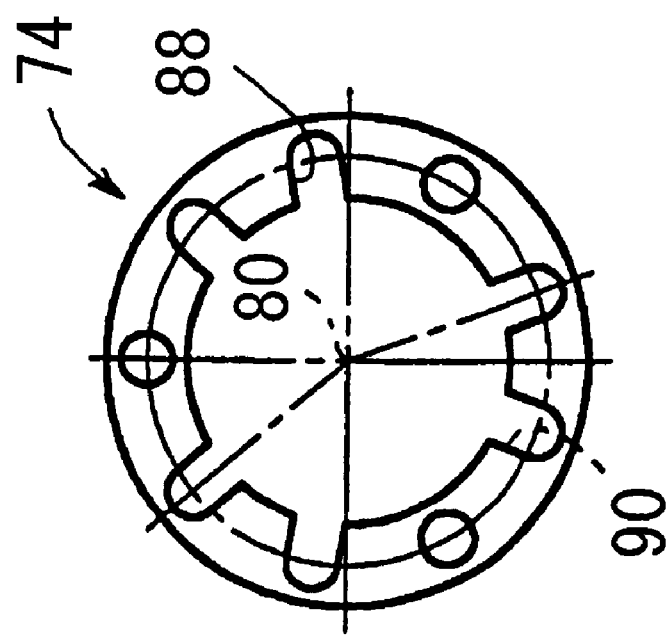

FIGS. 16A and 16B show a sixteenth embodiment of a planetary rotary/linear motion converter according to the present invention, the converter being a modification of the eighth embodiment. Particularly, FIG. 16A is a sectional view showing the sixteenth embodiment as viewed on a section taken along the axis of rotation, and FIG. 16B is a hatching-omitted sectional view showing a first planetary gear mechanism of the sixteenth embodiment composed of spur gears as viewed on a section taken perpendicularly to the axis of rotation.

The sixteenth embodiment is configured in a manner similar to that of the above-described eighth embodiment except that the helix angle of the internal thread 44 of the ring shaft 16 and the helix angle of the external thread 30 of each planetary shaft 20 are of opposite directions, and thus the number of teeth of the internal thread 44 is −6; the number of the planetary shafts 20 is 3; and the tooth number difference of the screw gear is −11. The specifications of gear teeth of the helical gears and the screw gears are the same as those of the eighth embodiment except for the above items.

According to the sixteenth embodiment, since the helix angle of the internal thread 44 and the helix angle of the external thread 30 of each planetary shaft 20 are of opposite directions, the advancing amount of the ring shaft 16 per one rotation of the sun shaft 14 is −4.111, and the ring shaft 16 can perform a linear motion in the opposite direction to the case of the above-described eighth embodiment. Also, as in the case of the above-described third embodiment, the sixteenth embodiment can exhibit an increased ratio of the amount of an output linear motion to the amount of an input rotary motion as compared with other embodiments.

Summary of the Embodiments

As will be understood from the above description, according to the first to seventh embodiments and the ninth to fourteenth embodiments, rotating the ring shaft 16 can cause the sun shaft 14 to perform a linear motion relative to the ring shaft 16 and the planetary shafts 20; i.e., a rotary motion of the ring shaft 16 can be converted into a linear motion of the sun shaft 14. Also, by, for example, setting the lead angle of the screw gear as appropriate, a linear motion of the sun shaft 14 can be converted into a rotary motion of the ring shaft 16.

Similarly, according to the above-described eighth, fifteenth, and sixteenth embodiments, rotating the sun shaft 14 can cause the ring shaft 16 to perform a linear motion relative to the sun shaft 14 and the planetary shafts 20; i.e., a rotary motion of the sun shaft 14 can be converted into a linear motion of the ring shaft 16. Also, by, for example, setting the lead angle of the screw gear as appropriate, a linear motion of the ring shaft 16 can be converted into a rotary motion of the sun shaft 14.

In the above-described second, fourth to eighth, and eleventh to sixteenth embodiments, the external thread 26, the external thread 30, the internal thread 44, etc., which function as the screw sun gear, the screw planetary gears, and the screw ring gear, have respective involute thread profiles such that the external thread 26, the external thread 30, the internal thread 44, etc. are of the same normal base pitch and such that the external thread 26, the external thread 30, etc. are of different axial pressure angles; and the external thread 26, the external thread 30, etc. mate appropriately with each other through line contact.

In the above-described second, fourth to eighth, and eleventh to sixteenth embodiments, the external thread 30, the internal thread 44, etc., which function as the screw planetary gears and the screw ring gear, assume different helix angles of the same direction; the external thread 26, the external thread 30, the internal thread 44, etc., which function as the screw sun gear, the screw planetary gears, and the screw ring gear, have respective involute thread profiles such that the external thread 26, the external thread 30, the internal thread 44, etc. are of the same normal base pitch and such that the external thread 30, the internal thread 44, etc. are of different axial pressure angles; and the external thread 30, the internal thread 44, etc. mate appropriately with each other through line contact.

In the above-described third and eleventh embodiments, the external thread 26, the external thread 30, the internal thread 44, etc., which function as the screw sun gear, the screw planetary gears, and the screw ring gear, have respective thread profiles such that the external thread 26, the external thread 30, the internal thread 44, etc. are of the same normal base pitch; such that the external thread 26, the external thread 30, etc. are of different axial pressure angles; and such that the external thread 26, the external thread 30, etc. are in a point contact with each other; and the external thread 26, the external thread 30, etc. mate with each other through point contact.

In the above-described first to seventh and nine to fourteenth embodiments, in which a relative rotation between the sun shaft 14 and the ring shaft 16 causes the sun shaft 14 to perform a linear motion along the axis of rotation 12, the sum of an addendum modification coefficient of the helical planetary gear (external gear 28 or the like) and an addendum modification coefficient of the helical sun gear (sun gear member 22 or the like) ranges from −2 to 2. Also, in these embodiments, the addendum modification coefficients of the gears are set in accordance with above-mentioned Formulae 1 and 2.

Similarly, in the above-described eighth, fifteenth, and sixteenth embodiments, in which a relative rotation between the sun shaft 14 and the ring shaft 16 causes the ring shaft 16 to perform a linear motion along the axis of rotation 12, the sum of an addendum modification coefficient of the helical planetary gear (external gear 28 or the like) and an addendum modification coefficient of the helical ring gear (ring gear member 42 or the like) ranges from −2 to 2. Also, in these embodiments, the addendum modification coefficients of the gears are set in accordance with above-mentioned Formulae 3 and 4.

Table 2 shown below summarizes the specifications and features of the above-described embodiments. The first to eighth embodiments differ from one another in specifications such as the number of teeth. The ninth to sixteenth embodiments differ from one another in the form of gear. The specifications, such as the number of teeth, of the ninth to fourteenth embodiments are the same as those of the second embodiment. The specifications, such as the number of teeth, of the fifteenth embodiment are the same as those of the eighth embodiment.

TABLE 2

| Embodiment | Shaft to move | Meshing | Base gear ratio | Tooth number diff. of screw gear | Tooth number diff. of spur gear | Number of planetary gears | Gear ratio among screw gears | | | | Gear ratio among spur gears | | | | Pitch | Advancing amount |
|---|---|---|---|---|---|---|---|---|---|---|---|---|---|---|---|---|
| | | | | | | | Sun | Planetary | Ring | Sum of numbers of teeth | Sun | Planetary | Ring | Sum of numbers of teeth | | |
| 1st | Sun shaft | Opposite directions | 3 | 0 | 4 | 4 | 3 | 1 | 5 | 8 | 31 | 9 | 45 | 76 | 1 | 0.2632 |
| 2nd | Sun shaft | Opposite directions | 3 | 1 | 1 | 9 | 4 | 1 | 5 | 9 | 31 | 10 | 50 | 81 | 1 | −0.556 |
| 3rd | Sun shaft | Same direction | 3 | −8 | 1 | 9 | −5 | 1 | 5 | 0 | 31 | 10 | 50 | 81 | 1 | 5 |
| 4th | Sun shaft | Opposite directions | 3 | 1 | 0 | 3 | 4 | 1 | 5 | 9 | 27 | 9 | 45 | 72 | 1 | −0.625 |
| 5th | Sun shaft | Opposite directions | 4 | 1 | −1 | 11 | 5 | 1 | 6 | 11 | 39 | 10 | 60 | 99 | 1 | −0.667 |
| 6th | Sun shaft | Opposite directions | 3 | −1 | −2 | 7 | 2 | 1 | 5 | 7 | 25 | 9 | 45 | 70 | 1 | 0.5 |
| 7th | Sun shaft | Opposite directions | 5 | 1 | 3 | 5 | 11 | 2 | 14 | 25 | 58 | 11 | 77 | 135 | 1 | −0.259 |
| 8th | Ring shaft | Opposite directions | 3 | 1 | 1 | 9 | 3 | 1 | 6 | 9 | 30 | 10 | 51 | 81 | 1 | 0.333 |
| 9th | Sun shaft | Opposite directions | 3 | 1 | 1 | 9 | 4 | 1 | 5 | 9 | 31 | 10 | 50 | 81 | 1 | −0.556 |

TABLE 2-continued

| Embodiment | Shaft to move | Meshing | Base gear ratio | Tooth number diff. of screw gear | Tooth number diff. of spur gear | Number of planetary gears | Gear ratio among screw gears | | | | Gear ratio among spur gears | | | | Pitch | Advancing amount |
|---|---|---|---|---|---|---|---|---|---|---|---|---|---|---|---|---|
| | | | | | | | Sun | Planetary | Ring | Sum of numbers of teeth | Sun | Planetary | Ring | Sum of numbers of teeth | | |
| 10th | Sun shaft | Opposite directions | 3 | 1 | 1 | 9 | 4 | 1 | 5 | 9 | 31 | 10 | 50 | 81 | 1 | −0.556 |
| 11th | Sun shaft | Opposite directions | 3 | 1 | 1 | 9 | 4 | 1 | 5 | 9 | 31 | 10 | 50 | 81 | 1 | −0.556 |
| 12th | Sun shaft | Opposite directions | 3 | 1 | 1 | 9 | 4 | 1 | 5 | 9 | 31 | 10 | 50 | 81 | 1 | −0.556 |
| 13th | Sun shaft | Opposite directions | 3 | 1 | 1 | 9 | 4 | 1 | 5 | 9 | 31 | 10 | 50 | 81 | 1 | −0.556 |
| 14th | Sun shaft | Opposite directions | 3 | 1 | 1 | 9 | 4 | 1 | 5 | 9 | 31 | 10 | 50 | 81 | 1 | −0.556 |
| 15th | Ring shaft | Opposite directions | 5 | 1 | 1 | 9 | 3 | 1 | 6 | 9 | 30 | 10 | 51 | 81 | 1 | 0.333 |
| 16th | Ring shaft | Opposite directions | 3 | −11 | 1 | 9 | 3 | 1 | −6 | −3 | 30 | 10 | 51 | 81 | 1 | −4.111 |

[Cage Retainer]

In the above-described embodiments, the carrier member 32 and 34 are members independent to each other. However, the carrier members 32 and 34 may be configured in the form of a cage retainer such that the carrier members 32 and 34 are unitarily connected together by rod-like connection members extending in parallel with the axis of rotation 12 so as to maintain a predetermined positional relationship of the planetary shafts 20 with one another and with the sun shaft 14 and the ring shaft 16 during and even after assembly of the rotary/linear motion converter.

For example, FIGS. 17A to 20B show Examples 1 to 4, respectively, of a cage retainer. FIGS. 17A to 20A are sectional views taken in parallel with the axis, and FIGS. 17B to 20B are left-hand side views. In these drawings, like features are denoted by like reference numerals. In the sectional views of FIGS. 17A to 20A, the same planetary shaft as the planetary shaft 20 in the first to seventh embodiments is disposed.

In cage retainers 74 of Examples 1 and 2, the carrier members 32 and 34 have nine holes 76 and nine holes 78, respectively, which are circumferentially arranged at equal angular intervals. The holes 76 and the holes 78 are aligned with each other along an axis 80. Among the nine holes 76 and the nine holes 78, three holes 76 and three holes 78 which are circumferentially arranged at 1200 angular intervals receive respective end portions of rod-like connection members 82 in a press-fit condition, whereby the carrier members 32 and 34 are unitarily connected together by the three connection members 82.

Among the remaining six holes 76 and six holes 78, three holes 76 and three holes 78 which are circumferentially arranged at 120° angular intervals receive respective end portions of the planetary shafts 20 in such a manner that the planetary shafts 20 are rotatable about their own axes 84 relative to the carrier members 32 and 34. Accordingly, the cage retainers 74 of Examples 1 and 2 are formed by inserting end portions of three planetary shafts 20 into respective holes 76 and 78 of the carrier members 32 and 34 and then press-fitting end portions of three connection members 82 into respective other holes 76 and 78 of the carrier members 32 and 34.

In the cage retainer 74 of Example 1, a plurality of cutouts 86 are provided at the inner circumferences of the carrier members 32 and 34 and are arranged at equal angular intervals around the axis 80. In the cage retainer 74 of Example 2, a plurality of cutouts 86 are provided at the outer circumferences of the carrier members 32 and 34 and are arranged at equal angular intervals around the axis 80. Accordingly, while claws of a tool are engaged with respective cutouts 86 so as to prevent rotation of the cage retainer 74 about the axis 80, the sun shaft 14 is screwed into a space surrounded by the three planetary shafts 20; alternatively, by use of the tool whose claws are engaged with the respective cutouts 86, the cage retainer 74 is rotated about the axis 80 to thereby be screwed into the ring shaft 16. By this procedure, while the planetary shafts 20 are maintained in a predetermined positional relationship with one another, all of the planetary shafts 20, together with the carrier members 32 and 34, can be readily and efficiently assembled with the sun shaft 14 or with the ring shaft 16.

In the cage retainers 74 of Examples 3 and 4, three holes 76 and three holes 78 are provided at 120° angular intervals around the axis 80, and the carrier members 32 and 34 are unitarily connected together by the three connection members 82 whose opposite ends are press-fitted into the respective three holes 76 and 78. The carrier members 32 and 34 have the three holes 76 and the three holes 78, respectively, as well as six U-shaped grooves 88 and six U-shaped grooves 90, respectively, which are arranged at equal angular intervals around the axis 80. The U-shaped grooves 88 and 90 of the cage retainer 74 of Example 3 open radially outward, and the U-shaped grooves 88 and 90 of the cage retainer 74 of Example 4 open radially inward.

Accordingly, the cage retainer 74 of Example 3 is suited for assembling the planetary shafts 20 to the sun shaft 14. Specifically, the cage retainer 74 is fitted to the sun shaft 14. Then, opposite end portions of the planetary shafts 20 are fitted into the respective U-shaped grooves 88 and 90 from radially outside, thereby assembling the planetary shafts 20 to the sun shaft 14. Subsequently, claws of a tool are engaged with respective unused U-shaped grooves 88 or 90. By use of the tool, the cage retainer 74 is rotated about the axis 80 so as to be screwed into the ring shaft 16. By this procedure, while the planetary shafts 20 are maintained in a predetermined positional relationship with one another, all of the planetary shafts 20, together with the carrier members 32 and 34 and the sun shaft 14, can be readily and efficiently assembled with the ring shaft 16.

By contrast, the cage retainer 74 of Example 4 is suited for assembling the planetary shafts 20 to the ring shaft 16. Specifically, the cage retainer 74 is fitted into the ring shaft 16. Then, opposite end portions of the planetary shafts 20 are fitted into the respective U-shaped grooves 88 and 90 from radially inside, thereby assembling the planetary shafts 20 to the ring shaft 16. Subsequently, while claws of a tool are engaged with respective unused U-shaped grooves 88 or 90 so as to prevent rotation of the cage retainer 74 about the axis 80, the sun shaft 14 is screwed into a space surrounded by the three planetary shafts 20. By this procedure, while the planetary shafts 20 are maintained in a predetermined positional relationship with one another, all of the planetary shafts 20, together with the carrier members 32 and 34 and the ring shaft 16, can be readily and efficiently assembled with the sun shaft 14.

By use of the cage retainers of Examples 1 to 4 described above, even after assembly of the rotary/linear motion converter, the planetary shafts 20 can be maintained in a predetermined positional relationship with one another and with the sun shaft 14 and the ring shaft 16, and the carrier members 32 and 34 can be maintained in a predetermined positional relationship with one another. Therefore, there can be effectively restrained undesirable displacements of the planetary shafts 20 which would otherwise result from torsional stress that is generated during transmission of rotation between the sun shaft 14, the planetary shafts 20, and the ring shaft 16.

[Assembly of Rotary/Linear Motion Converter]

The rotary/linear motion converter of the present invention has the first planetary gear mechanism composed of the helical sun gear, the helical planetary gears, and the helical ring gear, and the second planetary gear mechanism composed of the screw sun gear, the screw planetary gears, and the screw ring gear. The helical sun gear and the screw sun gear, the helical planetary gears and the screw planetary gears, and the helical ring gear and the screw ring gear are respectively united together. Thus, a method of assembling the second planetary gear mechanism of screw gears is important in assembling the rotary/linear motion converter.

An assembling procedure varies depending on whether the screw planetary gears are assembled to the screw sun gear first or to the screw ring gear first. Either assembling procedure can be used to assemble the rotary/linear motion converter.

A. When the Screw Planetary Gears are Assembled to the Screw Sun Gear First:

First, a predetermined number of the planetary shafts 20 are arranged on a jig similar to the cage retainer 74 or on the cage retainer 74. Next, the screw sun gear is inserted into the subassembly. In this case, while being rotated, the sun shaft 14 is inserted into a space surrounded by the planetary shafts 20. This procedure establishes a state in which the predetermined number of the planetary shafts 20 are arranged around the sun shaft 14 (step A1).

Next, the planetary shafts 20 are fixed so as not to rotate (step A2). In this case, as is apparent from the structure of the planetary gear mechanism, the retainer is fixed in such a manner as not to rotate relative to the sun shaft 14, or a rotation-stopping member is engaged with the helical gears of the planetary shafts 20, whereby the planetary shafts 20 can be fixed so as not to rotate relative to the sun shaft 14. If the helical sun gear and the screw sun gear are separate members, the helical sun gear is fixed to the sun shaft 14.

Next, while being rotated about the axis of the sun shaft 14, the unitary subassembly of the sun shaft 14, the retainer, and the planetary shafts 20 is inserted into the ring shaft 16. By this procedure, the internal screw gear of the ring shaft 16 is mated with the external screw gears of the planetary shafts 20, thereby joining the sun shaft 14, the retainer, and the planetary shafts 20 to the ring shaft 16 (step A3).

This screwing work requires a large backlash between the internal screw gear of the ring shaft 16 and the external screw gears of the planetary shafts 20. However, by means of allowing rotation of the planetary shafts 20 to thereby induce appropriate friction between the planetary shafts 20 and the sun shaft 14, a certain degree of sliding can be induced between the external screw gears of the planetary shafts 20 and the internal screw gear of the ring shaft 16. Thus, while the planetary shafts 20 are being rotated, the subassembly of the sun shaft 14, the retainer, and the planetary shafts 20 can be screwed into the ring shaft 16. Therefore, a backlash between the internal screw gear of the ring shaft 16 and the external screw gears of the planetary shafts 20 can be reduced.

When the sun shaft 14 and the planetary shafts 20 are appropriately assembled to the ring shaft 16, the helical gear of the sun shaft 14, the helical gears of the planetary shafts 20, and the helical gear of the ring shaft 16 match in phase. Therefore, these helical gears can be meshed with each other to thereby be fixed (step A4).

Figure 21:
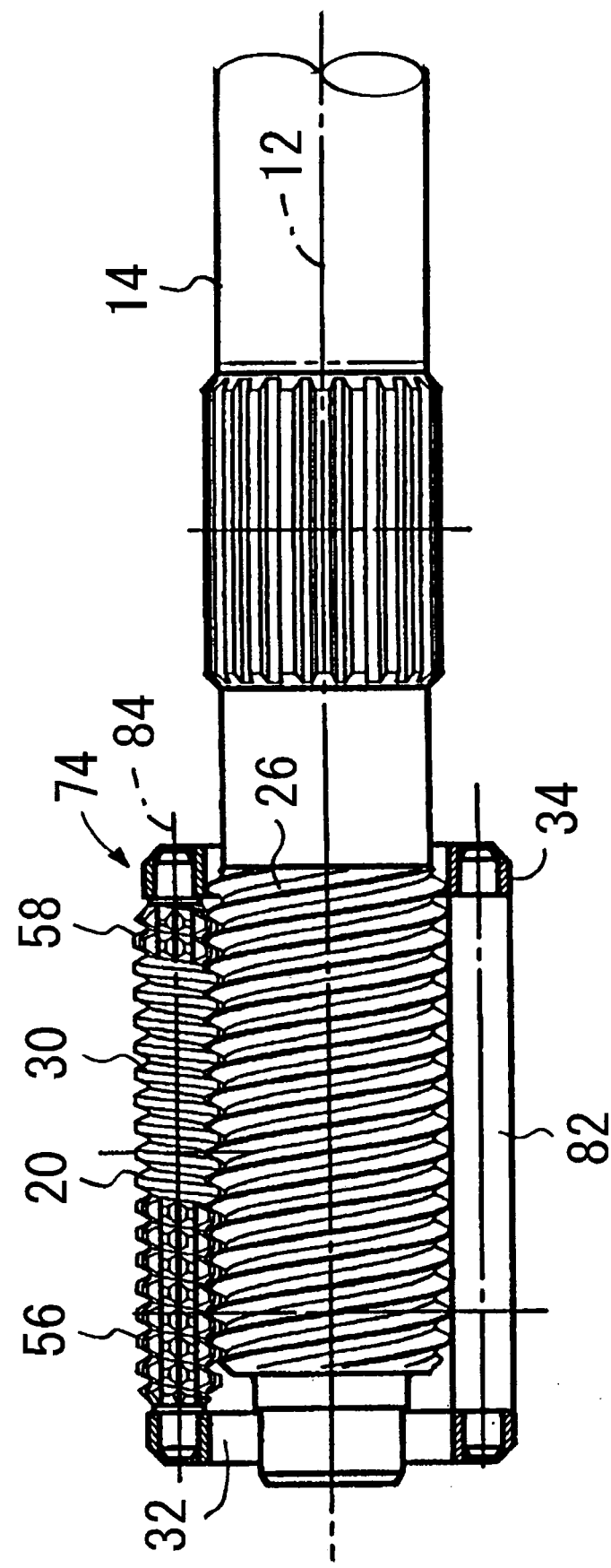
FIG. 21 is a view showing a step of inserting a screw sun gear into a space surrounded by a predetermined number of planetary shafts in the course of assembling a rotary/linear motion converter having the same structure as in the case of the tenth embodiment.
Figure 22:
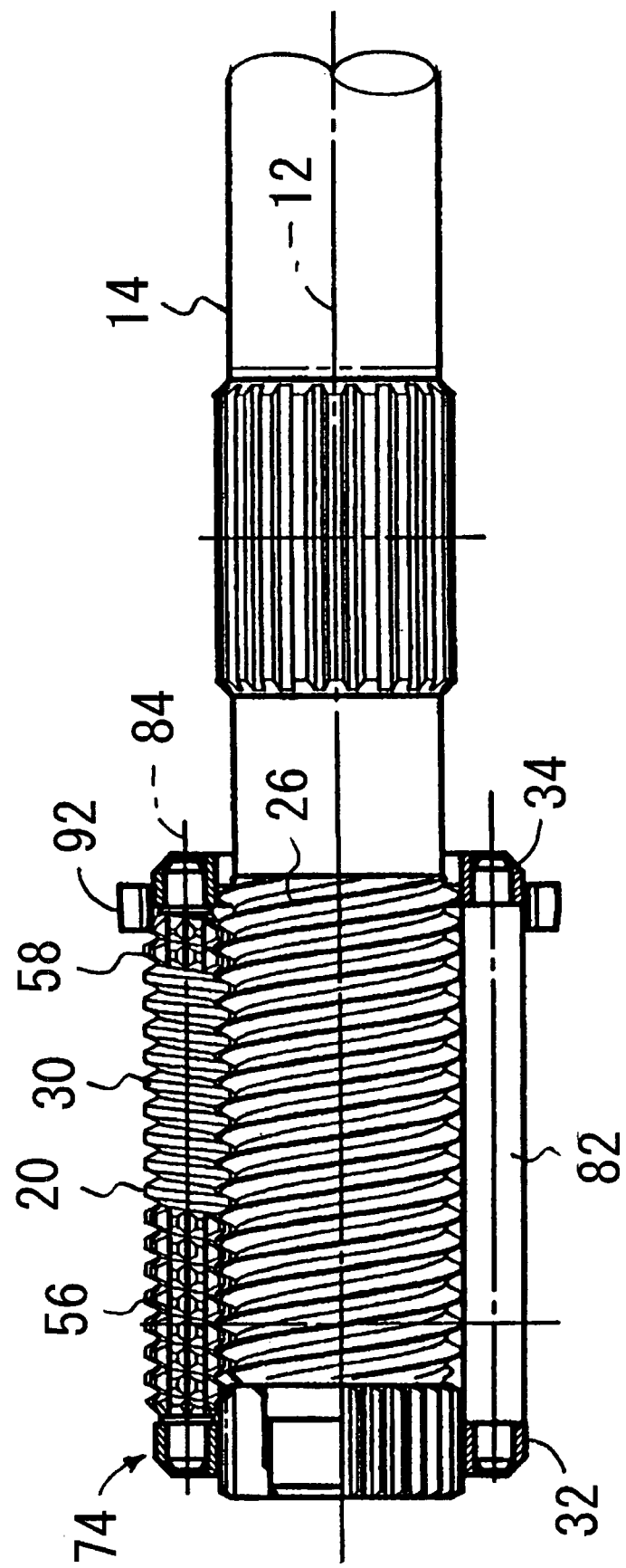
FIG. 22 is a view showing a step of attaching a helical sun gear to the sun shaft while the planetary shafts are fixed so as not to rotate, in the course of assembling the rotary/linear motion converter having the same structure as in the case of the tenth embodiment.
Figure 23:
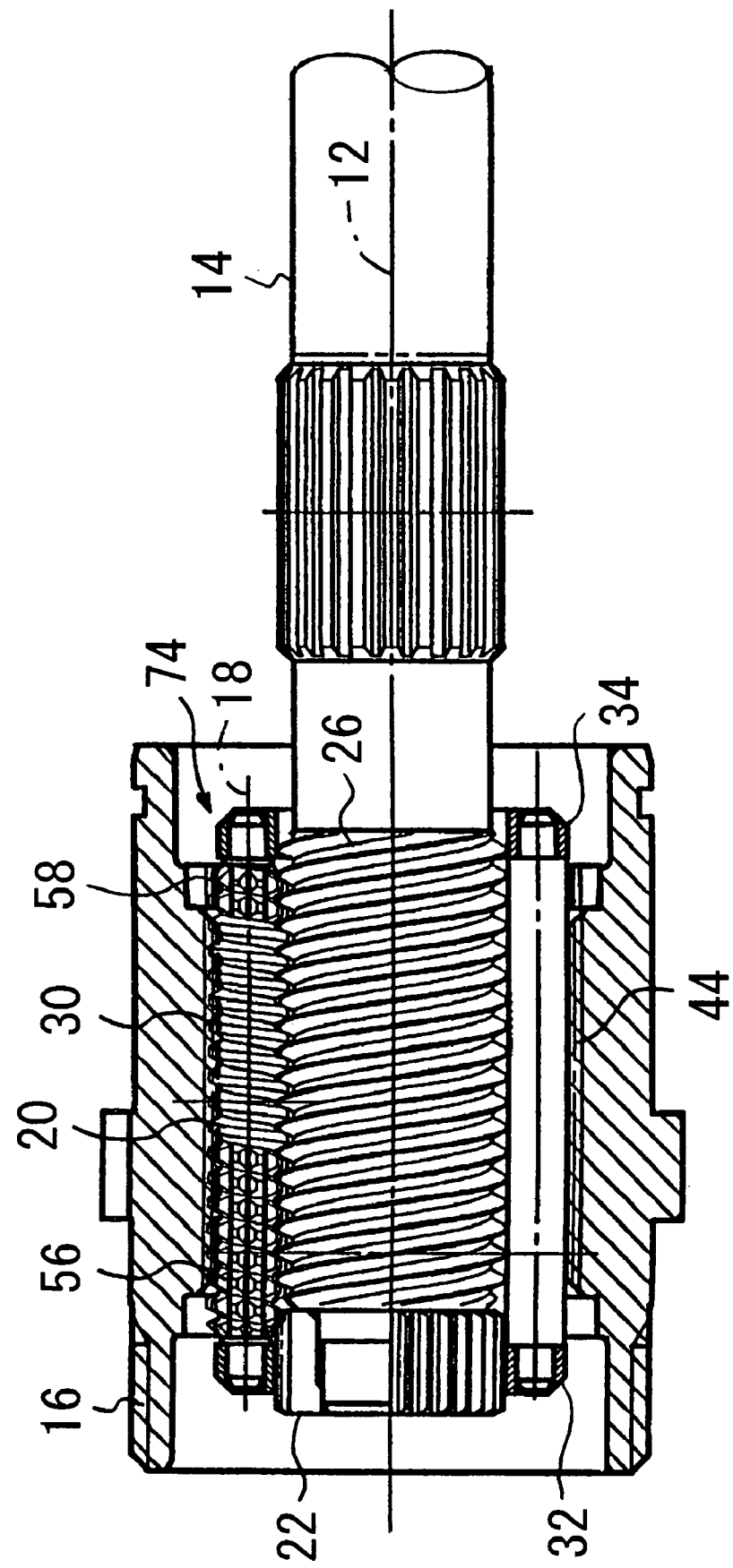
FIG. 23 is a view showing a step of joining the sun shaft, the retainer, and the planetary shafts to the ring shaft and fixing helical gears, in the course of assembling the rotary/linear motion converter having the same structure as in the case of the tenth embodiment.
Figure 24A:
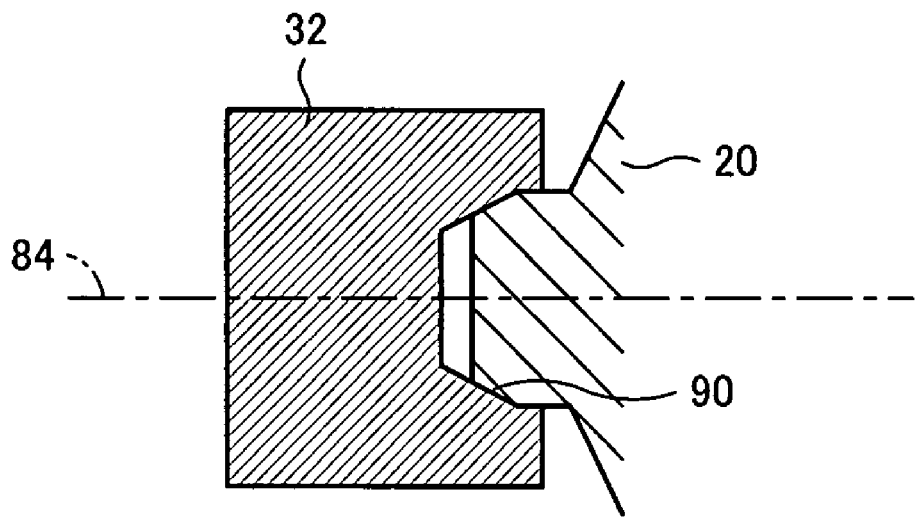
FIGS. 24A and 24B are enlarged views showing modifications of a carrier member for supporting a conical surface of each of opposite ends of the planetary shaft.
Figure 24B:
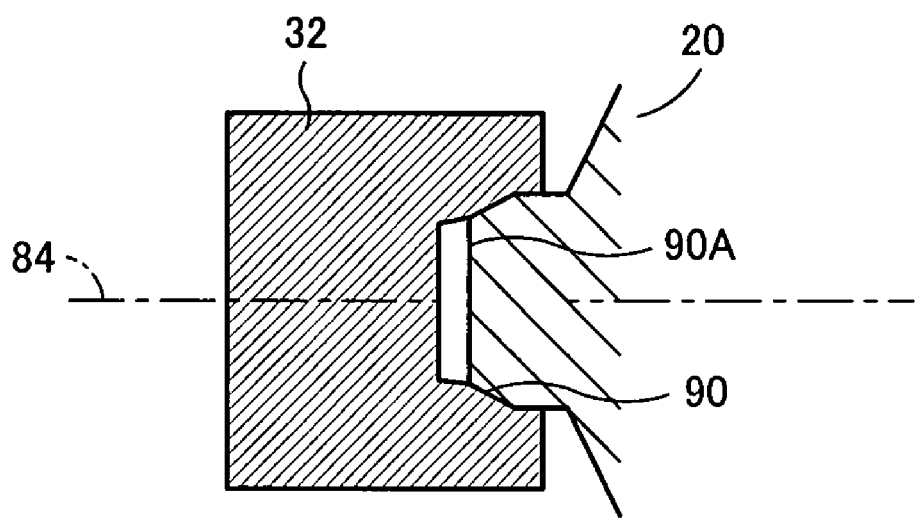

For example, FIGS. 21 to 23 show an assembling procedure for a rotary/linear motion converter which has the same structure as the above-described tenth embodiment. FIG. 21 shows the above-mentioned step A1, and FIG. 22 shows the above-mentioned step A2. In FIG. 22, reference numeral 92 denotes the rotation-stopping member. FIG. 23 shows the above-mentioned steps A3 and A4.

B. When the Screw Planetary Gears are Assembled to the Screw Ring Gear First:

First, a predetermined number of the planetary shafts 20 are arranged on a jig similar to the cage retainer 74 or on the cage retainer 74. Next, the planetary shafts 20 and the retainer 74 are inserted into the ring shaft 16. In this case, insertion can be performed while the retainer 74 is being rotated. That is, even though the screw gears of the planetary shafts 20 and the screw gear of the ring shaft 16 have the same helix angle, a certain degree of sliding arises. Thus, this sliding enables screw-like insertion of the planetary shafts 20 and the retainer 74 into the ring shaft 16.

For insertion as a screw while rotation of the planetary shafts 20 is prevented, a member similar to the helical gear of the sun shaft is engaged with two or more helical gears of the planetary shafts in such a manner as to connect the helical gears of the planetary shafts together, or rotation of the retainer and at least one planetary shaft is prevented.

Next, while being rotated, the sun shaft 14 is inserted into a space surrounded by the predetermined number of the planetary shafts 20, whereby the sun shaft 14 is placed internally of the planetary shafts 20. When the sun shaft 14 is appropriately assembled to the planetary shafts 20 and the ring shaft 16, the helical gear of the sun shaft 14, the helical gears of the planetary shafts 20, and the helical gear of the ring shaft 16 match in phase. At this stage, these helical gears are meshed with each other to thereby be fixed.

[Clearance of Cage Retainer]

In the course of assembly of the planetary rotary/linear motion converter of the present invention, which employs the retainer, when the planetary shafts are tentatively assembled to the retainer, a certain clearance must be left between the retainer and the end surfaces of gear portions of the planetary shafts. This can eliminate loss which would otherwise result from friction therebetween.

As mentioned above, the retainer provides the following advantage: a required number of planetary shafts are tentatively assembled to the retainer, and the plurality of planetary shafts which are tentatively assembled to the retainer can be assembled to the screw sun gear or to the screw ring gear, whereby the assembling performance of the planetary rotary/linear motion converter can be greatly enhanced. However, when the planetary shafts are tentatively assembled to the retainer, a certain clearance must be left between the retainer and the end surfaces of gear portions of the planetary shafts. This can eliminate loss which would otherwise result from friction therebetween.

For example, in the case where the sun shaft is displaced in the axial direction relative to the planetary shafts and the ring shaft, the sun shaft is inserted, by screwing, internally of a plurality of planetary shafts which are tentatively assembled to the retainer. However, the sun shaft cannot be inserted unless the tooth traces of the screw gears extend helically around respective axes and unless a plurality of the planetary shafts match in phase in the axial direction. Therefore, the maximum positional difference in the axial direction among all of the planetary shafts must be one pitch in the axial direction of the planetary shafts. Thus, a clearance of one pitch in the axial direction of the planetary shafts must be left between the retainer and the end surfaces of gear portions of the planetary shafts.

For example, after assembly, moving the two carrier members toward each other can eliminate clearance that was required at the time of assembly. However, assembly with a smaller clearance is possible by employing a method in which clearance is automatically eliminated at the time of assembly through impartation of a spring function to the carrier members by use of a jig or the like, or by forming the cage retainer from resin or the like so as to impart toughness to the cage retainer. Furthermore, even in the case where the retainer is not employed, efficient assembly is possible by using a jig which is similar to the retainer and can provide clearance required for assembly, and removing the jig after assembly.

While the present invention has been described with reference to the above embodiments, it will be apparent to those skilled in the art that the present invention is not limited thereto, but may be embodied in various other forms without departing from the scope of the invention.

For example, in the above-described embodiments, opposite ends of the planetary shaft 20 have a cylindrical shape, and the holes in the carrier members 32 and 34 for rotatably supporting them also have a cylindrical shape. However, particularly, in the case where the gear teeth of the planetary shaft 20 are formed by rolling, a conical surface having an angle of 120° is formed on each of the opposite ends of the planetary shaft 20, and rolling is carried out while the planetary shaft 20 is centered by use of the conical surfaces. Accordingly, the conical surfaces are strictly consistent with the axis of the planetary shaft 20.

Accordingly, modification may be made such that, as shown in FIG. 23A, the holes in the carriers 32 and 34 have a conical surface 92 having an angle of 120° and such that the conical surfaces 92 support the respective conical surfaces of opposite ends of the planetary shaft 20. Alternatively, modification may be made such that, as shown in FIG. 23B, the holes in the carriers 32 and 34 have a first conical surface 92A having an opening angle greater than 120° and a second conical surface 92B having an opening angle smaller than 120° and such that a ridge portion between the first conical surface 92A and the second conical surface 92B supports the conical surface of each of the opposite ends of the planetary shaft 20.

According to these modifications, as compared with the above-described embodiments, a thrust force that acts on the planetary shaft 20 can be effectively borne, whereby a thrust displacement of the planetary shaft 20 can be effectively prevented. Particularly, according to the latter modification, as compared with the former modification, the contact area between the opposite end portions of the planetary shaft 20 and the carrier members 32 and 34 is lowered, whereby friction resistance therebetween can be greatly lowered.

In the above-described first to twelfth embodiments, no bearing is provided between the sun shaft 14 and the ring shaft 16. However, even in these embodiments, a bearing(s) similar to the ball bearings 68 and 70 used in the thirteenth to fifteenth embodiments may be disposed on at least one side of the planetary shafts 20 along the axis of rotation 12. By contrast, in the thirteenth to fifteenth embodiments, the ball bearings 68 and 70 may be eliminated.

Figure 25B:
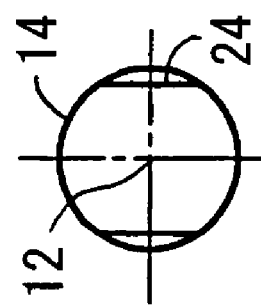
FIG. 25 is a sectional view taken along the axis of rotation, showing a modification of the tenth embodiment in which the inner races of ball bearings are fixedly press-fitted into respective carrier members.
Figure 25A:
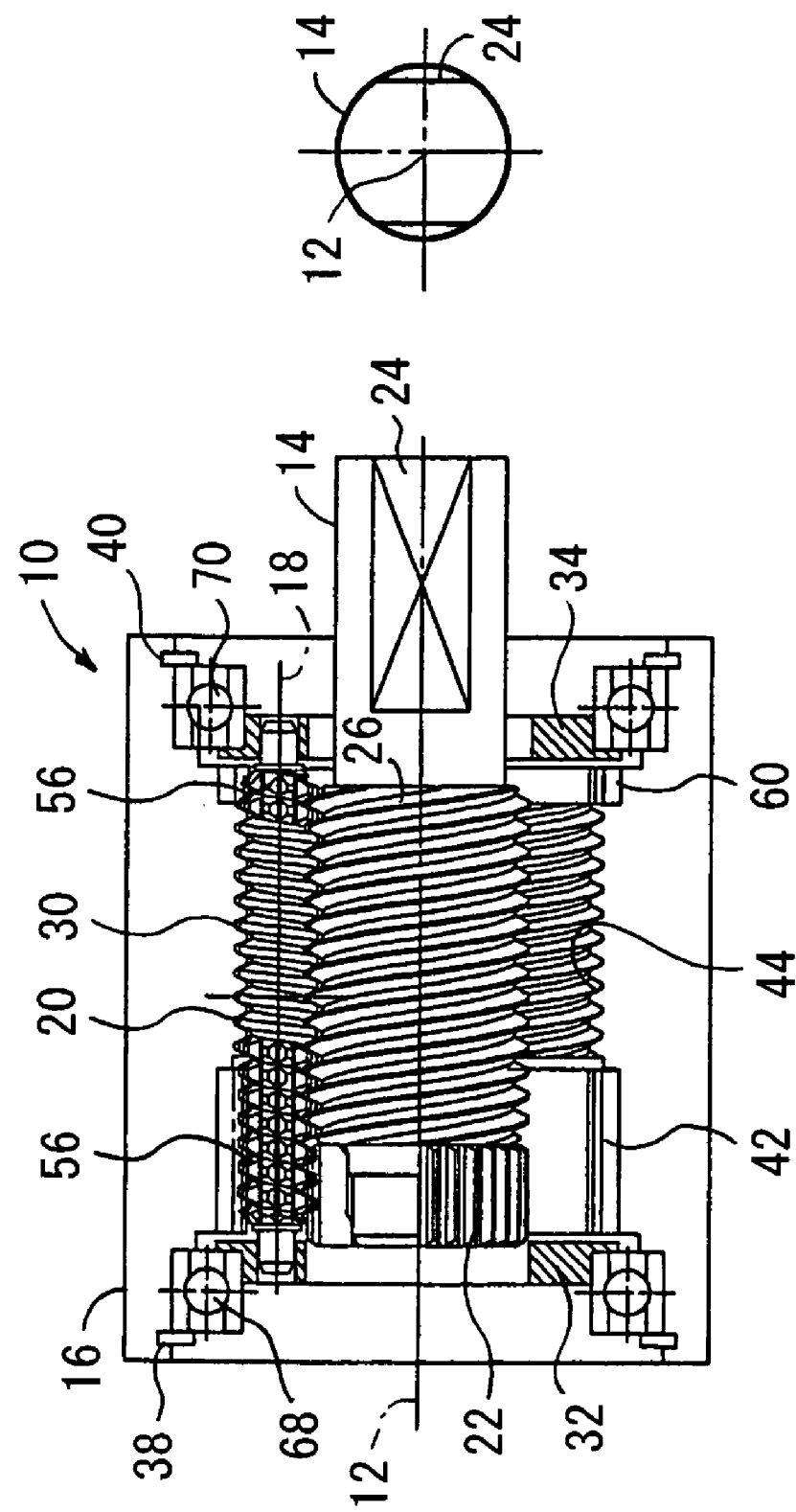
Figure 26A:
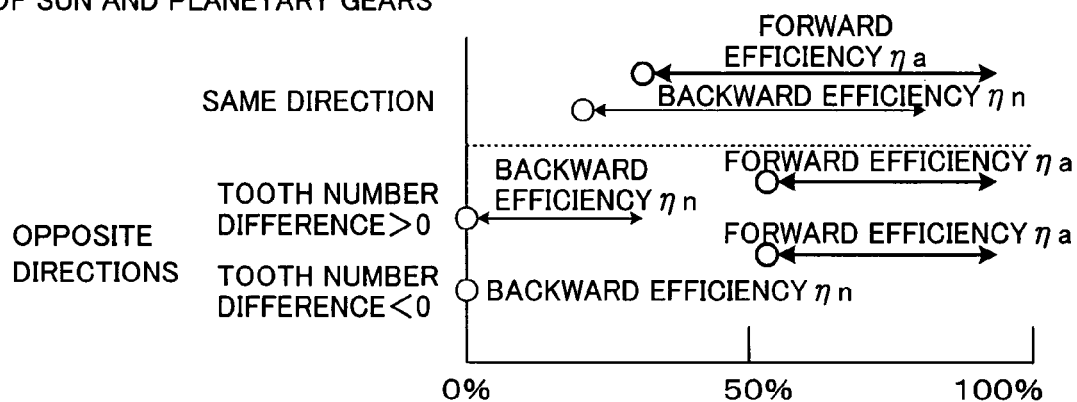
FIGS. 26A and 26B are diagrams showing the efficiency of the rotary/linear motion converter of the present invention with respect to sun-shaft displacement type and with respect to ring-shaft displacement type, respectively.
Figure 26B:
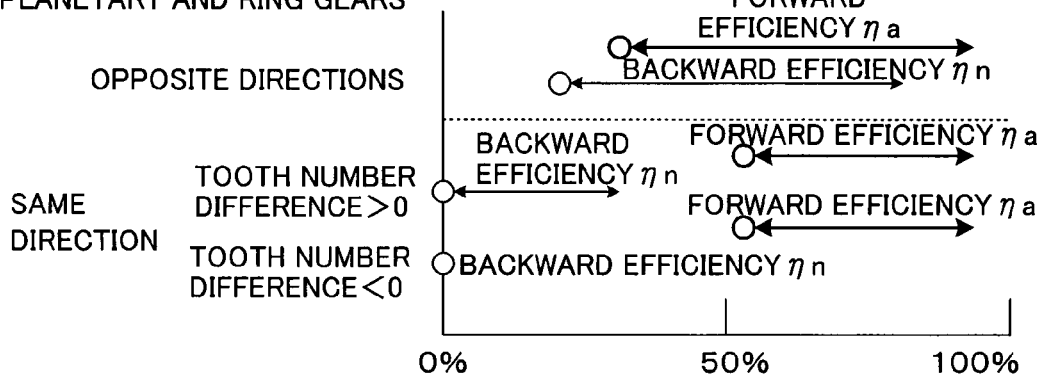

The bearings 68 and 70 in the above-described thirteenth to fifteenth embodiments are ball bearings. The bearings in the thirteenth to fifteenth embodiments and those bearings which may be added to the first to twelfth embodiments may be rotor bearings. The ball bearings 68 and 70 are installed as members independent of the carrier members 32 and 34. However, for example, as shown in FIG. 25A, which shows a modification of the tenth embodiment, the ball bearings 68 and 70 may be installed such that the inner races or outer races of the ball bearings 68 and 70 are fixedly press-fitted into the carrier members 32 and 34, respectively and such that the inner races or outer races of the ball bearings 68 and 70 are fixed to the inner surface of the ring shaft 16 or to the surface of the sun shaft 14 so as to prevent displacement of the ball bearings 68 and 70, which could otherwise be caused by the C-rings 72 and 74.

In the above-described thirteenth and fourteenth embodiments, the ring shaft 16 has the ring gear members 42 and 60, which function as helical ring gears, independent of the internal thread 44, which functions as a screw ring gear. In the fifteenth embodiment, the sun shaft 14 has the external gear members 50 and 52, which function as helical sun gears, independent of the external thread 26, which functions as a screw sun gear. However, all of the helical gears and the screw gears of the first and second planetary gear mechanisms may be provided in the same region extending along the axis of rotation 12 by providing, in the thirteenth and fourteenth embodiments, a dual-teeth portion which functions both as the internal thread 44 and as the ring gear members 42 and 60 and by providing, in the fifteenth embodiment, a dual-teeth portion which functions both as the external thread 26 and as the external gear members 50 and 52.

The invention claimed is:

1. A planetary rotary/linear motion converter comprising a sun shaft, planetary shafts, and a ring shaft having respective axes of rotation in parallel with one another; a helical sun gear, helical planetary gears, and a helical ring gear respectively provided on the sun shaft, the planetary shafts, and the ring shaft and cooperatively constituting a first planetary gear mechanism; and a screw sun gear, screw planetary gears, and a screw ring gear respectively provided on the sun shaft, the planetary shafts, and the ring shaft and cooperatively constituting a second planetary gear mechanism, wherein either of a gear ratio of the screw sun gear to the screw planetary gears and a gear ratio of the screw ring gear to the screw planetary gears differs from a gear ratio of the helical sun gear to the helical planetary gears and from a gear ratio of the helical ring gear to the helical planetary gears.

2. A planetary rotary/linear motion converter according to claim 1, wherein the number of teeth of the helical sun gear Zs, the number of teeth of each helical planetary gear Zp, the number of teeth of the helical ring gear Zn, the number of teeth of the screw sun gear Zss, the number of teeth of each screw planetary gears Zps, and the number of teeth of the screw ring gear Zns are in a relation expressed by $$(Zss/Zps):(Zns/Zps) \neq (Zs/Zp):(Zn/Zp).$$

3. A planetary rotary/linear motion converter according to claim 2, wherein, when the sun shaft and the ring shaft are rotated relative to each other, the sun shaft provided with the screw sun gear whose gear ratio to the screw planetary gears differs from the gear ratio of the helical sun gear to the helical planetary gears and from the gear ratio of the helical ring gear to the helical planetary gears, or the ring shaft provided with the screw ring gear whose gear ratio to the screw planetary gears differs from the gear ratio of the helical sun gear to the helical planetary gears and from the gear ratio of the helical ring gear to the helical planetary gears performs linear motion relative to the ring shaft or the sun shaft along the axis of rotation; and an advancing amount Lj of the linear motion per one relative rotation of the sun shaft and the ring shaft is expressed by $$Lj = P \cdot (Zs \cdot Zns - Zss \cdot Zn)/(Zs + Zn)$$

in which P is a pitch of the screw sun gear, the screw planetary gears, and the screw ring gear.

4. A planetary rotary/linear motion converter according to claim 1, wherein either of the helical sun gear and the helical ring gear or either of the screw sun gear and the screw ring gear has a non-zero tooth number difference.

5. A planetary rotary/linear motion converter according to claim 1, wherein either of the helical sun gear and the helical ring gear has a non-zero tooth number difference, and the helical sun gear, the helical planetary gears, and the helical ring gear are addendum-modified.

6. A planetary rotary/linear motion converter according to claim 5, wherein the sum of an addendum modification coefficient of the helical planetary gears and an addendum modification coefficient of the helical sun gear as calculated when the sun shaft performs linear motion along the axis of rotation and the sum of an addendum modification coefficient of the helical planetary gears and an addendum modification coefficient of the helical ring gear as calculated when the ring shaft performs linear motion along the axis of rotation range from −2 to 2.

7. A planetary rotary/linear motion converter according to claim 1, wherein either of the screw sun gear and the screw ring gear has a non-zero tooth number difference, and the screw sun gear, the screw planetary gears, and the screw ring gear have respective thread profiles such that the screw sun gear, the screw planetary gears, and the screw ring gear are of the same normal base pitch.

8. A planetary rotary/linear motion converter according to claim 1, wherein a helix angle of the screw sun gear and a helix angle of the screw planetary gears are of opposite directions, and the screw sun gear, the screw planetary gears, and the screw ring gear have respective involute thread profiles such that the screw sun gear, the screw planetary gears, and the screw ring gear are of the same normal base pitch and such that the screw sun gear and the screw planetary gears are of different axial pressure angles.

9. A planetary rotary/linear motion converter according to claim 1, wherein a helix angle of the screw planetary gears and a helix angle of the screw ring gear are of the same direction and assume different values, and the screw sun gear, the screw planetary gears, and the screw ring gear have respective involute thread profiles such that the screw sun gear, the screw planetary gears, and the screw ring gear are of the same normal base pitch and such that the screw planetary gears and the screw ring gear are of different axial pressure angles.

10. A planetary rotary/linear motion converter according to claim 1, wherein the screw sun gear and the screw planetary gears have respective helix angles of the same direction, and the screw sun gear, the screw planetary gears, and the screw ring gear have respective thread profiles such that the screw sun gear, the screw planetary gears, and the screw ring gear are of the same normal base pitch; such that the screw sun gear and the screw planetary gears are of different axial pressure angles; and such that the screw sun gear and the screw planetary gears are in a point contact with each other.

11. A planetary rotary/linear motion converter according to claim 1, wherein a gear ratio among the helical sun gear, the helical planetary gears, and the helical ring gear differs from a pitch-diameter ratio among the screw sun gear, the screw planetary gears, and the screw ring gear.

12. A planetary rotary/linear motion converter according to claim 1, wherein a reference pitch circle diameter of the screw sun gear and a reference pitch circle diameter of the screw ring gear are substantially equal to a working pitch circle diameter of the helical sun gear meshing with the helical planetary gears and a working pitch circle diameter of the helical ring gear meshing with the helical planetary gears, respectively.

13. A planetary rotary/linear motion converter according to claim 1, wherein the number of the planetary shafts is not a divisor of the number of teeth of each helical planetary gear.

14. A planetary rotary/linear motion converter according to claim 1, wherein the number of the planetary shafts is a divisor of the sum of the number of teeth of the screw sun gear and the number of teeth of the screw ring gear and is a divisor of the sum of the number of teeth of the helical sun gear and the number of teeth of the helical ring gear, and the number of teeth of each helical planetary gear and the number of the planetary shafts have no common divisor other than 1.

15. A planetary rotary/linear motion converter according to claim 1, wherein the helical planetary gears and the screw planetary gears are provided on the planetary shafts in a same predetermined region extending along the axis of rotation, and the helical sun gear and the screw sun gear are provided on the sun shaft in a same region that faces at least the predetermined region.

16. A planetary rotary/linear motion converter according to claim 15, wherein two helical ring gears meshing with the helical planetary gears are provided on the ring shaft in two respective regions that face opposite end portions of the predetermined region.

17. A planetary rotary/linear motion converter according to claim 1, wherein the helical planetary gears and the screw planetary gears are provided on the planetary shafts in a same predetermined region extending along the axis of rotation, and the helical ring gear and the screw ring gear are provided on the ring shaft in a same region that faces at least the predetermined region.

18. A planetary rotary/linear motion converter according to claim 17, wherein two helical sun gears meshing with the helical planetary gears are provided on the sun shaft in two respective regions that face opposite end portions of the predetermined region.

19. A planetary rotary/linear motion converter according to claim 1, wherein the helical planetary gears and the screw planetary gears are provided on the planetary shafts in a same predetermined region extending along the axis of rotation; the helical sun gear and the screw sun gear are provided on the sun shaft in a same region that faces at least the predetermined region; and the helical ring gear and the screw ring gear are provided on the ring shaft in a same region that faces at least the predetermined region.

20. A planetary rotary/linear motion converter according to claim 1, wherein the first planetary gear mechanism and the second planetary gear mechanism are provided in respective different regions extending along the axis of rotation.

* * * * *